United States Patent
Eom et al.

(10) Patent No.: US 10,939,313 B2
(45) Date of Patent: Mar. 2, 2021

(54) METHOD AND APPARATUS FOR MANAGING ELECTRONIC DEVICE THROUGH WIRELESS COMMUNICATION

(71) Applicant: SAMSUNG ELECTRONICS CO., LTD., Suwon-si (KR)

(72) Inventors: Chungyong Eom, Seoul (KR); Manseok Kang, Yongin-si (KR); Hoejin Kwen, Seongnam-si (KR); Hyunsuk Min, Suwon-si (KR); Yoseong Song, Suwon-si (KR); Yunjae Lim, Seoul (KR); Sangsun Choi, Seoul (KR); Eunhui Bae, Seoul (KR); Hun Lim, Suwon-si (KR); Jaeeun Kang, Suwon-si (KR); Changhan Kim, Goyang-si (KR); Jongyoub Ryu, Suwon-si (KR); Changhyun Lee, Suwon-si (KR); Kyoungjin Moon, Suwon-si (KR); Jaehong Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 40 days.

(21) Appl. No.: 15/361,582

(22) Filed: Nov. 28, 2016

(65) Prior Publication Data
US 2017/0156076 A1  Jun. 1, 2017

(30) Foreign Application Priority Data

Nov. 27, 2015 (KR) .................. 10-2015-0167974

(51) Int. Cl.
*H04W 24/10* (2009.01)
*H04W 4/70* (2018.01)
(Continued)

(52) U.S. Cl.
CPC ............. *H04W 24/10* (2013.01); *H04W 4/70* (2018.02); *H04W 8/005* (2013.01); *H04W 24/04* (2013.01); *H04W 84/12* (2013.01); *H04W 88/16* (2013.01)

(58) Field of Classification Search
None
See application file for complete search history.

(56) References Cited

U.S. PATENT DOCUMENTS

2008/0049610 A1   2/2008 Linwong et al.
2008/0224834 A1*  9/2008 Oosaka .................. G05B 15/02
                                          340/286.02
(Continued)

FOREIGN PATENT DOCUMENTS

CN    101035027 A    9/2007
JP    2009-159477 A  7/2009
(Continued)

OTHER PUBLICATIONS

Search Report dated Feb. 23, 2017 in counterpart International Patent Application No. PCT/KR2016/013768.
(Continued)

*Primary Examiner* — Nicholas Sloms
(74) *Attorney, Agent, or Firm* — Nixon & Vanderhye P.C.

(57) ABSTRACT

A device management method and apparatus is provided for managing electronic devices through wireless communication. A device management method of a first device having a list of wireless communication-enabled devices according to the present disclosure includes transmitting a first message requesting second device information, when it is necessary to check connection status of a second device performing wireless communication with the devices contained in the list, comparing the second device previously stored information and the second device information contained in the second message, when a second message including the
(Continued)

second device information is received in response to the first message, and transmitting a recovery command message with the first device information, when the second device information included in the second message differs from the previously stored second device information.

8 Claims, 37 Drawing Sheets

(51) Int. Cl.
*H04W 24/04* (2009.01)
*H04W 8/00* (2009.01)
*H04W 84/12* (2009.01)
*H04W 88/16* (2009.01)

(56) References Cited

U.S. PATENT DOCUMENTS

| | | |
|---|---|---|
| 2009/0169030 A1 | 7/2009 | Inohara |
| 2011/0106279 A1 | 5/2011 | Cho et al. |
| 2014/0313882 A1 | 10/2014 | Rucker et al. |
| 2015/0016270 A1 | 1/2015 | Hammann et al. |
| 2015/0215156 A1 | 7/2015 | Yoon |
| 2015/0271547 A1* | 9/2015 | Lin .................. H04N 21/43615 725/40 |
| 2016/0277204 A1 | 9/2016 | Kang |
| 2016/0301566 A1* | 10/2016 | Ramasubramani ......................... H04L 41/0813 |
| 2017/0064045 A1* | 3/2017 | Pai .......................... H04W 4/70 |
| 2017/0149833 A1* | 5/2017 | Ngo ....................... H04W 12/12 |

FOREIGN PATENT DOCUMENTS

| | | |
|---|---|---|
| KR | 10-2007-0074157 | 7/2007 |
| WO | 2015/064912 | 5/2015 |

OTHER PUBLICATIONS

European Search Report for EP Application No. 16868944.6 dated Aug. 21, 2018.
Japanese Office Action dated Dec. 1, 2020 for JP Application No. 2018-527222.
Chinese Office Action dated Nov. 23, 2020 for CN Application No. 201680071533.6.

* cited by examiner

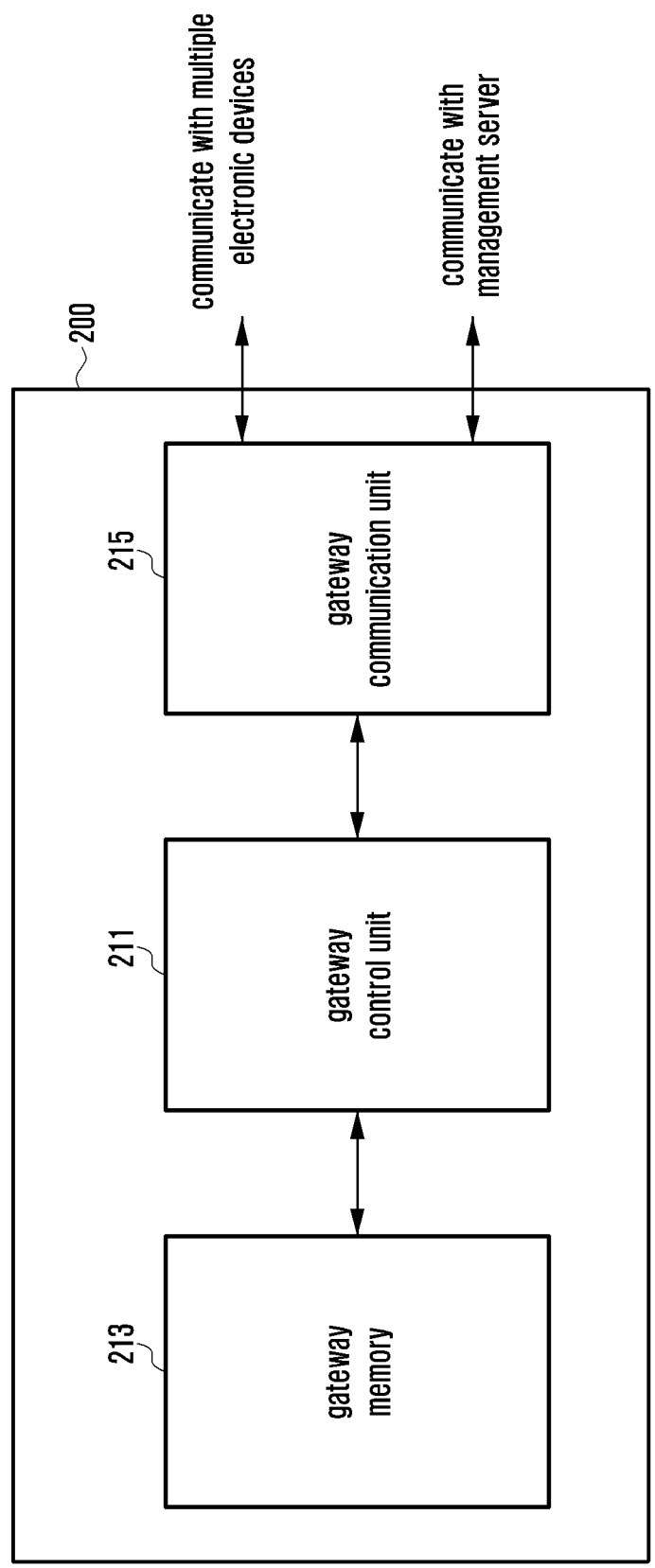

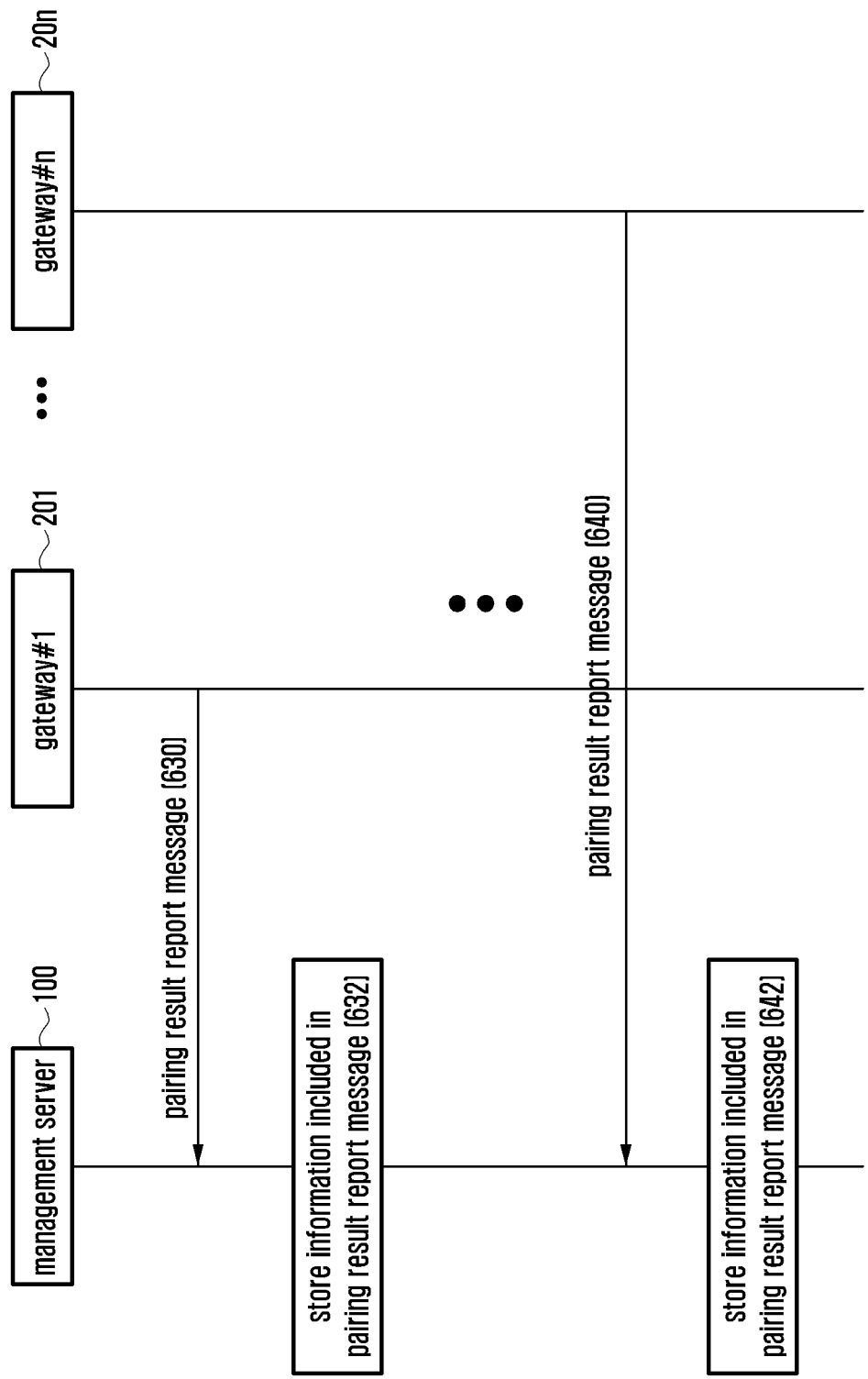

METHOD AND APPARATUS FOR MANAGING ELECTRONIC DEVICE THROUGH WIRELESS COMMUNICATION

CROSS-REFERENCE TO RELATED APPLICATION

This application is based on and claims priority under 35 U.S.C. § 119 to a Korean patent application filed on Nov. 27, 2015, in the Korean Intellectual Property Office and assigned Serial No. 10-2015-0167974, the disclosure of which is incorporated by reference herein in its entirety.

TECHNICAL FIELD

The present disclosure relates generally to a method and apparatus for managing devices and, for example, to a device management method and apparatus for managing electronic devices through wireless communication.

BACKGROUND

The Internet is evolving from a human-centric communication network in which information is generated and consumed by humans to the Internet of Things (IoT) in which distributed things or components exchange and process information. The combination of cloud server-based Big data processing technology and the IoT begets Internet of Everything technology. In order to secure the sensing technology, wired/wireless communication and network infrastructure, service interface technology, and security technology required for implementing the IoT, recent research has focused on sensor network, Machine to Machine (M2M), and Machine Type Communication (MTC) technologies.

In the IoT environment, it is possible to provide an intelligent Internet Technology that is capable of collecting and analyzing data generated from the connected things to create new values for human life. The IoT can be applied to various fields such as smart home, smart building, smart city, smart car or connected car, smart grid, health care, smart appliance, and smart medical service through legacy Information Technology (IT) technology and convergence of various industries.

In spite of such rapid developments in the technical environment, it appears that the technologies may not be used extensively in various fields. For instance, in the case of an environment where a plurality of devices should be checked to ensure that they are working, such as a hotel, a school, a National Assembly, a library, and an automated factory. In such an environment, there is a need of a management system for maintaining and repairing the devices deployed within a large space effectively with a limited amount of manpower and a method and apparatus for facilitating the management system.

SUMMARY

The present disclosure provides a management method and apparatus for maintaining and repairing electronic devices.

The present disclosure provides a method and apparatus for managing a large number of electronic devices with a limited amount of manpower.

The present disclosure provides a management method and apparatus for detecting errors in devices automatically.

The present disclosure provides a method and apparatus for detecting errors in electronic devices deployed on a network and restoring the system promptly, when a malfunctioning electronic device is changed for a new one.

The present disclosure provides a method and apparatus for detecting errors in electronic devices deployed on a network and facilitating changing an electronic device having errors for a new one.

The present disclosure provides a method and apparatus for detecting errors in electronic devices deployed on a network and that is capable of minimizing and/or reducing resource waste caused by changing electronic devices having errors for new ones.

In accordance with an example aspect of the present disclosure, a device management method of a first device having a list of wireless communication-enabled devices is provided. The method includes transmitting, when it is necessary to check connection status of a second device performing wireless communication with the devices contained in the list, a first message requesting second device information, comparing, when a second message including the second device information is received in response to the first message, the second device information stored previously and the second device information contained in the second message, and transmitting, when the second device information included in the second message differs from the previously stored second device information, a recovery command message with the first device information.

In accordance with another example aspect of the present disclosure, a method for a wireless communication device to manage electronic devices is provided. The method includes providing device information of the wireless communication device, when device information is requested by a first device connected to the wireless communication device, updating a memory with received backup data, when a restoration command message and backup data including device information of the electronic devices are received, transmitting a status check message to at least one electronic device with a pairing identifier included in the recovery data, when a connection status check is necessary for the at least one electronic device, and reporting status information to the first device, when a status response message is received from the electronic device.

In accordance with another example aspect of the present disclosure, a management device for managing electronic devices is provided. The management device includes a first communication unit comprising communication circuitry configured to communicate with a first device performing wireless communication with the electronic devices, a second communication unit comprising communication circuitry configured to communicate with a management server, a memory configured to store a list of wireless communication-enabled electronic devices, gateway information, and wireless communication device information, and a control unit comprising processing circuitry configured to transmit a first message requesting information of a first device, when it is necessary to check connection status of the first device performing wireless communication with the devices contained in the list, a first message requesting the first device information, to compare, when a second message including the first device information is received in response to the first message, second device information stored previously and second device information contained in the second message, and to transmit, when the first device information included in the second message differs from the previously stored first device information, a recovery command message with the first device information.

In accordance with another example aspect of the present disclosure, a management device for managing wireless communication-capable electronic devices is provided. The management device includes a first communication unit comprising communication circuitry configured to perform wireless communication with electronic devices, a second communication device comprising communication circuitry configured to communicate with a gateway, a memory configured to store a list of the wireless communication-capable electronic devices and wireless communication device information, and a control unit comprising processing circuitry configured to provide, when device information is requested by a the gateway, device information of the wireless communication device, to update, when a restoration command message and backup data including device information of the electronic devices are received, a memory with the received backup data, to transmit, when a connection status check is necessary for at least one electronic device, a status check message to the electronic device with a pairing identifier included in the recovery data, and to report, when a status response message is received from the electronic device, status information to the gateway.

In accordance with still another example aspect of the present disclosure, a device management method of a first device having a list of wireless communication-enabled devices is provided. The method includes transmitting, when a connection status check event occurs, a first message requesting device information of a second device, determining, when a second message including the second device information is received in response to the first message, whether the device information of at least one of the devices contained in the list is identical with the second device information included in the second message, and connecting, when the device information of at least one of the devices contained in the list is identical with the second device information included in the second message, to the second device.

BRIEF DESCRIPTION OF THE DRAWINGS

The above and other aspects, features and attendant advantages of the present disclosure will be more readily appreciated and understood from the following detailed description, taken in conjunction with the accompanying drawings, in which like reference numerals refer to like elements, and wherein:

FIG. 3A is a block diagram illustrating an example configuration of a network control device according to an example embodiment of the present disclosure;

FIG. 7B is a signal flow diagram illustrating an example procedure for gateways to report pairing results to a management server according to an example embodiment of the present disclosure;

DETAILED DESCRIPTION

Example embodiments of the present disclosure are described in greater detail below with reference to the accompanying drawings The same reference numbers are used throughout the drawings to refer to the same or like parts. The drawings are provided to aid in understanding the present disclosure but is not intended to be limiting. Detailed descriptions of well-known functions and structures incorporated herein may be omitted to avoid obscuring the subject matter of the present disclosure.

Figure 1:
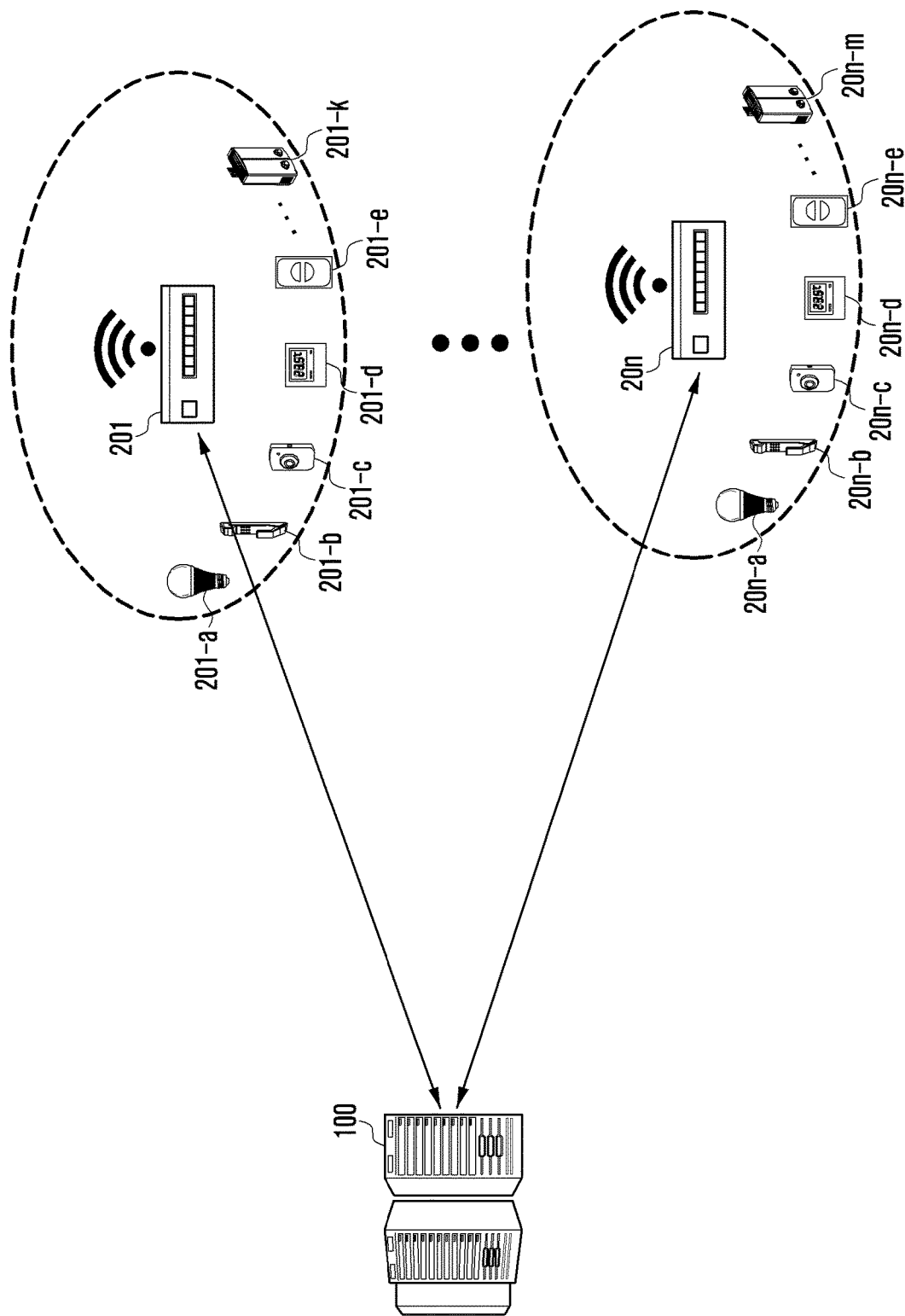
FIG. 1 is a diagram illustrating an example system for managing electronic devices using a wireless communication technology according to an example embodiment of the present disclosure.

FIG. 1 is a diagram illustrating an example system for managing electronic devices using a wireless communication technology according to an example embodiment of the present disclosure.

Descriptions are made of the network entities or entities of the system according to various examples the present disclosure with reference to FIG. 1. In the following description, the term "entities" or "network entities" may, for example, be used to refer to a certain node for performing operations according to the present disclosure.

Each of the network control devices $201, \ldots, 20n$ has its radio communication range formed in a radio communication scheme. For instance, a first network control device 201 may communicate data and signals with the electronic devices 201-$a$, 201-$b$, 201-$c$, 201-$d$, 201-$e$, . . . , 201-$k$ located within the radio communication boundary as denoted by the dotted line using one or more radio communication schemes. Likewise, the $n^{th}$ network control device $20n$ may communicate data and signals with the electronic devices $20n$-$a$, $20n$-$b$, $20n$-$c$, $20n$-$d$, $20n$-$e$, $20n$-$m$ located within its radio communication boundary using one or more radio communication schemes. The electronic devices 201-$a$, 201-$b$, 201-$c$, 201-$d$, 201-$e$, . . . , 201-$k$ may transmit device information, device status information, and urgency information to their network control device. The information transmission operation is described later with reference to accompanying drawings.

The network control devices $201, \ldots, 20n$ may connect to a server 100 through wired/wireless communication links. In the present disclosure, the network control devices $201, \ldots, 20n$ may typically use a wired communication protocol without exclusion of wireless communication protocols. The network control devices $201, \ldots, 20n$ may acquire device information, device status information, and urgency information of the electronic devices located in their communication area and provide the management server 100 with the acquired information. The network control devices $201, \ldots, 20n$ may also provide the management server 100 with network control device information and network control device status information. The network control device status information may include, for example, the status information of the wireless communication devices included in the network control device.

In the example embodiment of FIG. 1, the network control devices are illustrated to have a wireless communication function. According to an example embodiment of the present disclosure, however, the network control devices may not have any wireless communication function and, in this example, a gateway function and a wireless communication function may be implemented into separate nodes. Descriptions are made of such cases in greater detail below with reference to the accompanying drawings. However, the description is made under the assumption that each network control device has both the gateway function and wireless communication function for convenience of explanation.

The management server 100 may acquire device information and device status information from the respective network control devices $201, \ldots, 20n$ and store the device information. The management server 100 may also check the device status information received from the network control devices $201, \ldots, 20n$ and, if at least one electronic device is in an alarm state (such as a non-response status and a low power state), perform a process for notifying the operator. The management server 100 may also receive network control device information and network control device status information from the network control devices $201, \ldots, 20n$ and store the network control device information. The management server 100 may check the network control device status and, if it is determined that at least one network control device is in a non-response status, perform a process for notifying the operator of the corresponding state.

Although not illustrated in FIG. 1, the management server 100 may include a backup server for storing the network control devices information and electronic devices information. For example, the backup server may duplicate the management server 100 or the database of the management server for the purpose of security and may be prepared for backup of the data stored in the management server 100 at a predetermined interval.

The aforementioned nodes (e.g., the electronic devices including the management server 100, the network control devices, the gateways, the radio communication devices, and the electronic devices located within the radio communication areas of the radio communication devices and the network control devices) may be referred, for example, to as the network entities or entities.

Example cases of adopting the above-described system are described hereinafter. For instance, the management system of FIG. 1 may be applied to a hotel. In the example that the management system of FIG. 1 is applied to a hotel, a network control device may be installed per guest room and may communicate with various electronic devices equipped with the communication module comprising communication circuitry and configured according to the present disclosure (such as an electric light, a door sensor, a temperature controller, a smart plug, an air conditioner, and a refrigerator) to be deployed in the guest room.

The network control device may also be installed in various convenience facilities such as a hotel conference room, an auditorium, and a fitness center, or the like. In order to manage the electronic devices located within its communication range, the network control device may transmit and receive various types of signals, messages, and data. In this way, the network control device may acquire the device information and device status information. The information collected by the network control devices may be provided to the management server 100. The management server 100 may provide the operator with the information and notification on the states of the electronic devices located within the communication range of the network control devices 201, . . . , 20n based on the information acquired from the network control devices 201, . . . , 20n to enable the operator to change the devices at appropriate time points. For example, if an electronic device installed to a convenience facility is in the no-response status or error status, the operator may change the electronic device immediately or at a predetermined convenience facility inspection time and, if an error is detected in one or more electronic devices installed in a guest room, the operator may determine the presence/absence of a guest to determine when to change the corresponding electronic device.

According to the present disclosure, if a certain network entity is exchanged for a new one, the backup data of the old device may be stored in the management server 100 and, if the two devices are compatible with each other, it may be possible to apply the stored backup data to the new device to reduce the device change load with extra operation. This makes it possible to minimize and/or reduce resource waste for changing a network entity.

For example, the network entity may be the network control device. In the case that a network entity includes two or more independent devices as illustrated in a drawing to be described later, each device may be regarded as one network entity.

The management system of FIG. 1 may also be installed in an automated factory. In the case that the management system of FIG. 1 is installed in an automated factory, the network control devices 201, . . . , 20n may be deployed at certain positions. For example, one network control device may take charge of a floor or cover a predetermined area of a room or a floor. In the case that the network control devices 201, . . . , 20n are deployed as described above, the corresponding network control device may transmit and receive various types of signals, messages, and data to acquire, for example, the device information, device status information and/or urgency information therefrom to manage the electronic devices located within the its communication coverage. The information collected by the network control devices 201, . . . , 20n may be provided to the management server 100. The management server 100 may provide the operator with the information and alert on the states of the electronic devices located within the communication range of the network control devices 201, . . . , 20n based on the information acquired from the network control devices 201, . . . , 20n. In this way, the operator may change an electronic device in a non-response status or a low power state for a new one at an appropriate time. For example, if an error is detected at any of a sensor, an electrical switch, and an automated device installed in the automated factory, the management server 100 provides the operator with the status information of the corresponding electronic device in order to change the electronic device with a detected error for a new one.

As described above, if a certain network entity is changed for a new one, the management server 100 may store the backup data of the old network entity and, if the old and new network entities are compatible, the backup data is applied to the new network entity to reduce device change load without extra operation. This means that a network entity can be changed for a new one without resource waste.

Using the methods described above and to be described later, it may be possible to detect an electronic device having an error and replace the device having an error with a new one at an appropriate timing among the electronic devices deployed in a large scale facility such as a factory, a hotel, a library, and a school, or the like. In the case that any of the network control devices 201, . . . , 20n is changed for another one, it may be possible to determine whether the old network control device is compatible with the new network control device and, if so, perform restoration with the backup data of the old network control device. In this way, it may be possible to reduce the number of unnecessary communications and activate the wireless network without any and/or reducing laborious operations for replacing the electronic device or network management device. A description is made of the present disclosure in greater detail with reference to the accompanying drawings hereinafter.

Figure 2:
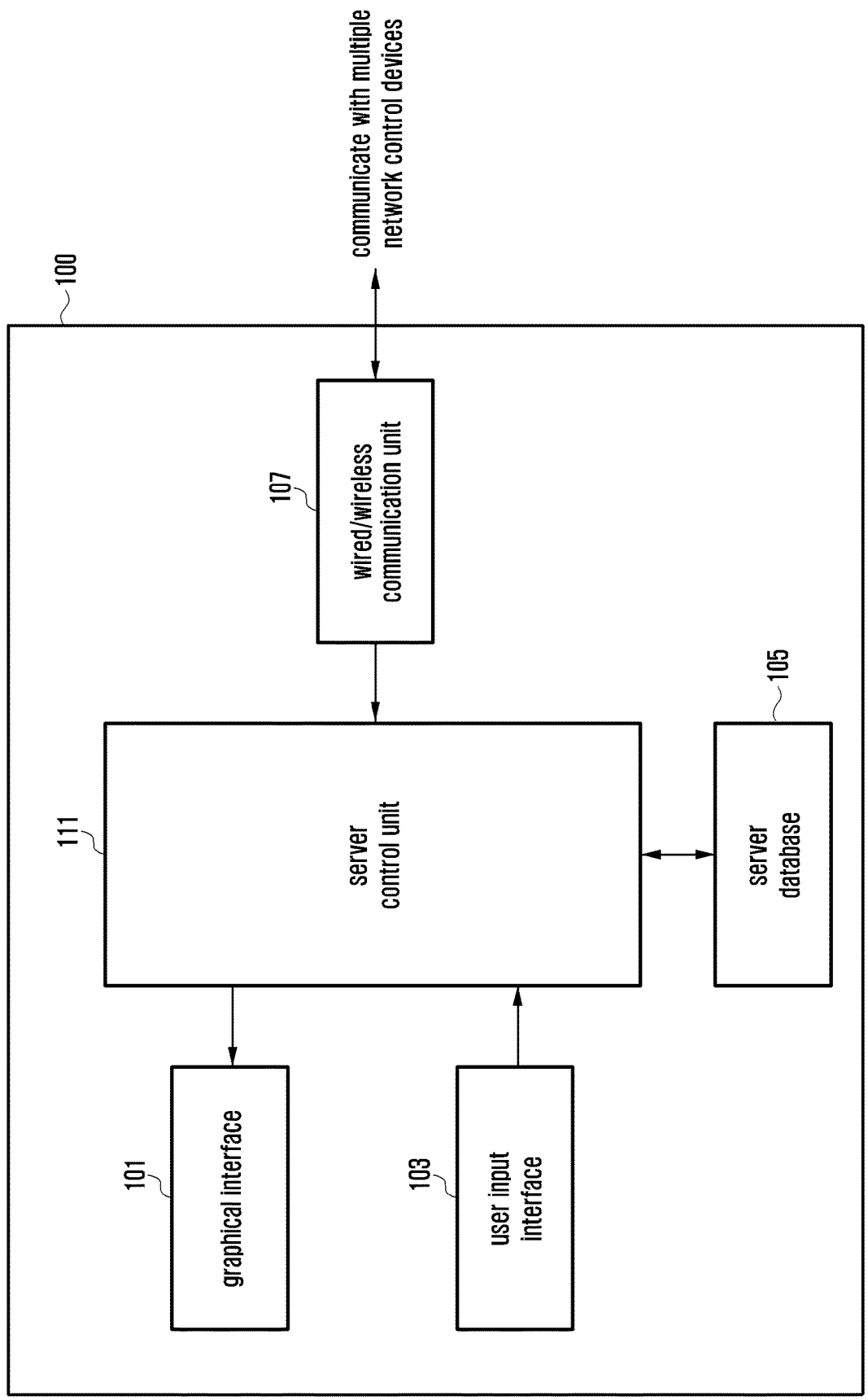
FIG. 2 is a block diagram illustrating an example configuration of a management server for managing electronic devices and network control devices according to an example embodiment of the present disclosure.

FIG. 2 is a block diagram illustrating an example configuration of a management server for managing electronic devices and network control devices according to an example embodiment of the present disclosure.

Referring to FIG. 2, the management server 100 may include a control unit (e.g., a controller including processing circuitry) 111, a graphical interface 101, a user input interface (e.g., including interface circuitry) 103, a database 105, and a wired/wireless communication unit (e.g., including communication circuitry) 107. It should be noted that the management server 100 is depicted to have only the function blocks essential necessary for explaining the present disclosure in FIG. 2 although it may include other function blocks.

The graphic interface 101 may convert the data generated by the control unit 111 to a graphical format to be presented to the operator. The data generated by the control unit 111 may include text, status information of the electronic devices located within the communication range of each network control device, configuration information of the network control device and electronic devices, and visual graphic information for presenting an alarm. The graphic user interface is described in more detail hereinafter with reference to accompanying drawings.

The user input interface 103 may include various interface circuitry for converting a user input to an information format recognizable by the control unit 111. The user input interface 103 may be implemented in various types of interface circuitry, devices or modules for converting the input made such as, for example, and without limitation, a keyboard interface, a mouse interface, an electronic pen, and the like to, a signal format that can be processed by the control unit 111.

The database 105 may be implemented in various types of memories. For example, the database 105 may be stored in one of various types of storage media such as a hard disk, a flash memory, a Read Only Memory (ROM), a Random Access memory (RAM), and an optical disc. The database 105 may include a region for storing various types of data necessary for the control operation of the control unit 111 and a region for storing data generated during the control operation temporarily, and information related to the network control devices and electronic devices. It should be noted that the server database 105 may be stored two or more physical devices. The database 105 may also be stored in a backup server or a database server prepared separately.

The wired/wireless communication unit 107 may include various communication circuitry and be provided with an interface for communication with a plurality of network control devices. For example, the wired/wireless communication unit 107 may provided with a wired communication interface for communicating signals, data, and messages with the network control devices and the management server 100 through a wired communication protocol and a wireless communication interface for communicating signals, data, and messages through a wireless communication protocol. It should be noted that the wired/wireless communication unit 107 may include one or both of a wired communication module for connection to the network control devices through a Local Area Network (LAN) cable and a wireless communication module for wireless connection thereto through a wireless protocol.

The control unit 111 may include various processing circuitry, such as, for example, and without limitation, a dedicated processor, processing circuitry, a CPU, an application-specific integrated circuit (ASIC), field programmable gate array (FPGA), circuit, or the like, configured to control the operations of communicating with the network control devices, storing the information acquired from the network control devices and electronic devices, and, if any error is detected, notifying the operator of the error. The control unit 111 may also control data backup to store the information acquired from the network control devices and electronic devices in the database 105 and to provide the backup data to a certain network control device or electronic device. The control unit 111 may also control to store the restoration result of the backup data and provide the operator with the restoration result. The operation of the control unit 111 is described in greater detail later with reference to accompanying drawings. In the case where a backup server is prepared, the backup operation may be performed periodically. For example, the data backup may be configured to be executed at a predetermined time, e.g., specific time of midnight. It may also be possible to configure the data backup to be executed one time every day, every week, or every month. Also, it will be apparent to those skilled in the art that, if necessary, the operator may execute data backup at any time.

FIG. 3A is a block diagram illustrating an example configuration of a network control device according to an example embodiment of the present disclosure.

The network control device 200 is functionally connected to the management server 100 and operates as a gateway for providing various types of information to the electronic devices located in its radio communication range. The network control device 200 communicates signals, messages, and data with the radio communication-capable electronic devices located within its radio communication range.

It should be noted that the network control device depicted in FIG. 3A is directed mainly to gateway functionality and radio communication functionality. That is, the network control device may include other function blocks in addition to those depicted in FIG. 3A, detailed descriptions thereof are made subsequently.

Referring to FIG. 3A, the network control device 200 may include a gateway control unit (e.g., including processing circuitry) 211, a gateway memory 213, and a gateway communication unit (e.g., including communication circuitry) 215. The gateway memory 213 may be configured in various ways depending on the configuration of the network control device 200. For example, the gateway memory 213 may include at least one of a hard disk, a flash memory, a ROM, a RAM, and an optical disk. The gateway memory 213 may include a region for storing control data and program data necessary for gateway control operations, a region for storing data generated during the control operations temporarily, and a region for storing information on the electronic device located within a radio communication range of the network control device 200. The data being stored in the gateway memory 213 are described in detail later with reference to accompanying drawings.

The gateway communication unit 215 may include various communication circuitry configured to perform radio communication with the electronic devices located within the radio communication range of the network control device 200 and to communicate with the management server 100. The operation of the gateway communication unit 215 is described later with reference to accompanying drawings.

The gateway control unit 211 may include various processing circuitry configured to control the overall operation of the network control device 200. For example, the gateway control unit 211 controls communication with the management server 100 and the electronic devices, stores information acquired from the electronic devices in the gateway memory 213, and provides the information to the management server 100. The gateway control unit 211 may be integrated into or connected to a device having specific function depending on the place where the network is deployed.

For example, the corresponding function may be installed at a security camera, a small computer, or a tablet computer for management purpose in an automated factory or a library. For example, the gateway function may be installed in a smart television or a set-top box in a hotel room. For example, the gateway function may be installed in a certain medical device, a smart television, or a set-top box in a hospital room, or the like, but is not limited thereto. In this way, the network control device according to the present disclosure may be implemented as an independent entity or installed in another device as a supplementary function.

Figure 3B:
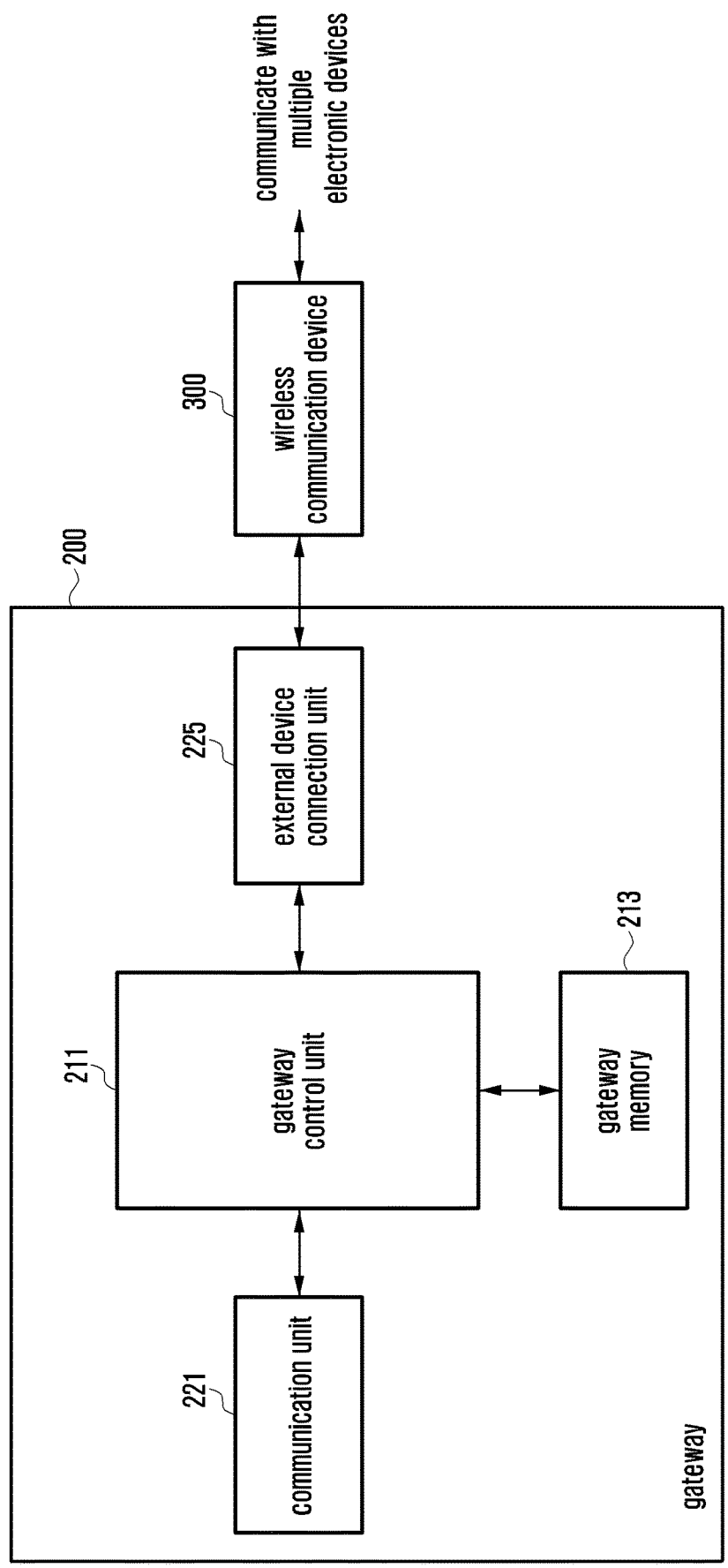
FIG. 3B is a block diagram illustrating an example configuration of a network control device according to another example embodiment of the present disclosure.

FIG. 3B is a block diagram illustrating an example configuration of a network control device according to another example embodiment of the present disclosure.

In comparison with the example embodiment of FIG. 3A, a gateway 200 and a wireless communication device 300 are implemented as separate entities in the example embodiment of FIG. 3B. The gateway 200 may include a communication unit (e.g., including communication circuitry) 221, a gateway memory 213, an external device connection unit (e.g., including communication circuitry) 225, and a gateway control unit (e.g., including processing circuitry) 211. It should be noted that the same reference numbers are used to refer to the same parts in FIGS. 3A and 3B. The communication unit 221 may have the communication function of the gateway communication unit 215 of FIG. 3A for communicating with the management server 100. For example, the communication unit 221 may have a wired communication module for the case where the network control device communicates with the management server 100 using a wired communication protocol or may have a wireless communication module for the case where the network control device communicates with the management server using a wireless communication protocol. The communication unit 221 may include various communication circuitry configured to support both the wired and wireless communication modes. In the case that the communication unit 221 supports the wireless communication mode, it may support at least one of various communication protocols with the exception of the protocol used by the wireless communication device 300. For example, if the wireless communication device 300 supports ZigBee or Z-wave communication mode, the communication unit 221 may support Bluetooth or Wi-Fi communication mode. On the other hand, if the wireless communication device 300 supports Bluetooth or Wi-Fi communication mode, the communication unit 221 may support ZigBee or Zwave. In the case that the wireless communication device 300 supports only one of the aforementioned communication modes, the communication unit 221 may support one of the remaining communication modes. The present disclosure may be applied to the systems using other wireless communication protocols in the same manner. For example, the communication unit 221 and the wireless communication device 300 may be configured to support different wireless communication protocols from each other.

The gateway control unit 211 and the gateway memory 213 have been described in the embodiment of FIG. 3A and thus repeated descriptions thereof are omitted herein. In the case of the configuration of FIG. 3B, however, the gateway control unit 211 may detect physical connection of the wireless communication device 300 to the external device connection unit 225 and perform a control operation upon detecting the physical connection. How the gateway control unit 211 detects the physical connection of the wireless communication device 300 to the external device connection unit 225 and performs the subsequent control operation is described later in greater detail with reference to accompanying drawings.

The external device connection unit 225 is provided with an interface for connection between the gateway control unit 211 and the wireless communication device 300. The external device connection unit 225 may include various interface circuitry configured to provide various types of interfaces depending on the data format being exchanged between the wireless communication device 300 and the gateway 200. For example, the if the wireless communication device 300 and the gateway 200 are communicating data through a Universal Serial Bus (USB) link, the external device connection unit 225 is provided with a USB interface.

The wireless communication device 300 is provided with an interface for communicating data with the gateway 200 so as to make it to communicate data with the electronic devices located within the radio communication range of the network control device as described with reference to FIG. 3A. The wireless communication device is described in more detail with reference to FIG. 4.

Figure 4:
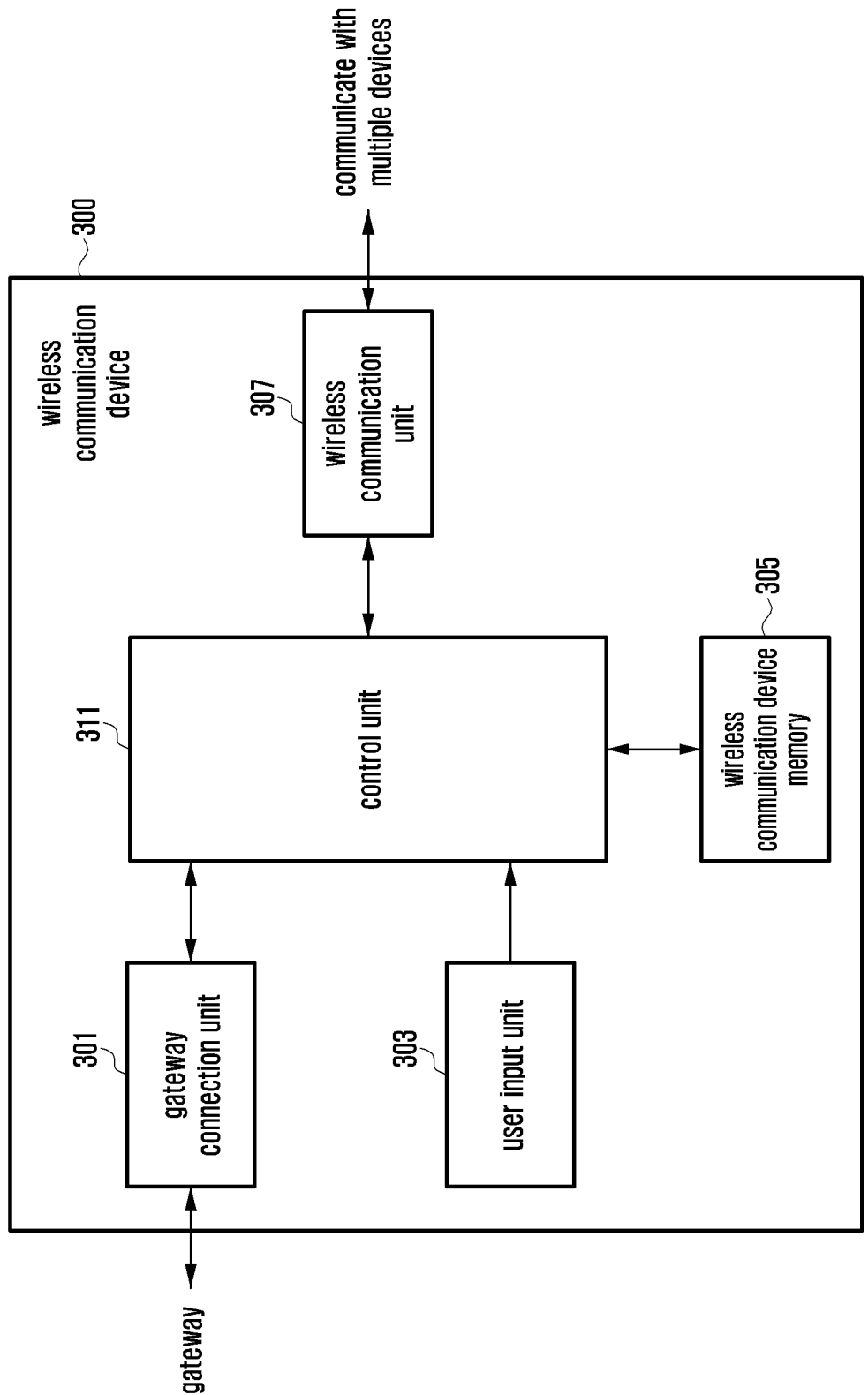
FIG. 4 is a block diagram illustrating an example configuration of a wireless communication device according to an example embodiment of the present disclosure.

FIG. 4 is a block diagram illustrating an example configuration of a wireless communication device according to an example embodiment of the present disclosure.

Referring to FIG. 4, the wireless communication device 300 may include a gateway connection unit (e.g., including connection circuitry) 301, a user input unit (e.g., including input circuitry) 303, a memory 305, a control unit (e.g., including processing circuitry) 311, and a wireless communication unit (e.g., including wireless communication circuitry) 307.

As described with reference to FIG. 3B, the gateway connection unit 301 is provided with an interface for communication with the gateway 200. In the case that the wireless communication device 300 communicates data with the gateway 200 over USB as described with reference to FIG. 3B, the gateway connection unit 301 may be a USB interface module. The gateway connection unit 301 may be provided with another communication interface module instead of the USB communication interface module.

The user input unit 303 may include various circuitry for allowing the user to input a command to the control unit 311 using for example physical means or circuitry, such as, for example, and without limitation, buttons and switches for initializing or resetting the wireless communication device 300. If the wireless communication device 300 is a certain type of electronic device such as tablet computer and security camera equipped with a wireless communication function, the user input unit 303 may be replaced by the input unit of the electronic device in which the wireless communication device 300 is installed. In this case, the user input unit 303 may be configured in various shape rather than with one or more keys.

The memory 305 may store data necessary for controlling the wireless communication device 300 and include a region for storing information on electronic devices located within a radio communication range. The data being stored in the memory 305 are described in detail later.

The wireless communication unit 307 may include wireless communication circuitry configured to communicate with electronic devices using a predetermined communication protocol. For example, the wireless communication unit 307 may be provided with a ZigBee communication module or a Z-wave communication module for communicating with the electronic devices over ZigBee or Z-wave. The wireless communication unit 307 may support at least one of various wireless communication protocols including Wireless Local Area Network (WLAN) and Bluetooth.

The operation of the wireless communication device 300 can be described with reference to FIG. 1. If the wireless communication device 300 is installed initially or starts operating, it has no information about neighboring electronic devices. Accordingly, the wireless communication device 300 generates and broadcasts a signal to announce its presence within its radio communication range. The wireless communication device 300 may request for response to electronic devices located within its radio communication range. If a response signal is received from at least one electronic device, the wireless communication device 300 may request to the corresponding electronic device for device information and store the acquired device information. The wireless communication device 300 may perform a pairing operation with the corresponding electronic device after or upon storing the device information. The wireless communication device 300 may request to the paired electronic devices for device status information and store and/or report the acquired device status information. The detailed operations of the wireless communication device are described later in greater detail with reference to accompanying drawings.

<Network Initialization Operation>

The basic network configuration for managing electronic devices and the entities comprising the management network have been described above. A description is made hereinafter of the initial operations of the entities of the network for managing the electronic devices.

Figure 5:
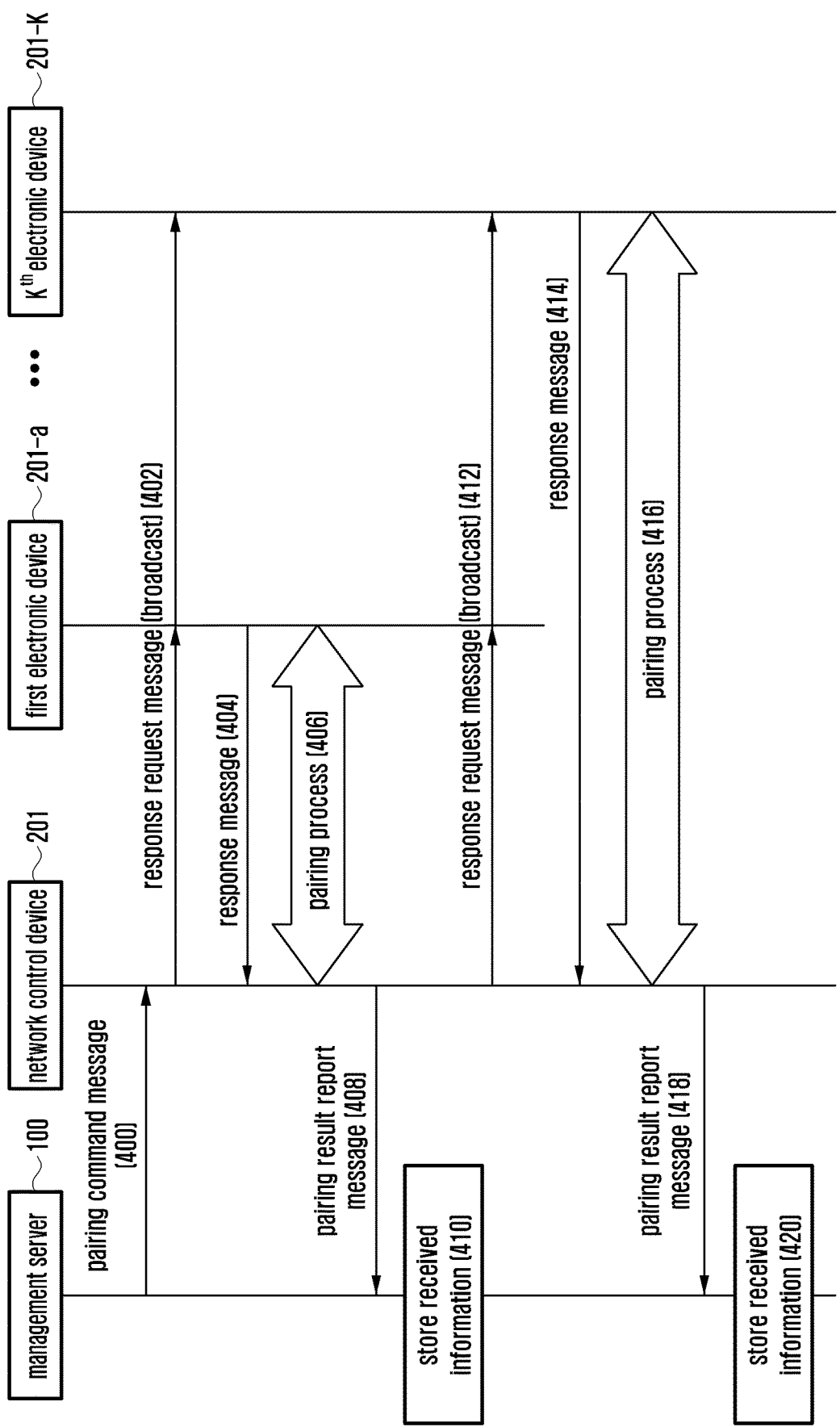
FIG. 5 is a signal flow diagram illustrating example signal flows among network entities in an initial operation of a management network according to an example embodiment of the present disclosure.

FIG. 5 is a signal flow diagram illustrating example signal flows among network entities in an initial operation of a management network according to an example embodiment of the present disclosure.

Prior to explaining the embodiment of FIG. 5, brief descriptions are made of the reference numbers of the network entities. In FIG. 5, the management server 100 may be with the same or similar to the management server described with reference to FIGS. 1 and 2. The management server 100 may have a separate backup database. In FIG. 5, the network control device 201 may be with the same or similar to the network control device illustrated in FIG. 1 and configured as described with reference to FIG. 3A. For example, the network control device 201 of FIG. 5 may be equipped with a gateway function and a wireless communication device function.

The management server 100 may have the information on the deployment of all electronic devices and network control devices. Such information may be entered in advance to the management server 100 by the operator. If the operator enters the information on only the network control devices to the management server 100, the management server 100 may have the electronic device information provided by the network control devices.

The descriptions are directed to example cases where the management server 100 is installed in, for example, one of a hotel, a library, a hospital, and an automated factory. In the case of being installed in a hotel, the management server 100 may acquire the information on the network entities deployed in the hotel rooms and convenience facilities in advance. The management server 100 may have the information on the electronic devices under the control of the network control device located or deployed in each hotel room or convenience facility.

The network control devices are deployed in consideration of inter-device interference and coverage overlap because they have predetermined radio communication ranges. For example, if two or more network control devices are required for covering one floor of a large scale automated factory, it may be necessary to consider the radio signal propagation distances of the network control devices. The radio signal propagation distance should be considered even in the case when deploying the network control devices in the hospital rooms or hotel rooms. It should be noted that the radio signal propagation distance may be determined depending on the wireless communication protocol.

The following description is made assuming the network deployment of FIG. 1 in consideration of the above circumstance. It is also assumed that the management server 100 has the information on the electronic device located within the communication ranges of the respective network control devices. The management server 100 has no information on the electronic devices, it may use the device information provided by the network control devices.

The management server 100 may operate in association with the network control devices as described with reference to FIG. 5. A description is made hereinafter of the example embodiment illustrated in FIG. 5.

If a network is initially deployed, the management server 100 may command the network control devices to perform pairing procedures to acquire the device information of the electronic devices located within the radio communication ranges of the respective network control devices. The management server 100 selects one of the network control devices (not shown in FIG. 5) and sends a pairing command message to the selected network control device. FIG. 5 illustrates an example case where the management server 100 sends the pairing command message to the first network control device 201 at step 400.

The pairing command message may include at least one of the information on a number of pairing attempts, basic information about the electronic devices to be paired, and pairing command. The pairing command message is described in more detail hereinafter.

A description is made of the case where the number of pairing attempts is included in the pairing command message. The management server 100 may have the information on the number of electronic devices located within the radio communication range of each network control device based on the information entered by the operator. In the case that the network is deployed in a hotel, the management server 100 may have a room template for a specific guest room and device deployment information. The management server 100 may have the information a network control device, e.g., first network control device, has 5 electronic devices which can be paired therewith in its radio communication range and another network control device, e.g., the second network control device, has 7 electronic devices with can be paired therewith within its radio communication range. Accordingly, the management server 100 may instruct the corresponding network control device to attempt pairing with the electronic devices located with the radio communication range a predetermined number of times which is equal to or greater than the number of electronic devices.

For example, the management server 100 may instruct the first network control device having 5 electronic devices which can be paired therewith in its radio communication range to attempt pairing 5 times or 7 times (number of attempts for acquiring information of the 5 electronic devices that are already installed and 2 electronic devices that may be further installed within the radio communication range).

According to an example embodiment, the management server 100 may transmit to the first network control device the information indicating that 5 electronic devices are located within the radio communication range of the first network control device and to the second network control device the information indicating that 7 electronic devices are located with the radio communication range of the second network control device. The information transmitted from the management server 100 and each network control information may include basic information of the electronic devices (e.g. sensors and temperature controllers). Then the network control device may attempt pairing with the electronic devices based on the basic device information provided by the management server 100. Each network control device may perform additional pairing attempts (e.g., once, twice, and a third more attempts) even after completing the pairing with the electronic devices located within the radio communication range to discover presence of newly added electronic devices.

The network control device may also perform the pairing process additionally at a predetermined interval to discover electronic devices that are newly installed or entered into its radio communication range.

If the pairing command message is received from the management server 100, the network control device 201 may broadcast a response request message within its radio communication range by means of the gateway communication unit 215 at step 402. The electronic devices located within the radio communication range of the network control device 201 may receive the response request message.

The electronic device which has received the response request message may transmit a response message using a collision avoidance protocol. In the example illustrated in FIG. 5, the first electronic device 201-*a* transmits the response message at step 404.

If the response message is received from the first electronic device 201-*a* at step 404, the network control device 201 performs a pairing process with the first electronic device 201-*a* at step 406. In the pairing process, the network control device 201 assigns a pairing identifier (ID) for communication with the first electronic device 201-*a* and prepares communication with the assigned pairing ID. The pairing process is performed between two devices in various types of short range wireless communication network.

The pairing process is briefly described herein. The network control device 201 may perform the pairing process with the electronic devices located within its communication range. The pairing process may be performed slightly differently depending on the wireless communication protocol.

A description is first made of the ZigBee pairing process. In the ZigBee pairing process, the network control device 201 broadcasts a beacon signal to discovery presence of electronic devices. This may be replaced by broadcasting the response request message as at step 402. The electronic devices located within the communication range of the network control device 201 may receive the beacon signal and transmit a response message in reply. The response message may be transmitted using a collision avoidance protocol.

The response message may be an association request message which the electronic device transmits to request for access to the ZigBee network and may be replaced by step 404. That is, it may appear that the paring starts at step 402.

At step 406, the network control device 201 transmits an association response message to the first electronic device 201-a, and the first electronic device 201-a and the network control device 201 may perform an operation for sharing a transport key value as a network key.

During or after the pairing process, the network control device 201 may request to the first electronic device for device information. The device information may include device capability information and manufacturer information. In FIG. 5, the pairing process of step 406 may include an operation of acquiring electronic device information. In the case of using the ZigBee communication protocol, the device information is transmitted using a ZigBee Cluster Library (ZCL) or ZigBee Device Profile (ZDP). If an electronic device is paired with the network control device 201 at step 406, the network control device 201 may broadcast a connection notification message to notify that the electronic device is connected to the network control device 201. After the connection notification has been broadcast, the first electronic device 201-a may broadcast its capability information such that all of the electronic devices located within the network receive the capability information.

The network control device 201 may further request to the electronic device for at least one of device-specific function list information, device information, and function-specific information. Such information can be carried by the messages specified in the wireless communication protocol standard, and detailed descriptions of the messages are omitted herein.

As described above, if the network control device 201 is paired with the first electronic device 201-a, a pairing ID is assigned. The pairing ID is an identifier assigned randomly in the initial pairing process in order for the network control device 201 to identify the electronic device on the wireless network (such as ZigBee, Z-wave, and Bluetooth network) and is not changed. However, if the corresponding electronic device is changed for another one, the pairing process is performed again an thus a new pairing ID is assigned to the newly paired electronic device.

As described above, the network control device may perform the pairing process with a predetermined electronic device and acquire the manufacturer information, capability information, and function-specific information.

A description is next made of the Z-wave pairing process.

The network control device 201 broadcasts a transfer presentation message periodically to permit the electronic devices located within its communication range to join the network. The transfer presentation message may be the response request message aforementioned at step 402. If the transfer presentation message is received, the electronic device broadcast its node information using the aforementioned collision avoidance protocol. The node information may be carried in the response message aforementioned at step 404. It may be understood that the pairing process may actually start at step 402.

Next, the network control device 201 may assign a node identifier (ID) to the electronic device which has transmitted its node information and transmit the assigned ID and a No operation (NOP) message. This may be understood as a pairing ID configuration process.

Then the network control device 201 may use Z-wave protocol messages to request for device information of the electronic devices. Examples of the device information request message include, but are not limited to, a Manufacturer Specific Get request message and Version Get request message specified in the standard.

As described above, the pairing process between the network control device 201 and the electronic device was specified per wireless communication protocol standard. Accordingly, the network control device 201 and the electronic device may perform the pairing process as specified in the corresponding standard.

As descried above, the network control device 201 may acquire the device information after the pairing process and store the acquired device information in its memory. In the case that the gateway function as described with reference to FIG. 3A is installed in a certain device, the device information of the electronic device paired based on the device information may be stored in the gateway memory 213.

The network control device 201 may request for device capability information and manufacturer information during the paring process with the electronic devices located within its communication range. The network control device 201 may determine the electronic devices capable of being paired therewith based on the acquired information and perform the pairing processes to generate device-specific identifiers and store identifiers in its memory.

If the network control device 201 achieves pairing with the first electronic device 201-a in the pairing process as described above, it transmits a pairing result report message including the device information of the first electronic device and pairing information acquired during the pairing process to the management server 100 at step 408.

If the pairing result report message is received at step 408, the management server 100 may store, at step 410, the information on the network control device 201, the pairing information, and the device information of the first electronic device that are carried in the pairing result report message.

In the same manner as described above, the network control device 201 broadcasts the response request message at step 412, receives the response message from the k$^{th}$ electronic device at step 414, and performs the pairing process with the k$^{th}$ electronic device at step 416. Next, the network control device 201 transmits the pairing result report message to the management server 100 at step 418, and the management server 100 stores the information on the network control device at step 420.

Meanwhile, the network control device 201 may store the device IDs and device information of the electronic devices located within its radio communication range in the form as shown in table 1.

TABLE 1

| Device ID | Device Type | Device Name | Vendor Name | Firmware Version | Protocol | ... |
|---|---|---|---|---|---|---|
| 6bffe3d1-b941-412f-8158-eb52b562460d | Relay Switch | A Device | AAA | 13.07 | Zwave | ... |
| 1a9ca13b-7ca3-4e95-8ce4-9ab581a7a242 | Motion Sensor | B Device | BBB | 1.0 | Zigbee | ... |

TABLE 1-continued

| Device ID | Device Type | Device Name | Vendor Name | Firmware Version | Protocol | ... |
|---|---|---|---|---|---|---|
| e48d7da1-c539-4ba0-b6b2-5955ddcda168 | Thermostat | C Device | CCC | 8115F3000F | Zigbee | ... |
| ... | ... | ... | ... | ... | ... | |

Table 1 includes a plurality of columns: Device ID, Device Type, Device Name, Vendor Name, Firmware Version, and Protocol acquired from the device information. The Device ID is the identifier assigned to an electronic device when the device is registered with the network control device or the gateway. The Device ID is distinguished from the Pairing ID of the device. The Pairing ID is a low-level identifier (ID) for use on a wireless network such as ZigBee, Zwave, and Bluetooth, and the Device ID is a high level identifier for use by the management server 100 and network control device 201 in managing registration/control/history of the electronic devices. Other information which is not shown in table 1 may be stored along with the pairing ID. The information stored in the network control device 201 may be provided to the management server 100. The management server 100 may provide information in the form of a list. For example, the information on the electronic devices that are communicating with a predetermined wireless communication device may be referred to as "list information".

The management server 100 may acquire at least the information of table 1 from the network control device 201. The management server 100 may acquire the information formatted as shown in table 1 from all of the network control devices connected thereto and store the acquired information in various formats depending on the network. For example, if the management server and the network control devices are deployed in a hotel, the information as shown in table 1 is stored in addition to the information as shown in table 2.

TABLE 2

| Building ID | Floor ID | Room No. | Device ID | Room template ID | Zone ID | ... |
|---|---|---|---|---|---|---|
| Building A | 8th | 807 | 5bffe3d1-b941-412f-8158-eb52b562460d | Deluxe Room Type | Bed Room 1 | ... |
| Building A | 8th | 807 | 1a9ca13b-7ca3-4e95-8ce4-9ab581a7a242 | Deluxe Room Type | Bed Room 2 | ... |
| Building B | 8th | 808 | e48d7da1-c539-4ba0-b6b2-5955ddcda168 | Suite Room Type | Bath Room 1 | ... |
| ... | ... | ... | ... | ... | ... | |

Table 2 is an example table stored in the management server of the network deployed in a hotel. The information items listed in table 2 may be included in the aforementioned list information. In the case that the network is deployed in a hotel, the management server 100 may further store the information for mapping the device ID per Building/Floor/Room for hotel rooms management, room type (Room Template) ID, and device zone information. If the network is deployed in an automated factory, a school, a library, or a hospital, table 2 may be modified according to the place where the network is displayed, and the template may be mapped to the modified table. If a certain electronic device may be installed at a predetermined position which is mapped to the stored information such that its position is located on the room template. Detailed description thereof is made in more detail later with reference to accompanying drawings.

As described above, the management server 100 may store the management server database in the form of table 2 and, if a backup server exists, the corresponding data may be stored in the backup server. Particularly, the information of the table 1 is added to the hidden part of table 2. In the case that the backup server is present, the backup data retention period may be managed in the server database 105 of the management server 100. The backup data retention period may be set to 1 to 180 days by the operator or fixed to a period specified in the law per country. The backup data may be restricted in size. The backup data size per electronic device or network control device may be determined according to the storage capacity of the service data base 105 or the backup server, and the total data storage capacity may be restricted. The total data storage capacity may be set to a value in the range of 1-999,999 MB by the operator or preconfigured in the in the system design phase.

Although the above description has been directed to the case where the data are stored in the management server database 105 or a backup server, the data may be stored in an external storage device designated by the user, e.g., an external hard disk, an optical storage medium, an external semiconductor memory, and an electromagnetic storage medium.

Although the above description has been directed to the case where all of the electronic devices are located in the radio communication range of the network control device, the procedure of FIG. 5 may be applicable to the case where new electronic devices enter the radio communication range of the network control device. For example, the network control device may broadcast a response request message periodically in order for any newly added electronic device to join the network by transmitting a response message in reply to the response request message. Upon receipt of the response message, the network control device starts pairing with the corresponding electronic device.

If the management server 100 achieves pairing with a new electronic device, the operator may enter the information on the electronic device (e.g., template marking the position of the electronic device and/or name of the electronic device) to the management server 100.

The management server 100 may store the information on the alarm trigger conditions of the respective network entities and the operation to perform. For example, the management server 100 may store the information on the condition to determine whether the network control device is disconnected before determining the non-response status as out-of-service state. The management server 100 may store the condition information per electronic device as well as the condition information per network control device. Such information is device-specific and thus described briefly herein with some examples.

For example, an alarm trigger condition of an electric lamp/socket capable of communicating a network control device is configured such that connection failure state detected in a predetermined period is determined as disconnection state. It may also be possible to determine the connection failure state detected in a predetermined period as the out-of-service state. Also, if the residual battery capacity of an electronic device is less than a predetermined level, it may be determined that the electronic device is in the low power state.

Figure 6:
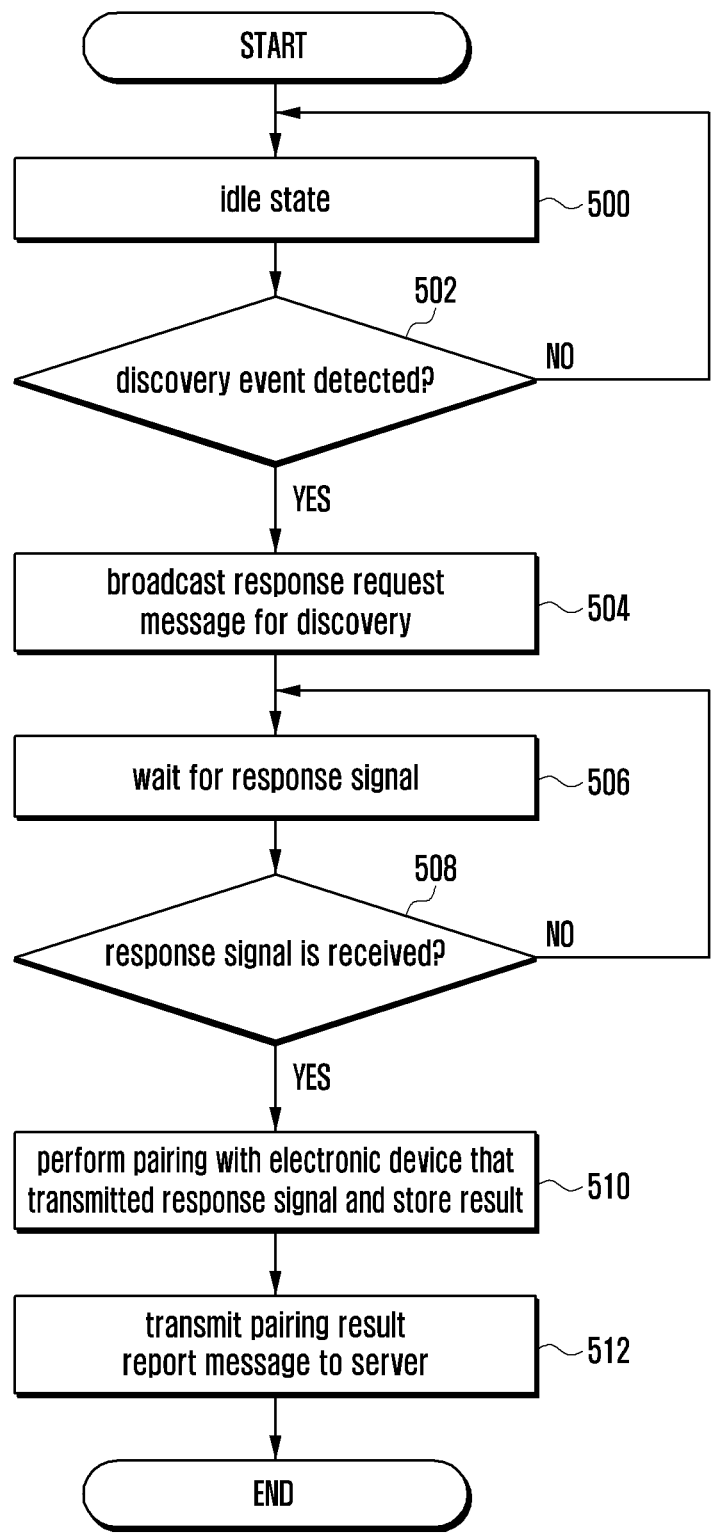
FIG. 6 is a flowchart illustrating an example pairing procedure of a network control device according to an example embodiment of the present disclosure.

FIG. 6 is a flowchart illustrating an example pairing procedure of a network control device according to an example embodiment of the present disclosure.

The embodiment of FIG. 6 is described under the assumption that the network control device is configured as illustrated in FIG. 3A.

The network control device may be operating in an idle state at step 500. In the idle state, the network control device may detect an execution request input by the user, a timeout event of a timer running in association with a predetermined operation, and a command transmitted by the management server 100. It should be noted that FIG. 6 is directed to an example where the network control device discovers presence of electronic devices located within its communication range when it is initially powered on.

The network control device operating in the idle state may determine whether a discovery event is detected at step 502. There may be various types of discovery events. For example, if a fairing request is generated by the management server 100 as in FIG. 5, it may be determined that a discovery event has occurred. Also, a timer configured for discovering electronic devices periodically may trigger the discovery event. In a particular case, if a preconfigured condition is fulfilled, this may trigger the discovery event. In the case that the system of the present disclosure is deployed in a hotel, it may be possible to determine the presence/absence of the guest in the room based on the information collected by a door open sensor and a motion sensor. If it is sensed that the guest is absent, this may trigger the discovery event.

If the discovery event is detected, the network control device generates a discovery signal and broadcasts the discovery signal along with a response request message at step 504. For example, the gateway control unit 211 may generate a response request message based on the wireless communication protocol stored in the gateway memory 213 and control the gateway communication unit 215 to broadcast the response request message such that the electronic devices located within its communication range receive the response request message. The response request message may be configured in a format determined depending on the wireless communication protocol, the message being called differently depending on the protocol. For example, the response request message may be the beacon signal of the ZigBee communication protocol or the transfer presentation message of the Zwave communication protocol.

In this way, the network control device broadcasts the response request message at step 504 and waits for a response signal at step 506. If it is determined at step 508 that a response signal is received from a certain electronic device, the network control device performs a pairing process with the corresponding electronic device and stores the pairing result at step 510. Through the pairing process, the network control device may acquire information of the corresponding electronic device. The pairing process and device information acquired in the pairing process have been described in detail with reference to FIG. 5 and thus detailed description thereof is omitted herein.

The network control device may perform the pairing process with the corresponding electronic device and store the device information acquired through the pairing process at step 510. The network control device transmits to the management server 100 a pairing result report message including the electronic device information and the network control device information at step 512. Steps 504 to 512 may be repeated for the electronic devices entering the communication range of the network control device. As described with reference to FIG. 5, the management server 100 may instruct the network control device to repeat the process multiple times equal to the number of pre-registered electronic devices, and the network control device may be configured to perform the process of steps 504 to 512 multiple times equal to or greater than the value received from the management server 100 (e.g., if the management server instructs to perform the process 10 times, the network control device may be configured to perform the process 10+3 times). For example, the management server 100 may instruct each network control device to perform the pairing process at a predetermined interval.

Figure 7A:
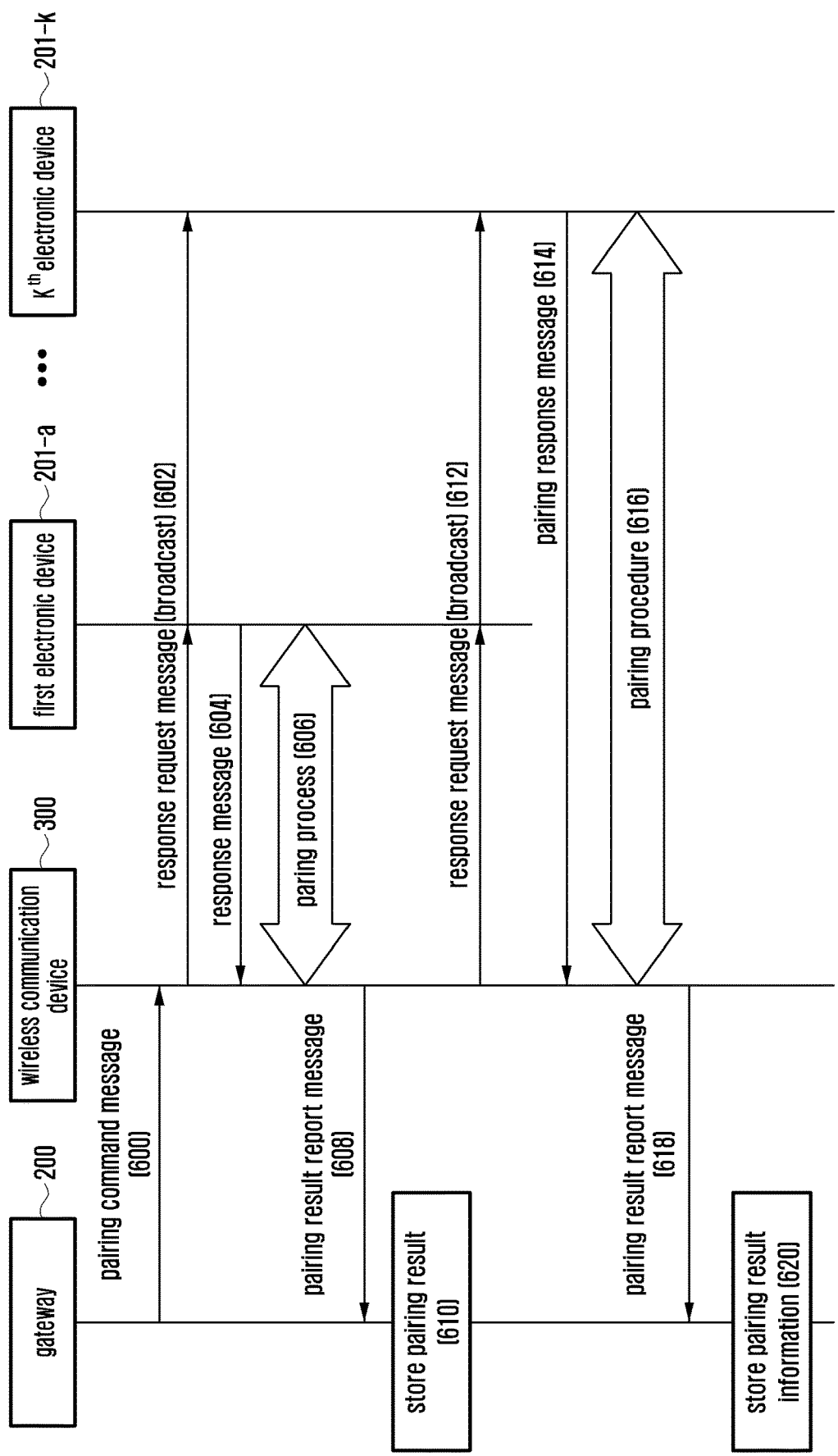
FIG. 7A is a signal flow diagram illustrating an example pairing procedure between a gateway and a wireless communication device according to an example embodiment of the present disclosure.

FIG. 7A is a signal flow diagram illustrating an example pairing procedure between a gateway and a wireless communication device according to an example embodiment of the present disclosure.

The embodiment of FIG. 7A is described under the assumption that the gateway and wireless communication device are configured as illustrated in FIGS. 3B and 4 respectively. In FIG. 7A, the gateway receives a pairing command message from the management server 100 as described with reference to FIG. 5. The operations which is identical with those in FIG. 5 are just described briefly.

As described with reference to FIG. 5, the gateway 200 may receive a pairing command message from the management server 100. When the pairing command message is received from the management server 100, the gateway may perform the operation described with reference to FIG. 5 or the operation of FIG. 7A. If the gateway 200 is not provided with a wireless communication unit, it may transmit the pairing command message to the wireless communication device 300 at step 600. The pairing command message may include at least one of the information on a number of pairing attempts, basic information of the electronic devices to be paired, and pairing command. In the following description, it is assumed that the pairing command message includes the information on a number of pairing attempts and basic information about the electronic devices to be paired (e.g., number of electronic devices).

If the pairing command message is received through the gateway connection unit 301, the control unit 311 stores the pairing command message in the memory 305 temporarily and generates an response request message based on the previously stored information. Then the control unit 311 broadcasts the response request message within the radio communication range of the wireless communication device 300 by means of the wireless communication unit 307 at step 602. The response request message may be identical with the response request message described with reference to FIG. 5. The response message transmitted by the first electronic device 201-a at step 604 may also be identical with the response message described with reference to FIG. 5, and the pairing process of step 606 may be identical with the pairing process described with reference to FIG. 5.

If the pairing process with a certain electronic device has been completed, the wireless communication device 300 may send the gateway 200 a pairing result report message at step 608. The pairing result report message may be identical with or similar to the pairing result report message which the network control device sends to the management server 100 as described above. If the gateway 200 and the wireless communication device 300 are implemented separately, the pairing result report message transmitted by the wireless communication device 300 may include electronic device information, wireless communication device information, and a pairing identifier. Herein the wireless communication device information may include at least one of a device name, a vendor name, a firmware version, and available wireless communication protocols.

If the pairing result report message is received, the gateway 200 may store the pairing result information at step 610. The pairing result information may be stored in the format of table 1. Although not illustrated in FIG. 7A, the wireless communication device 300 may store the pairing result whenever a pairing with an electronic device is achieved. Table 3 exemplifies part of the data format of the information stored when a pairing with an electronic device is achieved.

every pairing process is completed or all of the pairing processes are completed by means of the pairing result report message. FIG. 7B is directed to the case where the pairing result report message is transmitted to the management server after pairing with all of the electronic devices are achieved.

If the pairing process is completed, the gateway #1 201 may transmit a pairing result report message to the management server 100 at step 630. The pairing result report message may include the information on the gateway #1 201 and the wireless communication device 300, electronic device information, a network ID (e.g., PAN ID for ZigBee) for use between the paired wireless communication device and electronic device, a pairing ID, channel information, and a network key. The management server 100 may sort and

TABLE 3

| Network ID (PAN ID) | Pairing ID (Node ID) | Device MAC | Channel | Network Key | ... |
|---|---|---|---|---|---|
| 084D | 78EB | 000A8000E138278E | 13 | 61 9E C2 3C ED 69 88 D3 78 87 F6 6E 8E DD 17 AB | ... |
| 084D | E4DD | 000D6F00010E3AA4 | 13 | 1C 7D 25 63 93 31 D7 AC 9C A7 EA E8 34 92 B0 52 | ... |
| 084D | E84D | 000A8000FE38F4C0 | 13 | 35 75 88 73 A8 C9 48 B1 72 F9 38 57 AF 23 7B 3A | ... |
| ... | ... | ... | ... | ... | ... |

Although table 3 shows the communication-related information according to the present disclosure, the wireless communication device may store various information of the paired electronic device. For example, the information may include various wireless communication device specification information such as a wireless communication device name, a vendor name, and a firmware information.

The device list information as shown in table 3 may be stored in the gateway 200 and the management server 100 as high level entities as well as in the wireless communication device 300. Accordingly, table 1 may further include the information contained in table 3. Also, table 2 may further include the information contained in table 3.

If the pairing with the first electronic device 201-*a* is achieved, the wireless communication device 300 may broadcast the response request message to perform the pairing process with the next electronic device at step 612. After the response request message is broadcast, an electronic device, e.g. the k*th* electronic device 201-*k*, may transmit a pairing response message to the wireless communication device at step 614, and then the pairing process is performed at 616. If the pairing process has been completed, the wireless communication device 300 may store the pairing information in the form of table 3 and transmit a pairing result report message to the gateway 200 at step 618. The gateway 200 may store the pairing result information at step 620.

FIG. 7B is a signal flow diagram illustrating an example procedure for gateways to report pairing results to a management server according to an example embodiment of the present disclosure.

It should be noted that the signals flows for the management server 100 to transmit the pairing command message to the gateways 201, . . . , 20*n* are omitted. It should also be noted that the pairing process which the gateways 201, . . . , 20*n* are performing by means of the wireless communication device is omitted.

The gateway #1 may perform the pairing process with the electronic devices located within the radio communication range of the wireless communication device by means of the wireless communication device as described with reference to FIG. 7A and store the pairing results. The pairing result may be transmitted to the management server 100 after store the received information at step 632. For example, the management server 100 may store the electronic device information and gateway information included in the room template for use in management. The management server 100 may store the information for restoring data separately when an electronic is malfunctioning (e.g., restoring data lost during the battery change or caused by malfunction). Such backup data is stored in a backup server (not shown) or a duplicate database (not shown).

Such operations may be performed by gateway. That is, if the pairing operation of the gateway #n 20*n* is completed, the gateway #n 20*n* transmits a pairing result report message to the management server 100 at step 640 and thus the management server 100 stores the information carried in the message at step 642.

In this way, the management server 100 may acquire the information on the electronic devices located within the communication range of the wireless communication device. Particularly when the network is initially deployed, the management server may configure the pairing process to be performed automatically between the gateway and the electronic devices without operator's command on the spot or using a control device and acquire the information for use in managing the gateway and wireless communication device as well as the electronic devices from the pairing result data.

Figure 7C:
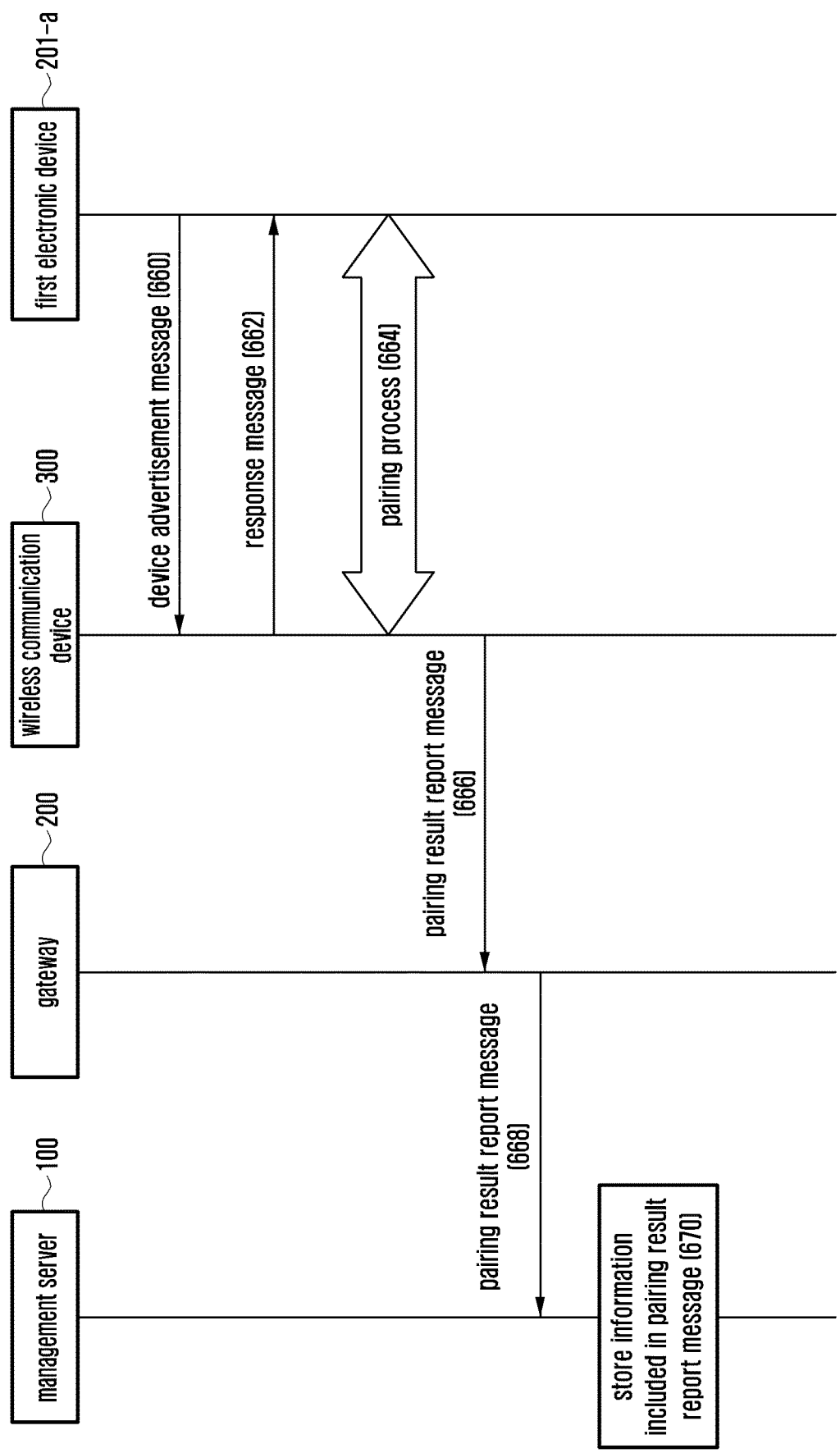
FIG. 7C is a signal flow diagram illustrating example signal flows when a new electronic device is installed within a radio communication range of a wireless communication device or an electronic device requests for pairing according to an example embodiment of the present disclosure.

FIG. 7C is a signal flow diagram illustrating example signal flows when a new electronic device is installed within a radio communication range of a wireless communication device or an electronic device requests for pairing according to an example embodiment of the present disclosure.

In reference to FIG. 7C, an electronic device entering the radio communication range of a newly deployed wireless communication device, a new electronic device entering the radio communication range as a replacement, or an electronic device configured to broadcast its presence as specified in a wireless communication protocol may broadcast a device advertisement message to advertise its presence at step 660. The device advertisement message may include the information requesting for response to other devices within its communication range like the response request message and the information requesting to an electronic device operating as a master of the network for performing wireless communication.

In the case of requesting to other electronic devices for response, the electronic devices located within the radio signal propagation range of the transmitting electronic device transmit response messages and thus the transmitting electronic device acquires the information on the electronic devices located within its communication range from the response messages. An electronic device may broadcast a message including information requesting to the master device of the network, e.g., wireless communication device 300, for communication with it within the communication range of the wireless communication device. Typically, an electronic device may receive the signal broadcast by the master device, advertise its information, and broadcast an advertisement message to find the master device.

If the device advertisement message is received, the wireless communication device 300 may transmit a response message to the corresponding electronic device at step 662 and perform the pairing process at step 664. The pairing process is performed as described above and thus detailed description thereof is omitted herein. Next, the wireless communication device 300 transmits a pairing result report message to the gateway 200 at step 666. The wireless communication device 300 may store the information on the first electronic device in its memory.

If the pairing result report message is received at step 666, the gateway 200 may forward the pairing result report message to the management server 100 at step 668. The gateway 200 may store the information provided by the wireless communication device 300 in its memory. If the pairing result report message is received at step 668, the management server 100 may store the information acquired from the pairing result report message in the database and/or a backup server at step 670.

The example embodiment of FIG. 7C is with the same or similar to the above-described example embodiments with the exception that an electronic device entered the wireless network or configured to broadcast its information according to a wireless communication protocol advertises its presence.

Figure 8:
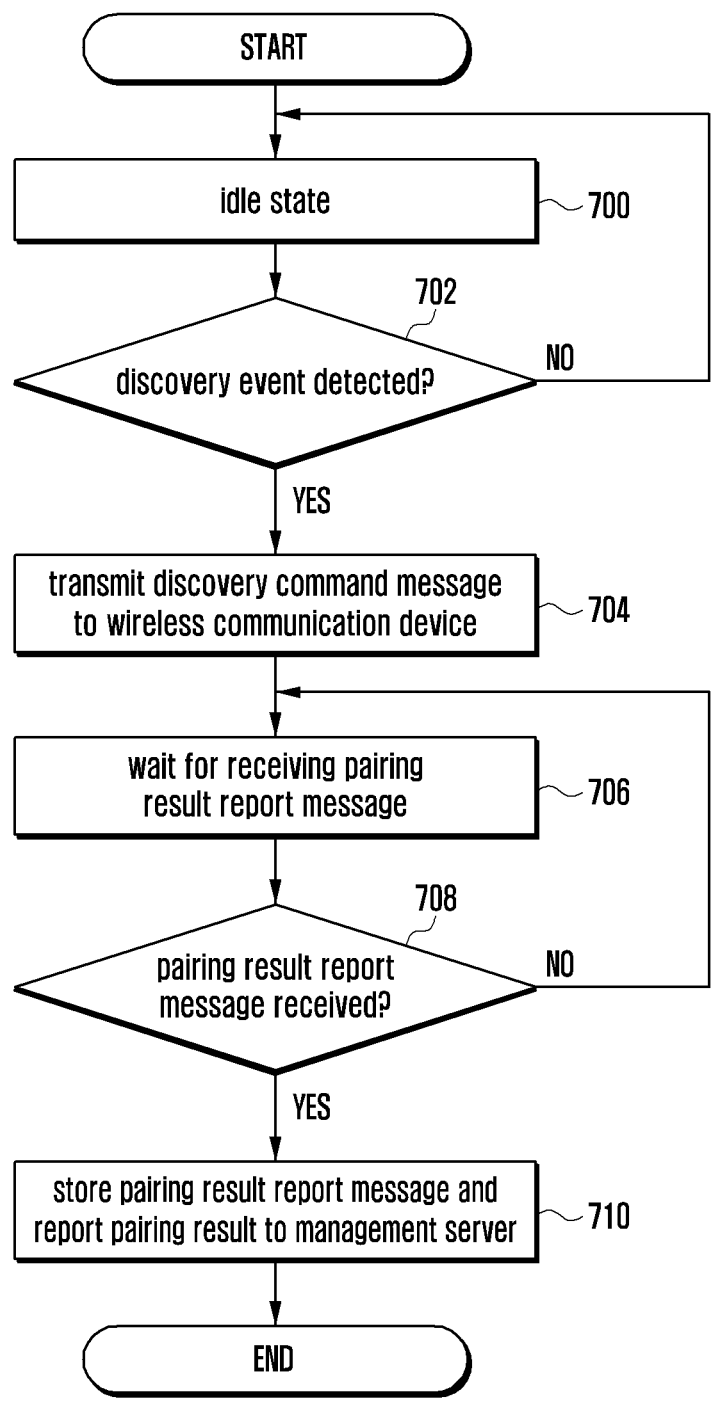
FIG. 8 is a flowchart illustrating an example procedure for a gateway to control a wireless communication device to achieve pairing with an electronic device according to an example embodiment of the present disclosure.

FIG. 8 is a flowchart illustrating an example procedure for a gateway to control a wireless communication device to achieve pairing with an electronic device according to an example embodiment of the present disclosure.

The gateway control unit 211 is operating in an idle state at step 700. In the idle state, the gateway control unit 211 may receive a predetermined control signal from the management server 100 or input by a user/operator, or detect a device discovery event occurring at a predetermined interval. In the idle state, the gateway control unit 211 determines at step 702 whether a discovery event is detected. If the discovery event is detected, the procedure goes to step 704; otherwise, if no discovery event is detected, the gateway control unit 211 stays in the idle state.

Here, the discovery event may be receiving discovery command transmitted from the management server 100 to the gateway, timeout of a timer running on the network control device or the gateway for periodic discovery, or receiving a discovery command input to the gateway by the operator. The discovery event may also be detecting user's absence based on the information collected by means of a door open sensor and a motion sensor. In the present disclosure, it is assumed that the discovery operation is triggered by one of the aforementioned events.

If a discovery event is detected, the gateway control unit 211 transmits a discovery command message to the wireless communication device 300 by means of the external device connection unit 225 at step 704. The gateway control unit 211 waits for receiving a pairing result report message from the wireless communication device at step 706. The pairing result report message includes the information acquired through the pairing process with one or more electronic devices and configuration result information. The device information acquired through the pairing process may include the electronic device information, and the configuration result information may include the pairing identifier, protocol information, channel information, and network key information.

If the pairing result report message is received from the wireless communication device by means of the external device connection unit 225 at step 708, the gateway control unit 211 may store the pairing result report message and transmit to the management server 100 the pairing result report message along with the gateway information at step 710. At this time, the management server 100 may store the information as shown in tables 1, 2, and 3.

Figure 9:
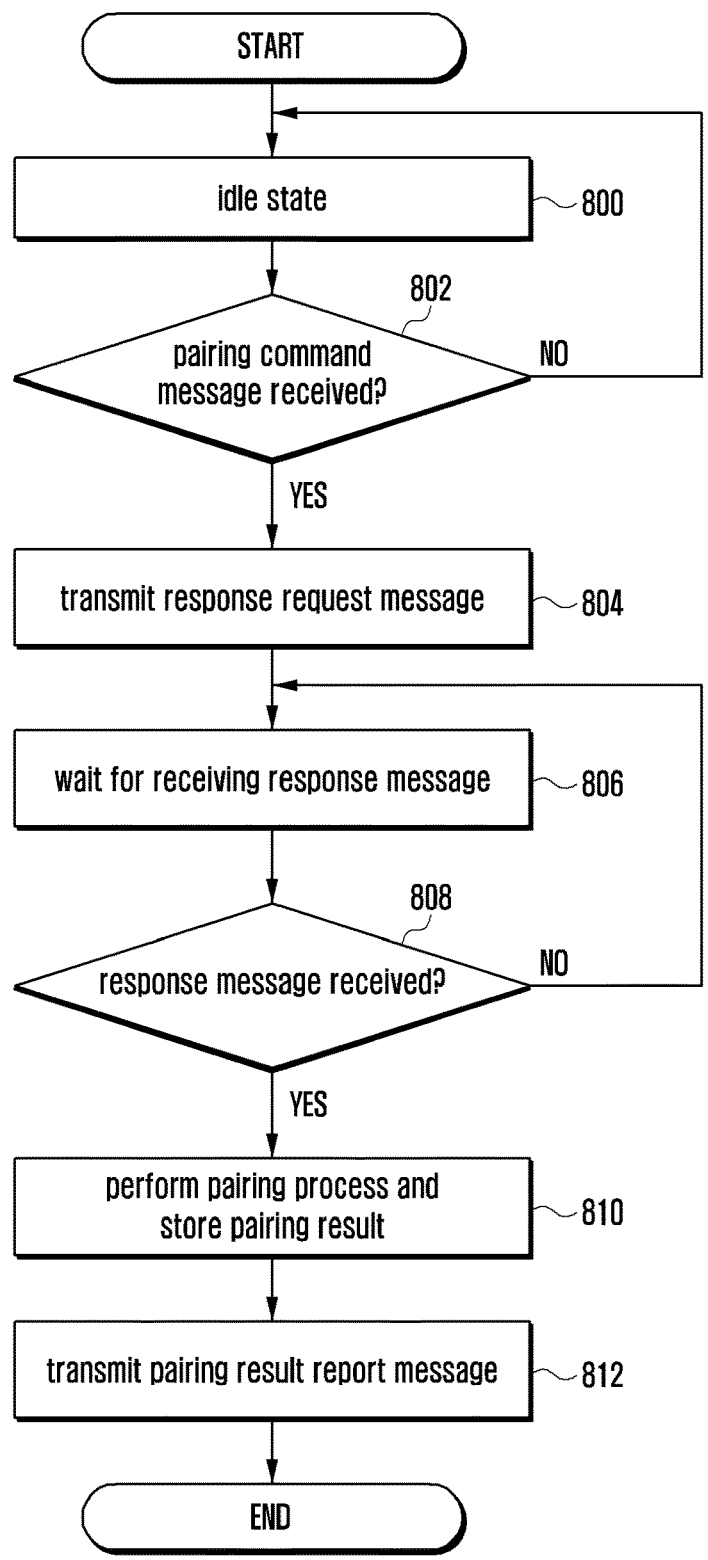
FIG. 9 is a flowchart illustrating an example procedure for a wireless communication device to perform a pairing process with an electronic device located within its radio communication range according to an example embodiment of the present disclosure.

FIG. 9 is a flowchart illustrating an example procedure for a wireless communication device to perform a pairing process with an electronic device located within its radio communication range according to an example embodiment of the present disclosure.

The control unit 311 of the wireless communication device is operating in an idle state at step 800. In the idle state, the wireless communication device may wait for receiving a device advertisement message broadcast by electronic devices and a predetermined control signal form a gateway and detecting an event of a timer for generating a signal for checking the state of the electronic device and a key input made by a user. FIG. 9 is directed to the control operation for controlling the pairing process with the electronic devices within the radio communication range of the wireless communication device, and description is made of the control operation according to the present disclosure.

The control unit 311 may determine whether a pairing command message is received from the gateway through the gateway connection unit 301 at step 802. If the pairing command message is received at step 802, the procedure goes to step 804; otherwise if no pairing command message is received, the procedure returns to step 800.

At step 804, the control unit 311 of the wireless communication device generates a response request message and broadcasts the response request message by means of the wireless communication unit 307. The control unit 311 waits for receiving a response message from an electronic device at step 806. If no response message is received in a predetermined time duration, the control unit 311 may repeat the operation of step 804 a predetermined number of times.

The control unit 311 determines whether a response message is received by the wireless communication unit 307 at step 808. If a response message is received, the procedure goes to step 810; otherwise if no response message is received, the procedure goes to step 806.

At step 810, the control unit 311 may control the wireless communication unit 307 to perform the pairing process with the electronic device which has transmitted the response message using one of the above described schemes. The control unit 311 may acquire the electronic device information and configure a network ID pairing ID, protocol information, channel information, and network key information between the wireless communication device and the electronic device. The control unit 311 acquires the electronic device information through the pairing process and store the information configured through the pairing process in the memory 305 of the wireless communication device. The control unit 311 of the wireless communication device generates a pairing result report message including the acquired information and the configured information and transmits the pairing result report message to the gateway at step 812.

<State Inspection of all Entities>

Descriptions are made of the state inspection procedures for the case where the gateway function and the wireless communication device function are integrated into a network control device and the case where the gateway and wireless communication device are implemented as separate entities with reference to accompanying drawings.

In the following, the description is made of the state inspection procedure for the electronic devices connected to the network control device or the wireless communication device and then the state inspection procedure for the wireless communication device, gateway, and network control device with reference to accompanying drawings.

Figure 10:
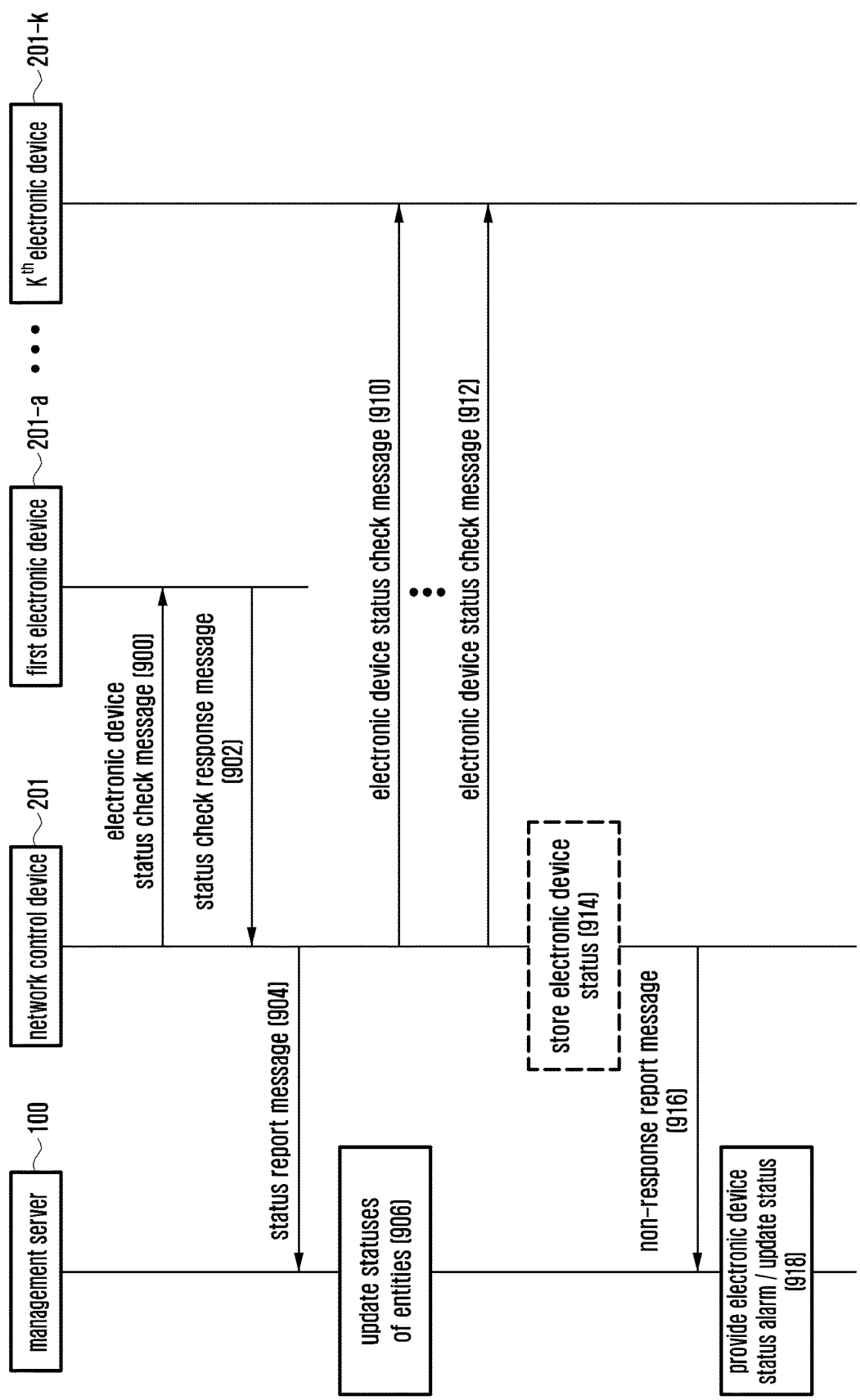
FIG. 10 is a signal flow diagram illustrating an example procedure of checking states of electronic devices and reporting the check result according to an example embodiment the present disclosure.

FIG. 10 is a signal flow diagram illustrating an example procedure of checking states of electronic devices and reporting the check result according to an example embodiment of the present disclosure.

It should be noted that FIG. 10 is directed to the procedure of checking the states of the electronic devices when the gateway and the wireless communication device are integrated into the network control device as a signal entity.

The network control device 201 may transmit a state check request message to a predetermined electronic device, e.g., the first electronic device 201-*a* at step 900. The network control device 201 may transmit the state check request message in two cases. First, the network control device 201 may transmit the state check request message for checking the state of a paired electronic device in response to a status check command message transmitted by the management server 100. Here, the status check command message transmitted by the management server 100 may be used to request for checking the states of the network control device and the entities connected to the network control device. The management server 100 may instruct the network control device 201 to check the states of the entities in response to a user's request and when a predetermined condition is fulfilled. The predetermined condition may be configured differently depending on the place where the network is deployed. In the case that the network is deployed in a hotel, the condition may be fulfilled when a guest registered to a hotel room is absent.

The example embodiment of FIG. 10 is directed to the case of checking the states of the electronic devices connected to the network control device. A description is made of the operation of checking the states of the network control device or the gateway in detail with reference to accompanying drawings.

The network control device 201 may transmit the state check request message for checking the state the electronic devices paired therewith periodically.

Step 900 may correspond to one of the above two cases. If an electronic device status check message is received, the first electronic device 201-*a* may transmit a state check response message to the network control device at step 902. The electronic device status check message transmitted to the first electronic device 201-*a* is transmitted to check whether the corresponding electronic device is active and thus the electronic device which has received the electronic device status check message may immediately transmit a reply indicating that it is in the active state. At this time, the network control device 201 and the first electronic device 201-*a* may communicate using the pairing ID. The electronic device status check message may be transmitted to a specific electronic device unlike the above-described response request message.

If the electronic device status check message is received, the first electronic device 201-*a* may transmit a state response message to the network control device 201 at step 902. The state response message may include the status information of the first electronic device, e.g., information indicating that it operates normally. For example, if the first electronic device 201-*a* is a device for monitoring the relay switches for supplying power to certain devices to check whether they operate normally, it may provide the network control device 201 with the information whether the relay switches operate normally. If the first electronic device 201-*a* is operating on battery power, it may provide the network control device 201 with the battery status information. The state response message may further include urgent situation information of the electronic device. For example, the urgent situation may be the case where the residual battery capacity of the electronic device which is operating on the battery power is less than a threshold residual battery capacity. In the case that the electronic device is a relay switch or a device supplying power to other devices, the urgent situation may be an overcurrent state or rapid load factor fluctuation status information.

If the state response message is received, the network control device 201 may generate a status report message including the status information of the electronic device and its own and transmit the status report information to the management server 100 at step 904. The management server 100 may update the status report message reception time information and the status information of the respective entities in a table of the database at step 906. If necessary, the management server 100 may alert the network operator based on the urgency level information.

After step 904, the network control device 201 may transmit the state check request message to one of the electronic devices at step 910. If no response is received in a predetermined time period, the network control device 201 may perform retransmission a predetermined number of times. Assuming that the predetermined number of retransmissions is 3 and the state response message checking is performed at an interval of 5 seconds, if no state response message is received in 5 seconds after transmitting the electronic device status check message at step 910, the network control device 201 may retransmit the electronic device status check message. If no state response message is received in response to the retransmitted electronic device status check message, the network control device 201 may retransmit the electronic device status check message again at step 912.

If no state response message is received from the corresponding electronic device in 5 seconds after the last retransmission, the network control device 201 updates the state of the corresponding electronic device to non-response status at step 914 and transmits a non-response report message to the management server 100 at step 916. The non-response report message may include the electronic device information, non-response status information, and network control device information.

The electronic device status check message is transmitted from the network control device 201 to the electronic devices at an interval determined according to the wireless communication protocol or configured by the operator. In the case of using the ZigBee protocol, a link status request message is transmitted at an interval of 30 seconds.

If the non-response report message is received, the management server 100 provides the operator or a manager with the information on the state of the corresponding device and updates the status report message reception time information and status information per entity in a table of the database at step 918. The management server 100 may alert the operator and provide the operator with the information necessary for changing or inspecting the corresponding device. In the case that the network is deployed in a hotel, the management server 100 may check whether a room key is placed inside the corresponding hotel room. In this case, if it is determined that the hotel room occupied by a guest is empty, the management server 100 may provide the information necessary for changing or inspecting the corresponding device in consideration of the importance of the electronic device. A description is made of the case where the management server generates an alarm in detail hereinafter with reference to accompanying drawings.

Descriptions are made of the operations of the network entities in more detail with reference to accompanying drawings.

Figure 11:
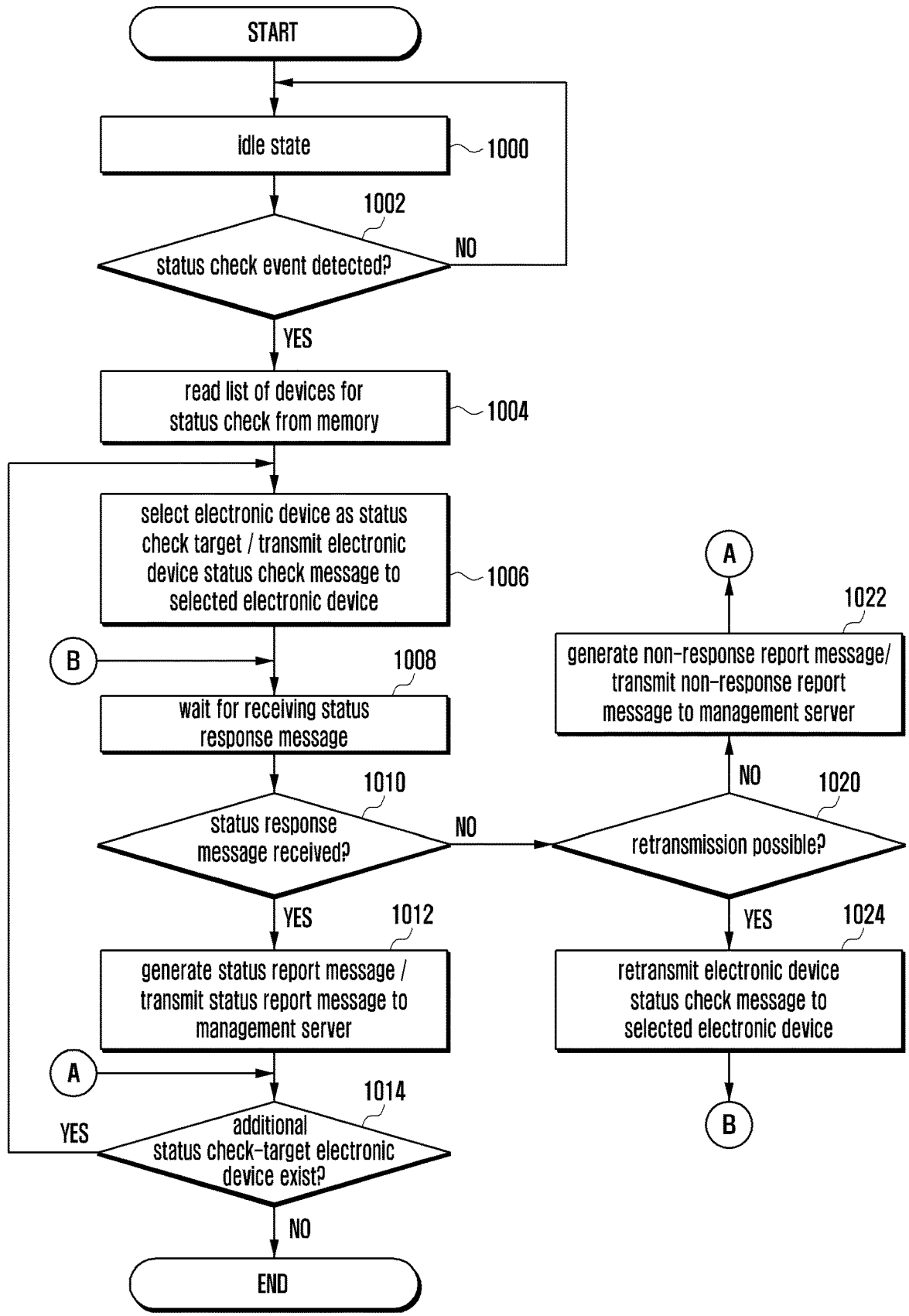
FIG. 11 is a flowchart illustrating an example procedure for a network control device to check the status of an electronic device according to an example embodiment of the present disclosure.

FIG. 11 is a flowchart illustrating an example procedure for a network control device to check the status of an electronic device according to an example embodiment of the present disclosure.

The example embodiment of FIG. 11 is described under the assumption that the network control device is configured as illustrated in FIG. 3A. The gateway control unit 211 is operating in an idle state at step 1000. In the idle state, the gateway control unit 211 waits for a predetermined command or an event. The command may be input by the user or the operator, and the event may occur at a predetermined interval. The gateway control unit 211 may determine whether a status check event is detected at step 1002. The status check event may be detected when an electronic device status check command message is received from the management server 100 as a high level entity or a timeout of the timer configured for periodic status check operation arrives.

If a status check event is detected, the procedure goes to step 1004; otherwise if no status check event is detected, the procedure returns step 1000. At step 1004, the gateway control unit 211 reads out a list of the electronic devices located within the communication area of the gateway from the gateway memory 213. At this time, the list may include one or more electronic devices. It is likely that the number of electronic devices located within the radio communication range of the network control device is two or more and thus the following description is made under the assumption of the case where the list includes two or more electronic devices.

The gateway control unit 211 selects one of the electronic devices contained in the list as an inspection target at step 1006. The gateway control unit 211 may select the inspection target device randomly or in the order stored in table 1 or in the reverse order. It should be noted that the device selection is restricted to any method. After selecting the inspection target device, the gateway control unit 211 generates an electronic device status check message and controls the gateway control unit 215 to transmit the message to the corresponding electronic device. As described above, the electronic device may be identified by a pairing ID.

At step 1008, the gateway control unit 211 waits for receiving a status response message from the electronic device to which the electronic device status check message has been transmitted. That is, the gateway control unit 211 may wait for receiving the status response message by means of the gateway communication unit 215. If it is determined at step 1010 that the status response message is received, the gateway control unit 211 forwards the status report message to the management server at step 1012. The status report message may include the status response message reception time information, the electronic device information, and the network control device information. As described above, the status report message may include urgent situation information.

After step 1012, the gateway control unit 211 may determine whether there is another inspection target at step 1014. That is, the gateway control unit 211 determines whether there is any electronic device uninspected yet among the electronic devices listed in table 1. If there is another inspection target, the procedure goes to step 1006; otherwise if there is no inspection target any more, the procedure may end.

If it is determined at step 1010 that no status response message is received in a predetermined time, the gateway control unit 211 determines at step 1020 whether retransmission is possible. Assuming that the electronic device status check message can be retransmitted three times as described with reference to FIG. 10, if no response message is received in response to the initial transmission in the predetermined time period, this means that retransmission can be performed. In this case, the gateway control unit 211 may retransmit the electronic device status check message to the selected electronic device at step 1024. Next, the gateway control unit 211 may perform the operation of step 1008.

Otherwise if no status response message is received even after transmitting the electronic device status check message to the corresponding electronic device three times, the gateway control unit 211 generates the non-response report message and controls the gateway communication unit 215 to transmit the non-response report message to the management server at step 1022. Afterward, the gateway control unit 211 may perform the operation of step 1014.

Figure 12:
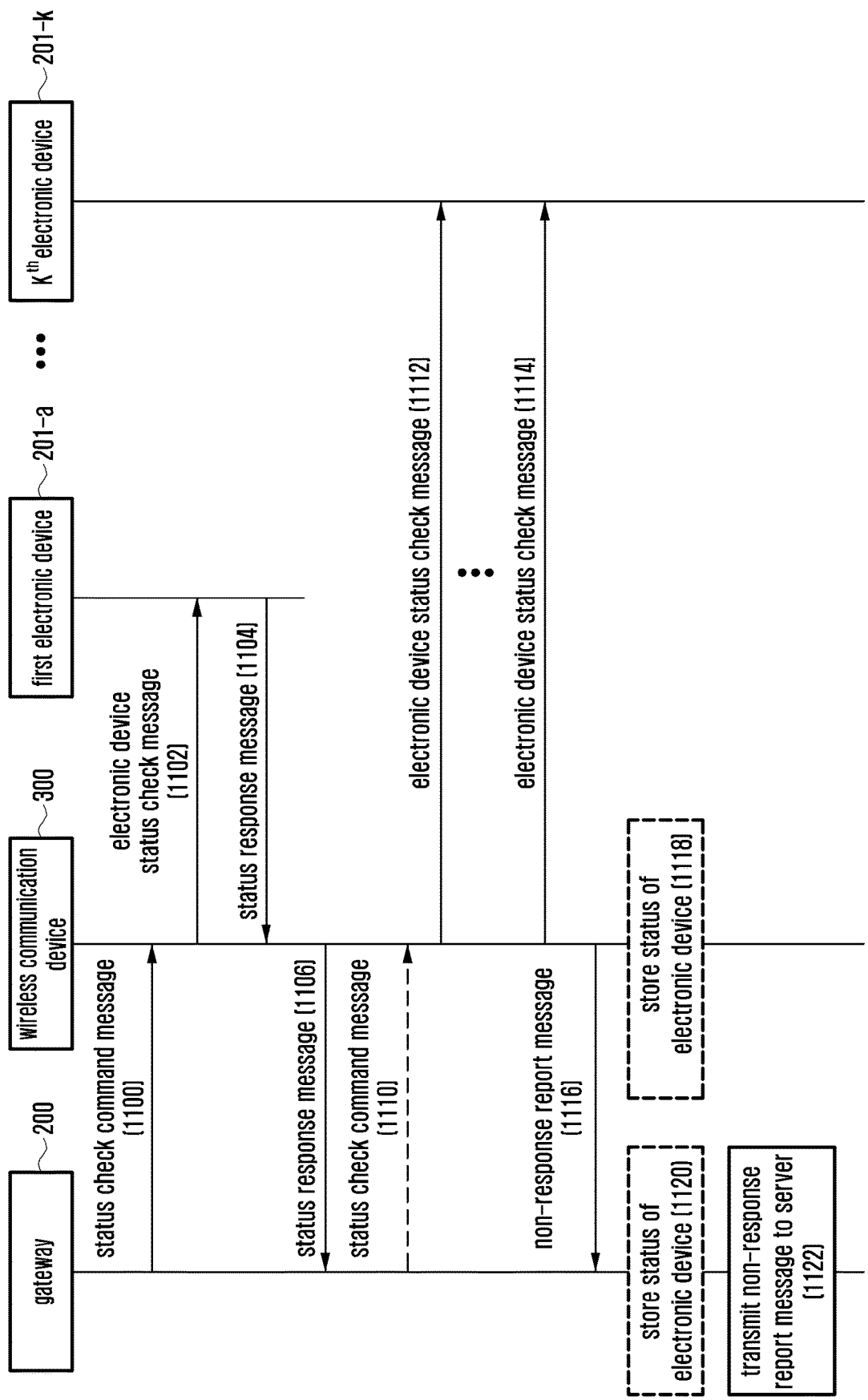
FIG. 12 is a signal flow diagram illustrating an example electronic device status check procedure when the gateway and the wireless communication device are implemented as separate entities according to an example embodiment of the present disclosure.

FIG. 12 is a signal flow diagram illustrating an example electronic device status check procedure when the gateway and the wireless communication device are implemented as separate entities according to an example embodiment of the present disclosure.

The example embodiment of FIG. 12 is directed to the case where the gateway 200 and the wireless communication device 300 are implemented as separate entities. It is assumed that the gateway is configured as illustrated in FIG. 3B, and the wireless communication device is configured as illustrated in FIG. 4.

At step 1100, the gateway 200 may transmit a status check command message to the wireless communication device 300, which transmits a state check message to electronic devices, e.g., the first electronic device 201-a. As described above, the gateway 200 may transmit the status check command message in two cases. That is, first, the management server 100 may transmit the status check command message to the gateway 200, and second, the gateway 200 may transmit the status check command message periodically in order for the wireless communication device 300 to transmit a status check message for checking the status of the electronic devices. The operation of step 1100 may be performed in one of the two cases.

If the status check command message is received, the wireless communication device 300 may transmit an electronic device status check message to the first electronic device 201-a at step 1102.

Although FIG. 12 illustrates the case where the wireless communication device 300 receives the status check command message from the gateway 200 at step 1100, it may also be possible for the wireless communication device 300 to generate the electronic device status check message to the corresponding electronic device without receipt of the status check command message. For example, if the wireless communication device 300 is capable of checking the status of the electronic device located within its communication range periodically, the wireless communication device 300 may check the status of the electronic devices and report the check result although no status check command message is received.

In the following description, it is assumed that the wireless communication device 300 receives the status check command message from the gateway 200 for convenience of explanation. The status check command message may be used to command the wireless communication device 300 to check the status of a specific electronic device or all of the electronic devices located within the radio communication range of the wireless communication device.

If the status check command message received at step 1100 instructs to check the status of a specific electronic device, e.g., the first electronic device 201-a, the wireless communication device 300 may transmit the electronic device status check message to the first electronic device 201-a. In this case, it may be necessary to receive the status check command message per electronic device, step 1110 may be performed repeatedly. If the status check command message received at step 1100 instructs to check the status of all electronic devices, step 1110 may be omitted in FIG. 12. In FIG. 12, the status check command message transmission operation at step 1110 is expressed as a dotted line because the operation of step 1110 is optional.

If the status check command message instructs to check the status of all electronic devices located within the radio communication range of the wireless communication device 300, the wireless communication device 300 may read out the information from the database as exemplified by table 3 to transmit the electronic device status check message to the respective electronic devices. If the status check command instructs to check the status of a specific electronic device, the wireless communication device 300 may transmit the electronic device status check message to the corresponding electronic device.

If the status check message is received, each electronic device has to transmit a status response message in reply. In the example embodiment of FIG. 12, if the first electronic device 201-$a$ receives the electronic device status check message at step 1102, it may transmit a response message to the wireless communication device 300 at step 1104. As described above, each electronic device may transmit the response indicating its active state immediately upon receipt of the electronic device status check message. The status response message may further include urgent situation information of the electronic device. In the case that the electronic device is operating on battery power, the urgent situation information may inform that the residual battery capacity is less than a predetermined residual capacity threshold. In more detail, if the residual battery capacity of the electronic device operating on battery power is less than 20%, it may determine the low power state and includes the low power status information as the urgent situation information in the status response message. In the case that the electronic device is a relay switch or a device supplying electric power to another device, the urgent situation information may indicate the overcurrent status or rapid load factor fluctuation status.

If the status response message is received at step 1104, the wireless communication device 300 may generate a status report message including the information on the wireless communication device 300 and transmit the status report message to the gateway 200 at step 1106.

Although not illustrated in FIG. 12, the gateway 200 may update the device information of the wireless communication device and the electronic devices stored in the gateway memory 215 based on the information received from the wireless communication device. Although not illustrated in FIG. 12, the gateway 200 may transmit to the management server 100 the status report message including its device information. If the gateway 200 has the information on the wireless communication device 300 and the first electronic device 201-$a$ already, the wireless communication device 300 may generate the status report message including the information on whether the corresponding electronic device has responded and the urgent situation information except for the device information. Then the gateway 200 may generate the status report message including the electronic device information, response information, wireless communication device information, gateway information, and response time information and transmit the status report message to the management server.

If it is required to check the status of the respective electronic devices located within the radio communication range of the wireless communication device, the gateway 200 may transmit the status check command message to the wireless communication device 300 at step 1110.

If the status check command message is received, the wireless communication device 300 may transmit the electronic device status check message to the corresponding electronic device. As described above, it is requested to check the status of multiple or all electronic devices, step 1110 may be omitted. If step 1110 is omitted, the wireless communication device 300 may select an electronic device from the database as exemplified by table 3 for which the electronic device status check message is destined. FIG. 12 exemplifies the case where the $k^{th}$ electronic device is selected.

If the $k^{th}$ electronic device 201-$k$ is selected, the wireless communication device 300 generates the electronic device status check message and transmits the electronic device status check message to the $k^{th}$ electronic device 201-$k$ at step 1112. If no response is received from the $k^{th}$ electronic device 201-$k$ in a predetermined time period, the wireless communication device 300 may retransmit the electronic device status check message to the $k^{th}$ electronic device 201-$k$ a predetermined number of times, e.g., 3 times. The wireless communication device 300 may transmit the electronic device status check message at the last transmission round at step 1114. If no response message is received in response to the electronic device status check message transmitted at the last transmission round in the predetermined time period, the wireless communication device 300 may transmit a non-response report message to the gateway 200 at step 1116. The wireless communication device 300 may store the non-response status of the corresponding electronic device in its memory before or after step 1116 at step 1118.

If the non-response report message is received, the gateway 200 may update the state of the electronic device to the non-response status in its memory at step 1120 and transmit a non-response report message including the non-responsive electronic device information, non-response status information, wireless communication device information, and gateway information to the management server at step 1122.

Figure 13:
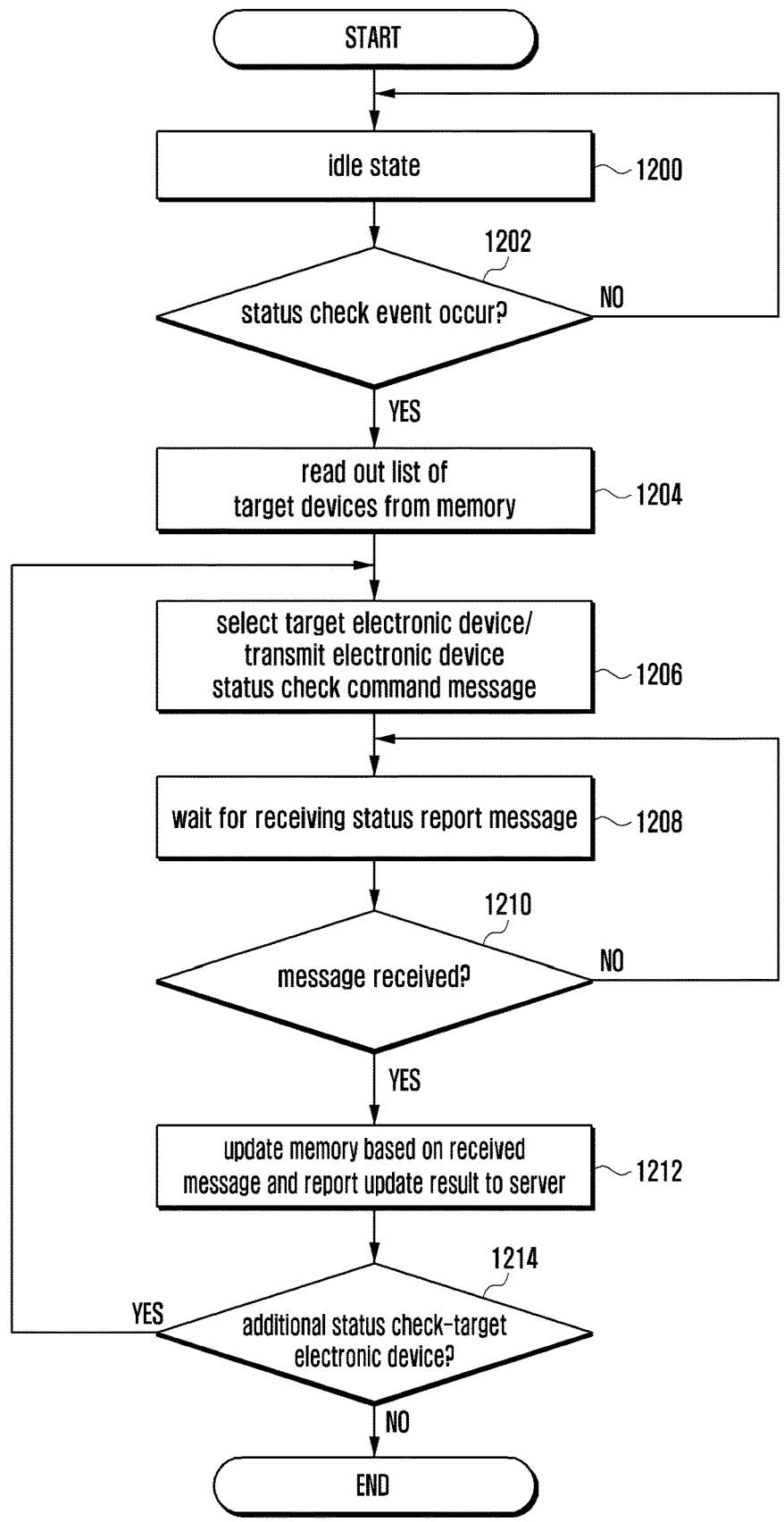
FIG. 13 is a flowchart illustrating an example procedure for a gateway to check the status of electronic devices using a wireless communication device according to an example embodiment of the present disclosure.

FIG. 13 is a flowchart illustrating an example procedure for a gateway to check the status of electronic devices using a wireless communication device according to an example embodiment of the present disclosure.

The example embodiment of FIG. 13 is described under the assumption that the gateway is configured as illustrated in FIG. 3B. The gateway control unit 211 is operating in an idle state at step 1200. In the idle state, the gateway is waiting for a command or an event. The command may be input by the user or the operator, and the event may occur at a predetermined interval. The gateway control unit 211 may determine whether a status check event occurs at step 1202. The status check event may be receiving an electronic device status check command message from the management server 100 as a high-level entity, a timeout of a timer configured for checking the status of electronic device periodically, a status check command key input made to the gateway by the operator.

If the status check event occurs, the gateway control unit 211 may read out the device information, at step 1204, from a database as exemplified by table 1 which is stored in the gateway memory 215. The gateway control unit 211 may select an electronic device to check at step 1206. The device selection may be performed in two ways. The gateway control unit 211 may provide the wireless communication device 300 with the information on the electronic devices to check in order for the wireless communication device 300 to check the status of the electronic devices in a certain method or may inform the wireless communication device 300 of the individual electronic devices to check one by one.

In the case of providing the information on the electronic devices to check to the wireless communication device 300 in order for the wireless communication device 300 to select the electronic device to check in a certain method, the gateway control unit 211 may provide the wireless communication device 300 with the information on the electronic devices selected from the electronic device list read from the memory at step 1206. At this time, if it is required to check the status of all electronic devices located within the radio communication range of the wireless communication device 300, the information may be configured to indicate all electronic devices explicitly.

In the case that the gateway control unit 211 instructs to check the status of the individual electronic devices, it may be possible to select the electronic devices in a certain order or a descending order or an ascending order of the electronic devices from a list as exemplified by table 1. At this time, if there is any electronic device of which the status is checked as abnormal, the corresponding electronic device may be excluded from or included in the status check list.

The control unit 211 of the gateway 200 selects the individual electronic devices one by one to generate the electronic device status check command message for checking the status of the selected electronic devices and transmits the electronic device status check command message to the wireless communication device 300 at step 1206. The gateway control unit 211 waits for receiving a status report message from the wireless communication device 300 at step 1208. The wireless communication device 300 may transmit two types of status report messages. The first type status report message is generated when a response message is received from the corresponding electronic device. The second type status report message is generated when no response message is received from the corresponding electronic device. If a check result message is received at step 1210, the gateway control unit 211 updates the data stored in the memory based on the received message and reports the result to the management server 100 at step 1212. For example, if the status report message is received, the gateway control unit 211 may add the gateway information to the status report message and then transmit the status report message to the management server 100. If the status report message includes the information on whether the corresponding electronic device has responded and the urgent situation information but not the device information, the gateway control unit 211 may generate and transmit the status report message including the wireless communication device information, the electronic device information, the urgent situation information, the gateway information, and the response signal reception time information to the management server 100.

If the non-response report message is received, the gateway control unit 211 may store the non-response status in the memory 215 and transmit a non-response report message to the management server 100. At this time, the non-response report message may be generated and transmitted in the same method as used to generate and transmit the status report message.

The gateway control unit 211 may determine whether there is another electronic device to check its status at step 1214. If there is another electronic device to check its status, the gateway control unit 211 may return the procedure to step 1206 to perform the above-described operations again. Otherwise if there is no other electronic device to check its status, the gateway control unit 211 may end the procedure.

Figure 14:
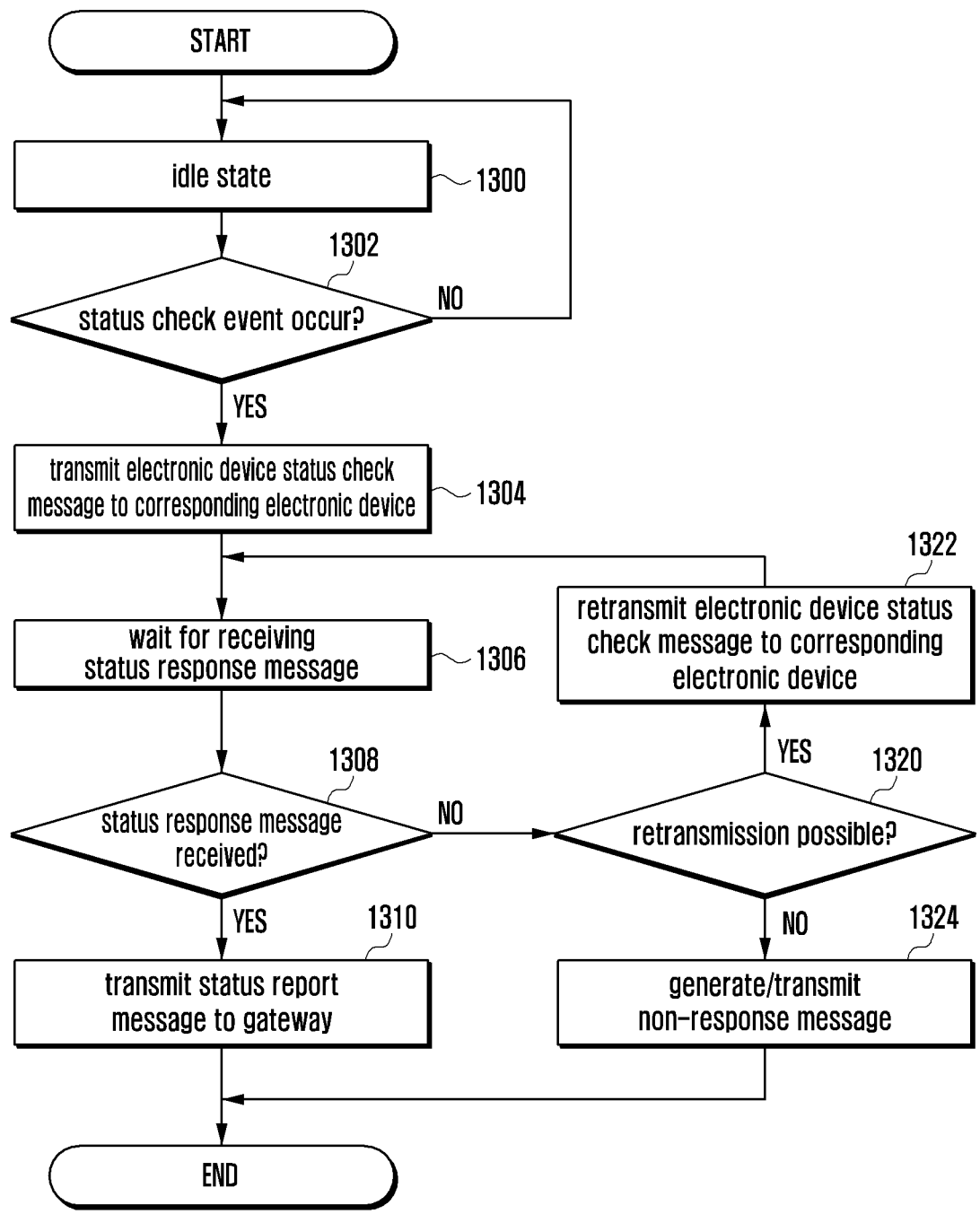
FIG. 14 is a flowchart illustrating an example procedure for a wireless communication device to check status of electronic devices in response to a request from a gateway according to an example embodiment of the present disclosure.

FIG. 14 is a flowchart illustrating an example procedure for a wireless communication device to check status of electronic devices in response to a request from a gateway according to an example embodiment of the present disclosure.

The example embodiment of FIG. 14 is described under the assumption that the wireless communication device 300 is configured as illustrated in FIG. 4. The control unit 311 of the wireless communication device 300 is operating in an idle state at step 1300. The idle state is similar to the idle state described above. In the idle state, the control unit 311 may wait for a key input made by the user, a predetermined command signal from the gateway 200, or arrival of occasion for detecting entry of a new electronic device into the radio communication range of the wireless communication device 300 or status check timing.

At step 1302, the control unit 311 determines whether a status check event occurs. The status check event may be receiving a status check command message from the gateway 200 or arrival of a status check time. It should be noted that FIG. 14 is directed to the case where a status check command message for a certain electronic device is received from the gateway 200.

If the status check event occurs, the control unit 311 may generate an electronic device status check message destined for the electronic device indicated in the status check command message received from the gateway 200 and control the wireless communication unit 307 to transmit the electronic device status check message to the corresponding electronic device at step 1304. Next, the control unit 311 waits for a status response message at step 1306. The control unit 311 determines whether a status response message is received from the corresponding electronic device by means of the wireless communication unit 307 at step 1308. If it is determined at step 1308 that the status response message is received, the procedure goes to step 1310.

At step 1310, the control unit 311 of the wireless communication device generates a status report message based on the information acquired from the status response message and transmits the status report message to the gateway. As described above, the status response message may include the information indicating that the electronic device is active with or without the urgent situation information. The urgent situation information has been described already above and thus detailed description thereof is omitted herein.

If it is determined at step 1308 that no status response message is received in a predetermined time period, the control unit 311 determines at step 1320 whether the electronic device status check message can be retransmitted. Whether the message can be retransmitted may be determined based on whether the number or retransmissions has reached a predetermined value. Assuming that the message can be transmitted 3 times, this means that the message can be retransmitted twice. If the total number of transmissions is set to 4, the electronic device status check message can be retransmitted 3 times. The number of retransmissions may be determined as specified in the wireless communication standard or set to be an arbitrary value in the wireless network configuration phase.

If it is determined at step 1320 that the message can be retransmitted, the control unit 311 may retransmit the electronic device status check message to the corresponding electronic device at step 1322. At this time, the number of retransmissions may be restricted by a counter. For example, if a counter is initially set to 3, the counter decrements by 1 whenever the message is (re)transmitted. If the counter is equal to or greater than 1, this means that retransmission is possible; otherwise if the counter is less than 1, this means that retransmission is impossible. It may also be possible to configure the counter to increment. For example, the counter may be configured to have a maximum value of 4 and increment by 1 whenever the message is transmitted. At this time, the initial value of the counter is set to 0. In this case, the retransmission is possible until the counter reaches the maximum value of 4.

If no status response message is received in response to the last retransmission, e.g., it becomes impossible to retransmit the electronic device status check message, the control unit 311 transmits a non-response report message to the gateway at step 1324.

The non-response report message may be transmitted when the response signal is not received due to the malfunction of the wireless communication function of the electronic device or the electronic device itself or the wireless communication unit 307 of the wireless communication device 300 is out of order. If all of the electronic devices are in the non-responsive state, it may be considered that the wireless communication device is out of order. This determination may be made by the management server 100 or the gateway 200.

Figure 15:
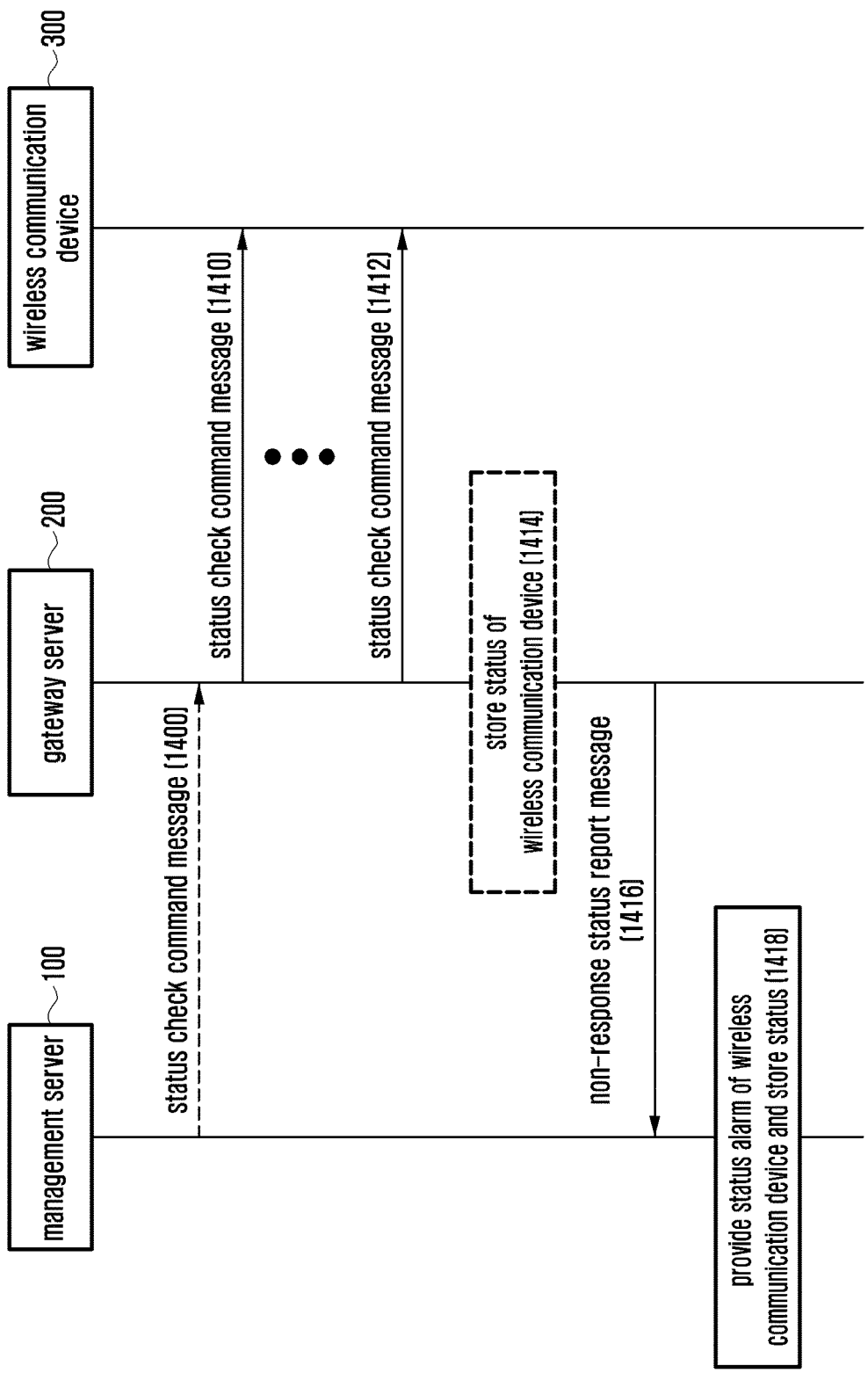
FIG. 15 is a signal flow diagram illustrating an example procedure for a gateway to detect an abnormality of a wireless communication device according to an example embodiment of the present disclosure.

FIG. 15 is a signal flow diagram illustrating an example procedure for a gateway to detect an abnormality of wireless communication device according to an example embodiment of the present disclosure.

The management server 100 may transmit a status check command message to the gateway 200 at step 1400. The management server 100 may be configured to transmit the status check command message to the respective gateways, and each gateway may be configured to transmit the status check command message to the wireless communication device periodically. For this reason, the operation of step 1400 is expressed with a dotted line in FIG. 15, and the following description is made under the assumption that the gateway 200 transmits the status check command message to the wireless communication device 300 connected thereto.

The gateway 200 may transmit a status check command message to the wireless communication device 300 at step 1410. The status check command message may be a message for instructing to check the status of the electronic devices located within the radio communication range of the wireless communication device or requesting to the wireless communication device for response. In the present disclosure, both the cases are included.

If no response is received in a predetermined time period after transmitting the status check command message, the gateway 200 may retransmit the status check command message to the wireless communication device 300 at step 1412. The message retransmission is performed in the same manner as or a similar manner to the case of transmitting the electronic device status check message from the wireless communication device 300 to the electronic devices located within its radio communication range. For this reason, the detailed description of the operation of the status check command message retransmission from the gateway 200 to the wireless communication device 300 is omitted herein.

The gateway 200 may transmit the status check command message a predetermined number of times at a predetermined interval. If no response message is received in response to the last retransmission, the gateway 200 may store the state of the wireless communication device at step 1414 and transmit a non-response status report message to the management server 100 at step 1416. At this time, the non-response status report message may include the information indicating that the wireless communication device 300 is in the non-response status. This information may be different from the information carried in the above-described non-response status report message. That is, since the gateway has not received any response from the wireless communication device 300, the gateway 200 transmits to the management server 100 the non-response status report message informing that the wireless communication device 300 is in the non-response status.

If the non-response status report message is received at step 1416, the management server 100 generates a wireless communication status alarm and stores the state at step 1418. At this time, the management server 100 may present to the operator the information that the external device connection unit 225 of the gateway 200 is operating abnormally. The operation of the management server 100 is described in more detail hereinafter with reference to the accompanying drawings.

Figure 16:
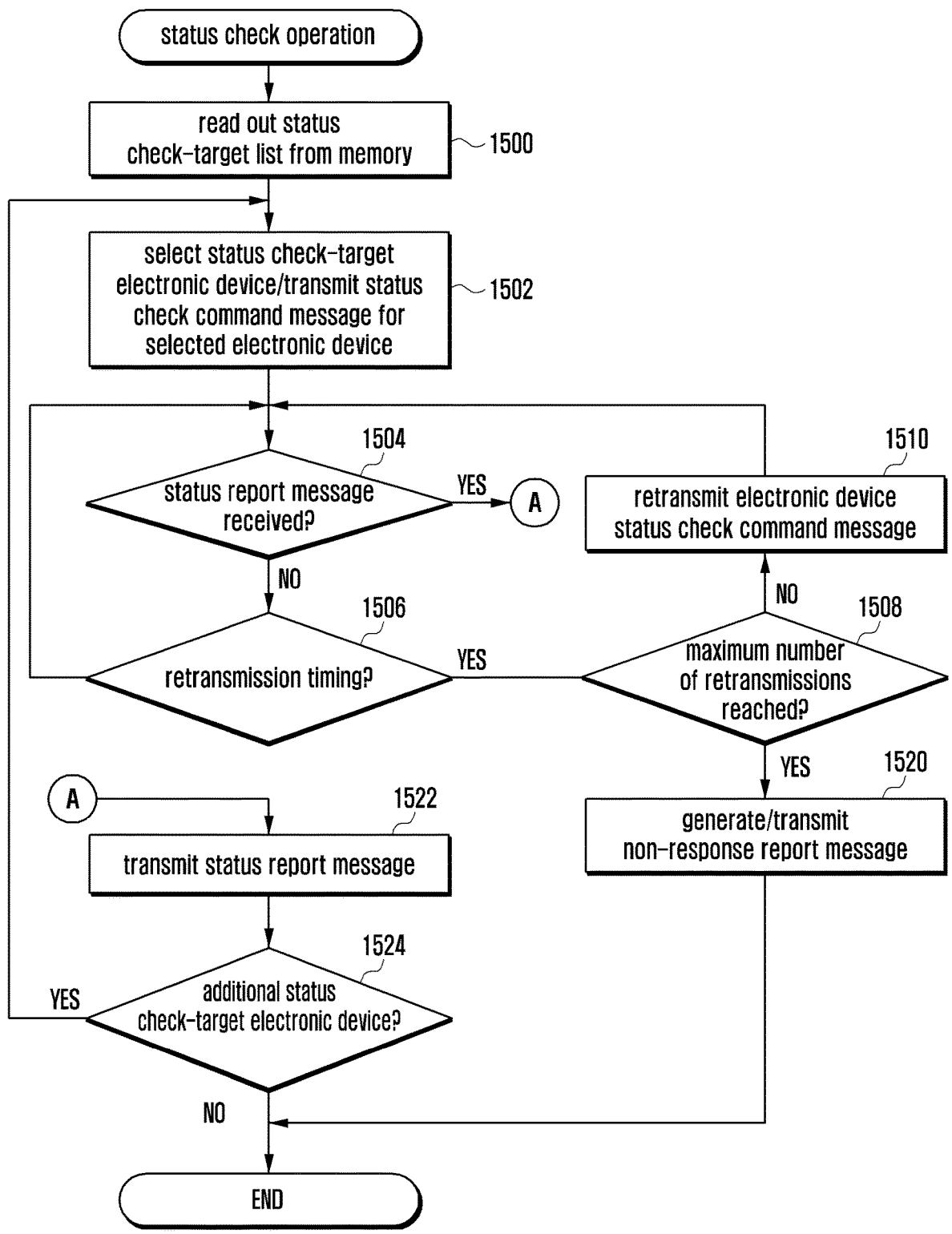
FIG. 16 is a flowchart illustrating an example procedure for a gateway to detect abnormality of a wireless communication device and an electronic device according to an example embodiment of the present disclosure.

FIG. 16 is a flowchart illustrating an example procedure for a gateway to detect abnormality of a wireless communication device and an electronic device according to an example embodiment of the present disclosure.

The example embodiment of FIG. 16 is described under the assumption that the gateway is configured as illustrated in FIG. 3B. It should be noted that FIG. 16 shows the status check procedure. The gateway control unit 211 may read out the information on the electronic devices stored in the gateway memory 213 in the form as exemplified by table 1 at step 1500 and select electronic devices to check their status at step 1502. The device selection may be performed in two ways as described above. The gateway control unit 211 may provide the wireless communication device 300 with the information on the electronic devices to check in order for the wireless communication device 300 to check the status of the electronic devices in a certain method or may inform the wireless communication device 300 of the individual electronic devices to check one by one. In the case of providing the information on the electronic devices to check to the wireless communication device 300 in order for the wireless communication device 300 to select the electronic device to check in a certain method, the gateway control unit 211 may provide the wireless communication device 200 with the information on the electronic devices selected from the electronic device list read from the memory at step 1502. At this time, if it is required to check the status of all electronic devices located within the radio communication range of the wireless communication device 300, the information may be configured to indicate all electronic devices explicitly.

In the case that the gateway control unit 211 instructs to check the status of the individual electronic devices, it may be possible to select the electronic devices in a certain order or a descending order or an ascending order of the electronic devices from a list as exemplified by table 1. If there is any electronic device of which the status is checked as abnormal, the corresponding electronic device may be excluded from or included in the status check list. The example embodiment of FIG. 16 includes both the two cases, which are all allowed. However, if step 1522 is included in the procedure of FIG. 16, this is the case of checking status of the electronic devices one by one; and otherwise if step 1522 is not included in the procedure of FIG. 16, this is the case of checking the status of the electronic devices at a time.

Although FIG. 15 is directed to the case where the status check operation is performed to check the status of the electronic devices, it may also be possible to instruct to check the wireless communication device. In order to avoid performing the status check operations for the wireless communication device and the electronic devices overlappingly, it is preferred to instruct to check only the status of the electronic devices.

After transmitting the electronic device status check command message at step 1502, the gateway control unit 211 may determine whether a status report message is received at step 1504. If no status report message is received, the gateway control unit 211 may determine at step 1506 whether a retransmission timer has expired. If the retransmission timer has not expired, the gateway control unit 211 continues the operation of step 1504; otherwise if the retransmission timer has expired, the procedure goes to step 1508.

At step 1508, the gateway control unit 211 may determine whether the number of retransmissions has not reached the maximum number of retransmissions. For example, if the maximum number of retransmissions is set to 4, the retransmission can be performed 3 times. The retransmission possibility determination may be performed in the same manner as using a counter as described above and thus detailed description thereof is omitted herein. If it is determined that the number of retransmissions has not reached the maximum number of retransmissions, the gateway control unit 211 retransmits the electronic device status check command message at step 1510 and returns the procedure to step 1504. In the case of using a counter, the counter may be configured to increment or decrement.

If it is determined that the number of retransmissions has reached the maximum number of retransmissions, the gateway control unit 211 transmits a non-response report message to the management server 100, at step 1520, to notify that the wireless communication device is in the non-response status.

If it is determined at step 1504 that the status report message has been received, the gateway control unit 211 may transmit a status report message to the management server 100 at step 1522. The status report message transmission operation of step 1522 is performed as described above and thus detailed description thereof is omitted herein. Next, the gateway control unit 211 may determine at step 1524 whether there is another electronic device to check its status in the list read out at step 1500. If it is determined that there is another electronic device to check its status, the procedure returns to step 1502; otherwise if it is determined that there is no other electronic device to check its status, the gateway control unit 211 may end the procedure of FIG. 16.

The above description excludes the case where the physical connection between the wireless communication device 300 and the gateway 200 is tear down. For example, if the wireless communication device 300 and the gateway 200 are connected physically, there are methods for recognizing the connection. If the wireless communication device 300 and the gateway 200 are connected through a USB interface, the external device connection unit 225 of the gateway 200 is capable of detecting the connection of the wireless communication device 300. Such a detection method is well-known to those in the art and thus detailed description thereof is omitted herein. The external device connection unit 225 may also detect other types of physical connections established between the wireless communication device 300 and the gateway 200. It should be noted that FIG. 16 is depicted with the exclusion of the case where the physical connection has been tear down.

Figure 17:
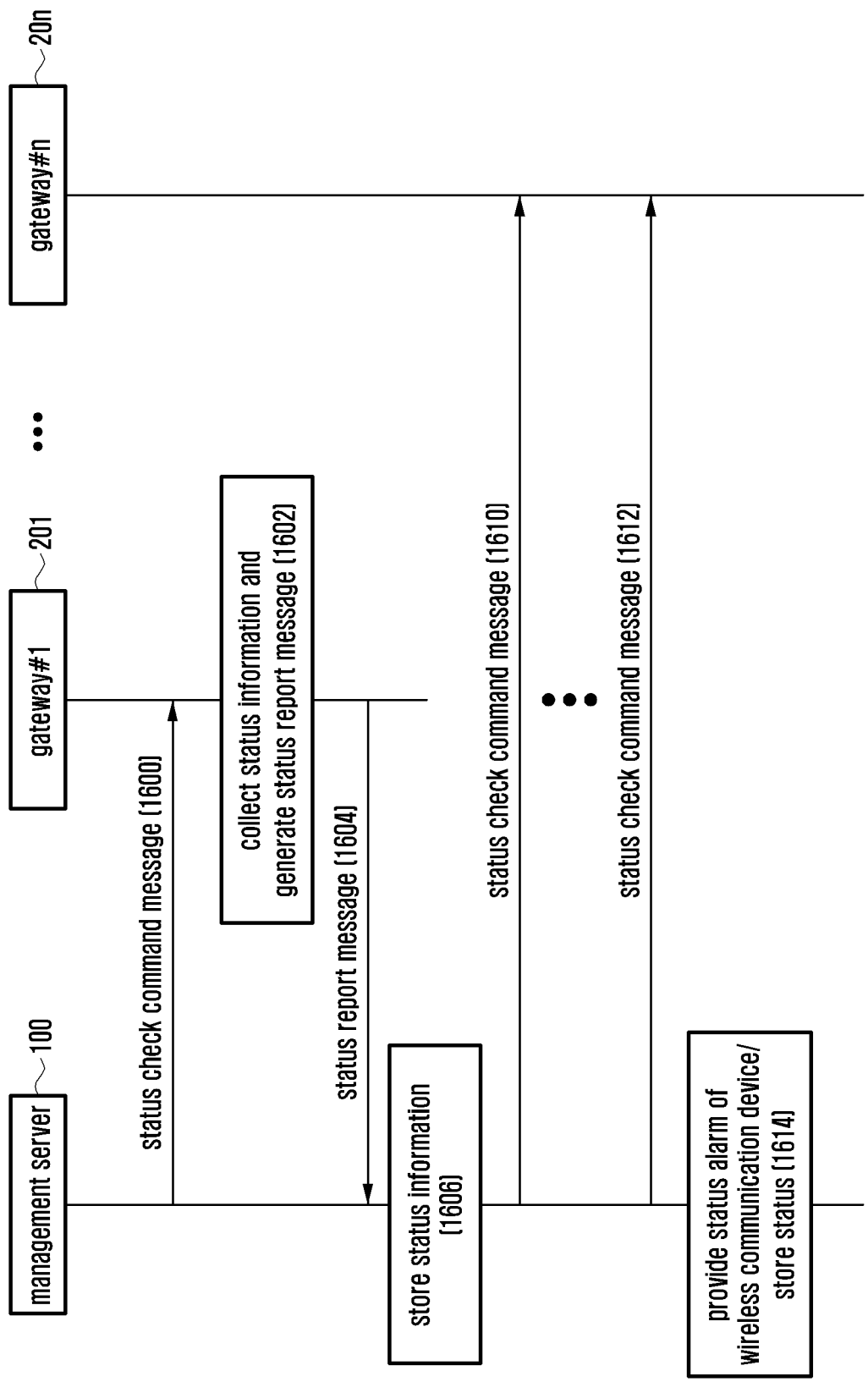
FIG. 17 is a signal flow diagram illustrating an example procedure for a management server to detect abnormality of a gateway according to an example embodiment of the present disclosure.

FIG. 17 is a signal flow diagram illustrating an example of a management server to detect abnormality of a gateway according to an example embodiment of the present disclosure.

The management server 100 may transmit a status check command message to the gateway #1 201 at step 1600. Then the gateway #1 201 may collect the information on the status of the wireless communication device 300 and the electronic devices located within the radio communication range of the wireless communication device 300 using any of the above-described methods and generate a status report message based on the collected information at step 1602. Next, the gateway #1 201 may transmit the status report message to the management server 100 at step 1604.

Then the management server 100 may store the status information acquired from the status report message in a database at step 1606. The status information may include the device information of the electronic devices, wireless communication device, and gateway, and the update times of devices information and may be stored in match with the room template information.

The management server 100 may transmit the status check command message to the gateway #n 20n at step 1610. If no status report message is received in a predetermined time period, the management server 100 may retransmit the status check command message to the gateway #n 20n. Here, the time period may be determined in consideration of the maximum number of transmissions of the status check command message to the wireless communication device connected to the gateway 201 and the maximum number of retransmissions for the wireless communication device to transmit the message within its radio communication range.

If no status report message is received in a predetermined time period after transmitting the status check command message, the management server 100 may retransmit the status check command message a maximum number of times at step 1612. If it fails in receiving the status report message in the predetermined time period after the last retransmission, the management server 100 may update the status of the gateway #n 20n to abnormal status in the database. The management server 100 may provide the database with an alarm concerning the gateway #n 20n at step 1614.

It should be noted that FIG. 17 is directed to the case where the management server 100 transmits the status check command message. However, there may be other methods for determining whether the gateways are in the non-response status without transmitting the status check command message at the management server 100. For example, in the case that the system is configured such that the gateways transmit the status check command message to the wireless communication devices at a predetermined interval and the wireless communication devices transmit the status report message, if no status report message is received from a specific gateway in a predetermined time period, the management server 100 may update the status of the corresponding gateway to the non-response status and generate an alarm. The operation of the management server is described hereinafter in more detail with reference to the accompanying drawings.

Figure 18:
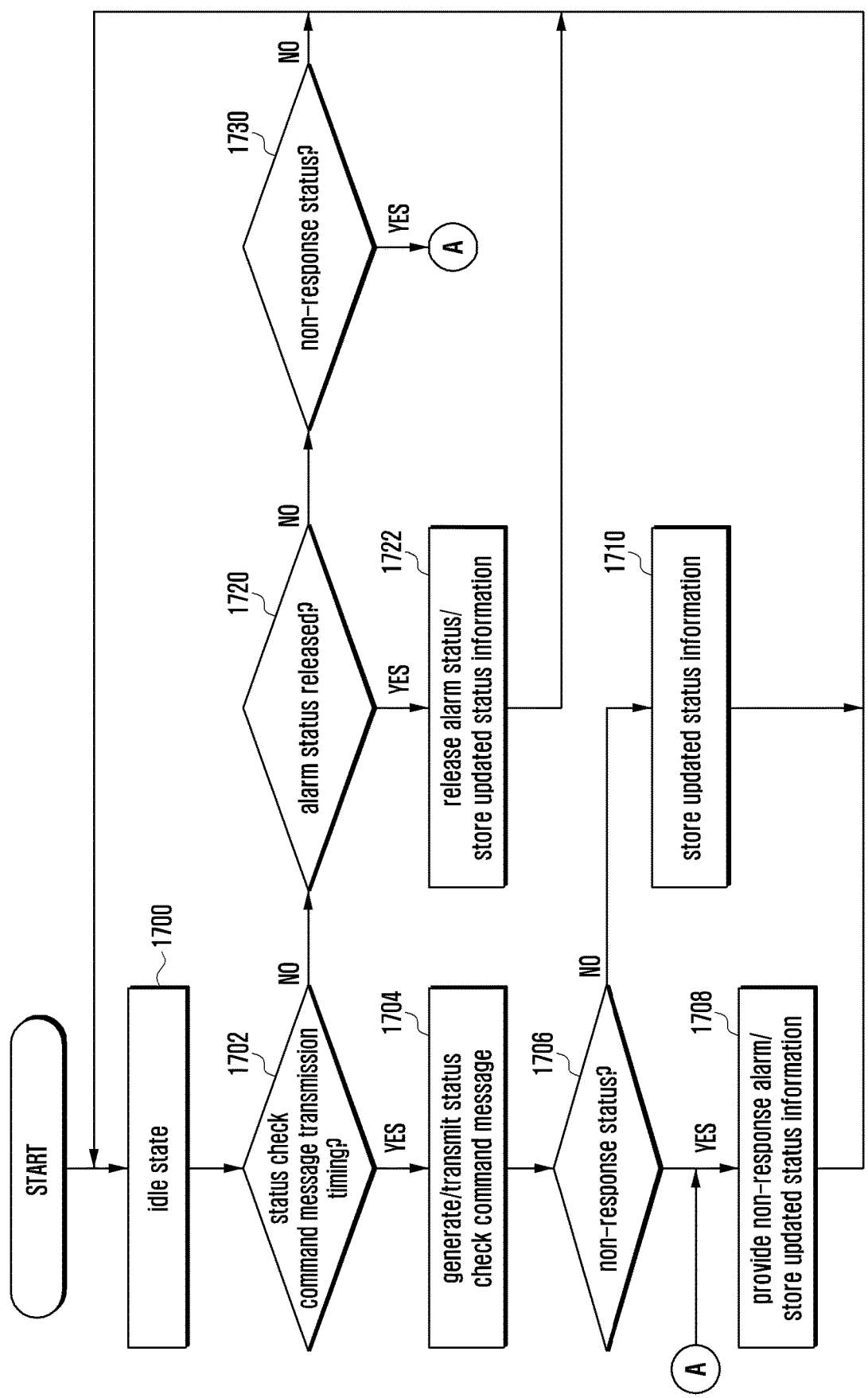
FIG. 18 is a flowchart illustrating an example procedure for a management server to activate an alarm, when the entities connected to the management server are in the non-response status, according to an example embodiment of the present disclosure.

FIG. 18 is a flowchart illustrating an example procedure for a management server to activate an alarm, when the entities connected to the management server are in the non-response status, according to an example embodiment of the present disclosure.

The example embodiment of FIG. 18 is described under the assumption that the management server 100 is configured as illustrated in FIG. 2. The example embodiment of FIG. 18 is focused on the operations of the management server 100 for activating and deactivating an alarm and thus detailed descriptions of the operations of receiving the device information of the gateway, wireless communication device, network control device, and electronic device and managing the information in the form of backup data are omitted herein.

The server control unit 111 is operating in an idle state at step 1700. In the idle state, the control unit 111 provides the operator with the monitoring information. In the idle state, the management server may be presenting the information on the location of a certain network control device or a gateway. In the idle state, the management server may store the status information of the gateway, wireless communication device, network control device, and electronic device received in response to the status check command message and wait for an event concerning backup data management. That is, the idle state may be a state in which no event occurs and the ongoing status is maintained.

Unless otherwise distinguished, the network control device is configured to include the gateway and the wireless communication device, and the description is made using the terms "gateway" and "wireless communication device" for convenience of explanation.

The server control unit 111 determines at step 1702 whether a timing for transmitting a status check command message to a gateway, wireless communication device, and at least one electronic device has arrived. The arrival of a status check command message transmission timing may be determined using a timer as described above. If the status check command message transmission timing has arrived, the server control unit 111 may generate and transmit a status check command message at step 1704. This may be the case where the management server 100 transmits the status check command message periodically as described above. If periodic status check command message transmission is not configured, steps 1702 and 1704 are not necessary. The status check command message transmission operation of step 1702 has been described with reference to FIGS. 15 and 17 and thus detailed description thereof is omitted herein.

Next, the server control unit 111 may determine at step 1706 whether no response is received from the gateway or whether a specific electronic device or the wireless communication device is in the non-response status although a status report message is received from the gateway. If it is determined at step 1706 that non-response status has occurred, the server control unit 111 may activate a non-response alarm, update the status information of the non-responsive electronic device, wireless communication device, or gateway, and store the updated information at step 1708.

If it is determined at step 1706 that non-response status has not occurred, the server control unit 111 may update the status information of the devices, e.g. gateway, wireless communication device, and electronic devices located within the radio communication range of the wireless communication device, and store the updated status information at step 1710. The data updated at step 1710 may be carried in the status report message and include the status information and time information.

If it is determined at step 1702 that the status check command message transmission timing has not arrived or if the management server is configured not to transmit the status check command message, the procedure goes to step 1720. At step 1720, the server control unit 111 may determine whether an alarm of a specific electronic device, the wireless communication device, or the gateway has deactivated. The gateway may report the alarm deactivation to the management server 100 after the communication with the corresponding device is resumed. If the alarm of the corresponding device is deactivated, the server control unit 111 may deactivate the alarm of the corresponding device and update the status information in the server database 105 at step 1722.

If it is determined at step 1720 that the alarm is not deactivated, the server control unit 111 may determine at step 1730 whether the gateway is in the non-response status. As described above, whether the gateway is in the non-response status can be determined in two ways. First, it may occur that no response is received from the gateway in reply to the status check command message. Such a situation has been described with reference to step 1702, 1704, 1706, and 1708.

It is another case that the gateway fails in receiving the status report message concerning the wireless communication device and the electronic devices located within the radio communication range of the wireless communication device, the message being supposed to be received at a predetermined interval. Suppose that the gateway is configured to receive the status report messages from the wireless communication device and the electronic devices located within the communication range of the wireless communication device. In this case, if the server control unit 111 fails in receiving the status report message in a predetermined period or twice since the receipt of the last status report message from a specific gateway and an additionally configured marginal time duration elapses, it determines at step 1730 that the gateway is in the non-response status. If it is determined that the gateway is in the non-response status, the server control unit 111 may activate an alarm concerning the non-response status of the gateway, update the state of the gateway to the non-response status, and store the updated status information at step 1708.

Although there may be various kinds of alarms, the above description is directed to only the operation activating/deactivating the alarm. However, it may be possible to sort alarms and present the alarm to the operator in various manners according to the alarm level. The alarm may be configured to the gateway, the wireless communication device, and the electronic devices with different alarm levels. The gateway or the network control device may be configured with the highest alarm level. The wireless communication device may be configured with the highest or second highest alarm level. The electronic devices may be configured with the second or third highest alarm level. Examples thereof are described hereinafter.

In the case that the network according to the present disclosure is deployed in a hotel and the smart televisions or set-top boxes placed in the hotel rooms are operating as gateways, the gateways have to generate an alarm with the highest alarm level. In the case that the wireless communication device is a commercialized device such as Dongle, the wireless communication device may be configured with the second highest alarm level. Finally, the electronic devices connected to the switches installed in the hotel rooms, e.g., coffee port and hair drier, may have the lowest alarm level. Meanwhile, the temperature controller installed in each hotel room may have the alarm level equal to that of the wireless communication device or the gateway.

In the case that the network according to the present disclosure is deployed in a hospital and the smart television or set-top box placed in each hospital room or the cardiac monitor installed in the emergency room is operating as the gateway, the gateway may have a high alarm level. The alarm level may be determined differently depending on the device in which the gateway function is installed.

In the case that there are multiple alarm levels, the server control unit 111 may control the wired/wireless communication unit 107 to transmit an emergency message to a wireless pager or mobile communication device of the operator. It may be configured that the alarm with the lowest alarm level is generated in the form of a text and the alarm with the second level is generated with a blink of the monitor by controlling the graphical interface 101 and furthermore, if a speaker is connected to the management server 100, a periodic alarm sound.

<Restoration with Backup Data>

Descriptions have been made of the operations of performing initial pairing operations of the electronic device, gateway, wireless communication device, or network control device and detecting non-response status of the installed device. The electronic device, network control device, gateway, or wireless communication device in the abnormal status is required to be inspected or changed by the operator. If an electronic device operating on electric power loses its power connection or synchronization with the network, this makes it necessary for the operator to reboot or initialize the electronic device or change the electronic device for another one.

Accordingly, in the case of providing an alarm function, the operator can monitor the devices to detect a problem by means of the management server 100 and repair or change the corresponding device. If a device is initialized during the inspection, the previously stored data may be deleted completely. If the corresponding device is changed for another one, there may be neither pairing information nor device information. There is therefore a need of a method for restoring data using the information acquired during the pairing process or registration with the management server connected to the network.

Descriptions are made hereinafter of the method for restoring data when a certain device is initialized or changed for another one hereinafter.

Figure 19:
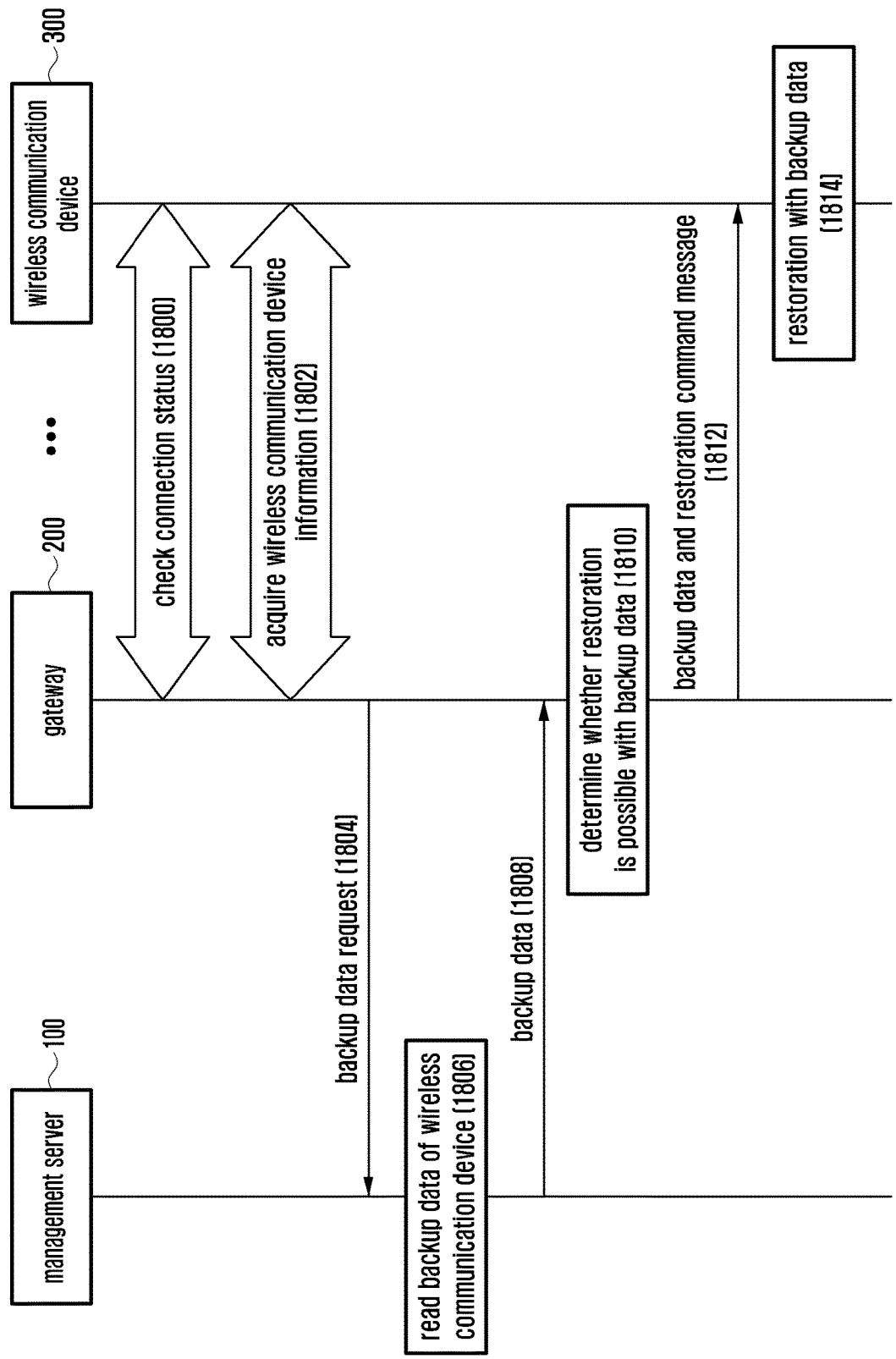
FIG. 19 is a signal flow diagram illustrating an example data restoration procedure for the case where a wireless communication device is initialized or changed for another one according to an example embodiment of the present disclosure.

FIG. 19 is a signal flow diagram illustrating an example data restoration procedure for the case where a wireless communication device is initialized or changed for another one according to an example embodiment of the present disclosure.

In reference to FIG. 19, the gateway 200 may check status of connection with the wireless communication device 300 when a physical connection is made or at a predetermined interval at step 1800. The connection status check process may include that the gateway 200 transmits a connection status check signal to the wireless communication device 300. The connection status check process may also include that the wireless communication device 300 which is operating normally transmits a connection status response signal. The connection status check process may be instructed by the management server 100. It is noted that FIG. 19 is directed to the case where the gateway performs the connection status check process autonomously. In the case that the management server 100 instructs the gateway 200 to perform the connection status check process, the management server 100 may transmit a connection status check command signal or message to the gateway 200.

If the connection status check process of step 1800 is completed, the gateway 200 performs a wireless communication device information acquisition process to check compatibility at step 1802. As described above, the wireless communication device information may include type of the wireless communication device, vendor, protocol, MAC address as a unique identifier, and firmware. The gateway 200 may request to the wireless communication device 300 for device information and acquire the wireless communication device information therefrom at step 1802.

After acquiring the device information of the wireless communication device 300, the gateway 200 may request to the management server 100, at step 1804, for backup data of the wireless communication device which has been previously connected to the gateway. Then the management server 100 reads the backup data of the wireless communication device which has been previously connected to the gateway 200 from the database or the backup server at step 1806 and transmits the backup data to the gateway 200 at step 1808.

If it is determined that the wireless communication device 300 is compatible with the previous wireless communication device and the connection has just been tear down because of a physical connection error or disconnection, the management server 100 may check the previous data.

If the backup data is received, the gateway 200 compares the device information acquired from the newly connected wireless communication device 300 and the device information contained in the backup data acquired from the management server 100 to determine whether the wireless communication device 300 can be restored with the backup data at step 1810. The restoration possibility determination may be made as follows.

First, it may be checked whether the physical connection is bad or the connector is disconnected. This process may be performed using the MAC address as a unique identifier of the wireless communication device 300. If the physical connection is bad or the connector is disconnected, this means that the data is not damaged. In this case, it may not be required to check the backup data reliability for restoration.

Second, the wireless communication device 300 may be initialized by the operator when it reconnects to the network. Like in the first case, the identity of the wireless communication device 300 may be checked using the MAC address as a unique ID. It may also be possible for the gateway 300 to request to the wireless communication device 300 for pairing information stored in the wireless communication device 300. This pairing information check process is not illustrated in FIG. 19 but is described later with reference to anther drawing.

Third, when a wireless communication device is connected, it may be possible to determine whether the wireless communication device is a changed one based on its MAC address. If the wireless communication device is a replacement of the old one, it may be possible to use the previously stored backup data or not.

If the new wireless communication device does not support the wireless communication scheme of the old wireless communication device, it is impossible to use the previously stored backup data. Even in the case where the gateway 200 configures the new wireless communication device not to record data, it is impossible to use the previously stored backup data. In other cases, it may be possible to use the backup data installing the new wireless communication device.

The gateway 200 may determine whether the wireless communication device 300 can be installed with the backup data at step 1810 and, if so, provides the wireless communication device 300 with the backup data at step 1812. If the backup data is received, the wireless communication device 300 may overwrite its data with the backup data at step 1814.

The above description has been made under the assumption that the gateway 200 requests to the management server 100 for the backup data of the wireless communication device 300 to restore the configurations of the wireless communication device 300 with backup data. However, the gateway 200 may have both the device information of the wireless communication device 300 and the pairing information. In this case, the gateway 200 may be configured to skip steps 1804 to 1808 and perform steps 1810 to 1814. Next, the gateway 200 may notify the server 100 at step 1814 that the wireless communication device 300 has been installed successfully with the backup data.

Figure 20:
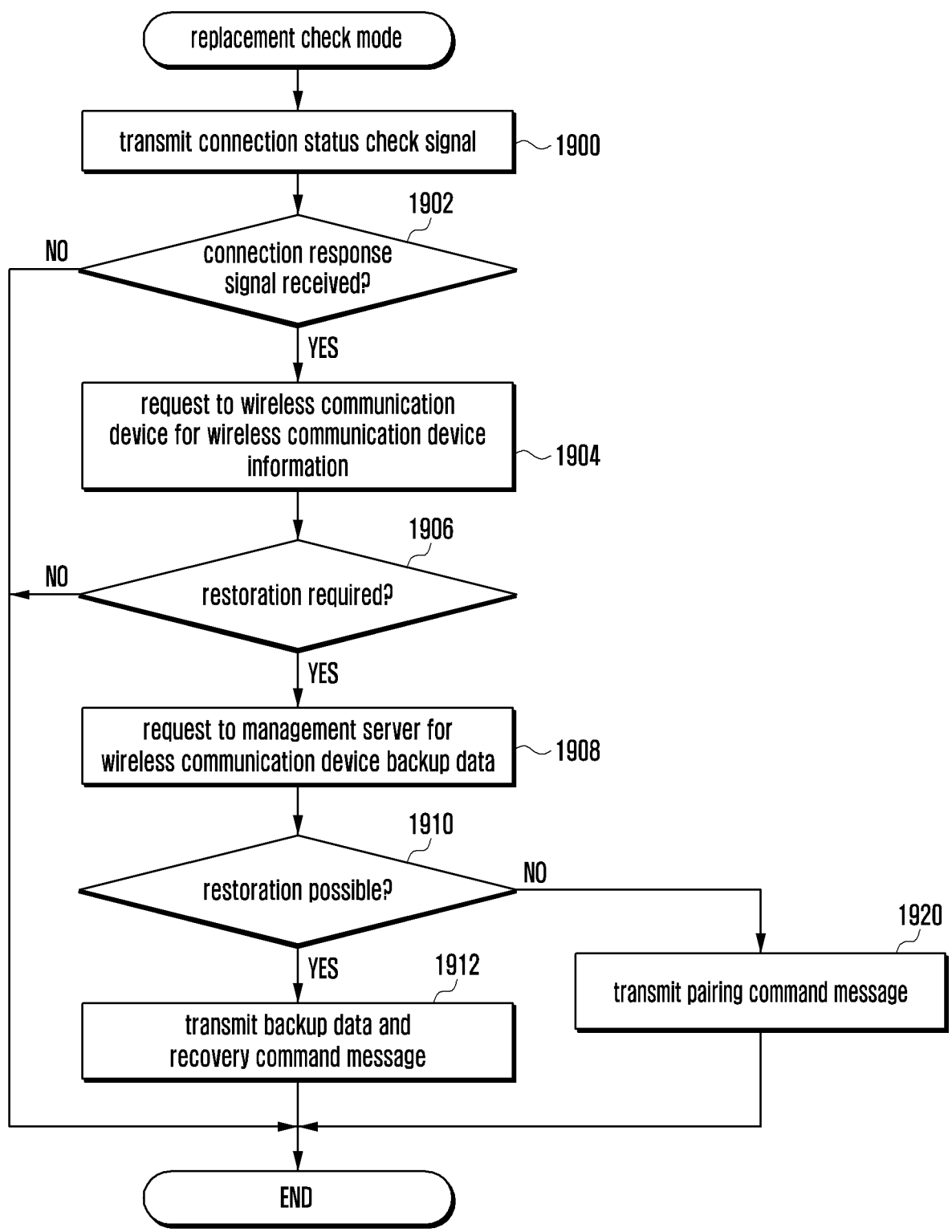
FIG. 20 is a flowchart illustrating an example backup data provision procedure for the case where a wireless communication device is changed for a new one according to an example embodiment of the present disclosure.

FIG. 20 is a flowchart illustrating an example backup data provision procedure for the case where a wireless communication device is changed for a new one according to an example embodiment of the present disclosure.

The gateway control unit 211 may be aware that the wireless communication device 300 is not connected or connected but in the non-response status. The gateway control unit 211 may operate in a device replacement detection mode in a certain case. The gateway control unit 211 may enter the device replacement detection mode when the wireless communication device 300 is initially connected or, although connected already, in the non-response status. FIG. 20 is directed to the case where the gateway control unit 211 is in the device replacement detection mode.

The gateway control unit 211 may generate a connection state check signal and transmit the connection status check signal to the wireless communication device 300 by means of the external device connection unit 225 at step 1900. Next, the gateway control unit 211 determines whether a connection status response signal is received from the wireless communication device 300 at step 1902. If the connection status response signal is received at step 1902, the procedure goes to step 1904; otherwise if no connection status response signal is received, the procedure ends. At this time, the gateway control unit 211 may reattempt the operation of step 1900 a predetermined number of times, e.g., twice or three times, if necessary. Although not illustrated in FIG. 20, the above-described retransmission operation may be added to the procedure according to the present disclosure.

The gateway control unit 211 may request to the wireless communication device for wireless communication device information at step 1904. The wireless communication device information may include type of the wireless communication device, vendor, protocol, MAC address as a unique identifier, firmware, and version. At this time, the wireless communication device may transmit the pairing information in response to the request from the gateway control unit 211.

If the wireless communication device information is received, the gateway control unit 211 compares the MAC address acquired from the wireless communication device information with the MAC address stored in the gateway memory 213 to determine whether the wireless communication device is a replacement of the old wireless communication device. If it is determined that the wireless communication device is replaced, the pairing information stored in the wireless communication device may be wrong information. In the present disclosure, if the wireless communication device is replaced, it may be determined that restoration is required.

There may be a case where restoration is required even though the unique identity information of the wireless communication is not changed. For example, the pairing information stored in the memory of the wireless communication device may be wholly erased or partially damaged when the operator or the user pushes a reset button of the wireless communication device. The gateway control unit 211 may request, when the unique identity information of the wireless communication device is not changed, to the wireless communication device for the pairing information (not illustrated in FIG. 20). Then the gateway control unit 211 may compare the pairing information received from the wireless communication device and the pairing information stored in the gateway memory 213 to determine whether restoration is necessary.

If it is determined at step 1906 that restoration is necessary, the gateway control unit 211 requests to the management server 100 for the backup data of the wireless communication device at step 1908. In the case of restoring the data of the wireless communication device with the information stored in the gateway, step 1908 may be omitted. In the following description, it is assumed that step 1908 of FIG. 20 is performed for convenience of explanation.

If the backup data of the wireless communication device is received at step 1908, the gateway control unit 211 may determine at step 1910 whether the data of the wireless communication device can be restored. The data restoration possibility determination operation is described in more detail hereinafter.

In the case that the wireless communication device is not replaced but the memory of the wireless communication device is initialized, the gateway control unit 211 may determine at step 1910 that data restoration is possible. That is, if the wireless communication device is not replaced, this means that the data restoration is possible. In the case that the wireless communication device is replaced, if the newly connected wireless communication device is identical in type with the old one and uses the same protocol, the gateway control unit 211 may determine that data restoration is possible. Also, if the information on the compatible wireless communication devices is stored in the gateway memory 213, it may be possible to determine whether the data restoration is possible based on only the type and vendor information. The data restoration possibility determination may be made based on the various types of information contained in the wireless communication device information.

If it is determined that the data restoration is possible for the wireless communication device, the gateway control unit 211 may transmit to the wireless communication device a restoration command message along with the backup data at step 1912. At this time, the gateway control unit 211 may transmit the backup data after or along with the restoration command message. That is, how to transmit the data may be determined depending on the characteristics of the connection between the wireless communication device and the gateway.

If it is determined that data restoration is impossible, e.g., the wireless communication device does not support the communication protocol of the old wireless communication device, the gateway control unit 211 may transmit to the wireless communication device a pairing command message at step 1920. As a consequence, the wireless communication device has to perform the pairing process with the electronic device located within its radio communication range. The pairing process has been described above in association with the initial network deployment and thus detailed description thereof is omitted herein.

Figure 21:
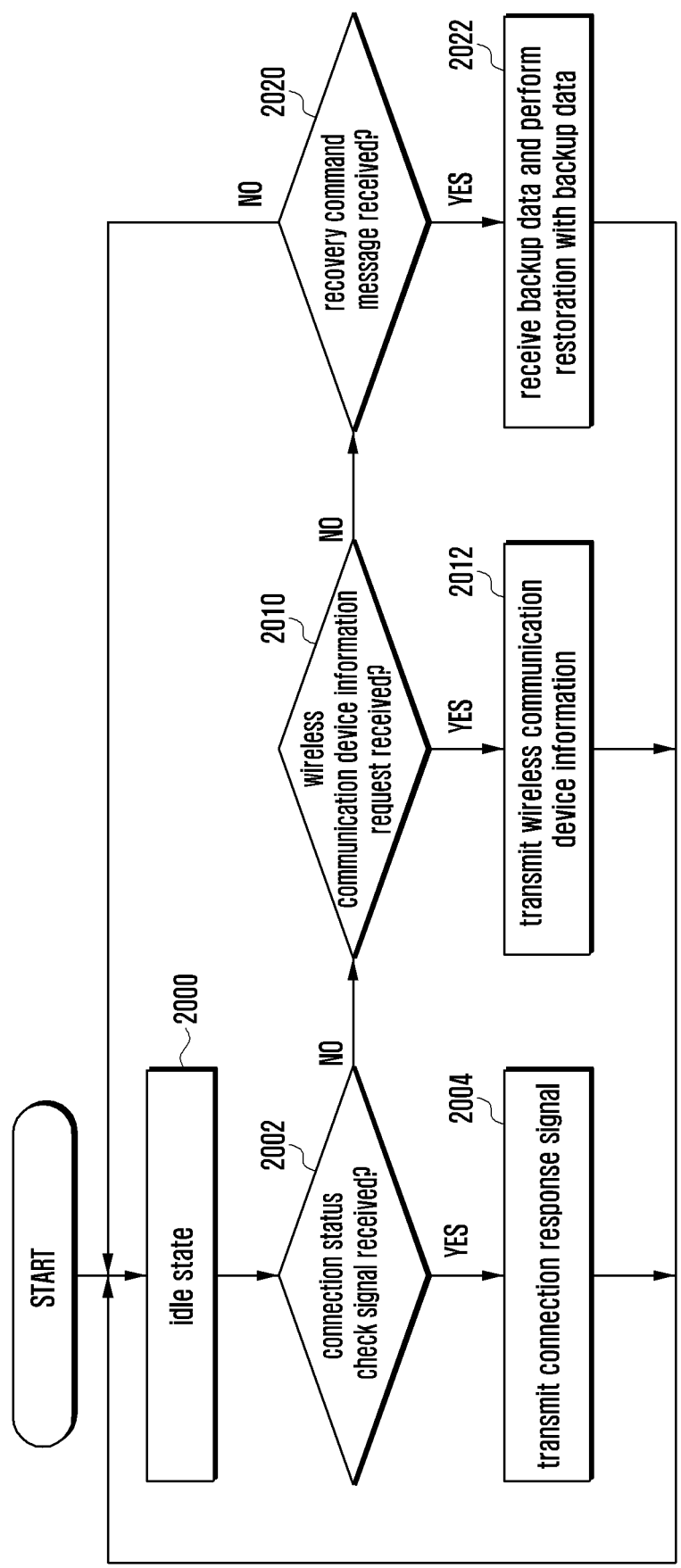
FIG. 21 is a flowchart illustrating an example data restoration procedure for the case where a wireless communication device is replaced according to an example embodiment of the present disclosure.

FIG. 21 is a flowchart illustrating an example data restoration procedure for the case where a wireless communication device is replaced according to an example embodiment of the present disclosure.

The example embodiment of FIG. 21 is described under the assumption that the wireless communication device is configured as illustrated in FIG. 4.

The control unit 311 of the wireless communication device 300 is operating in an idle state at step 2000. In the idle state, the control unit 311 may be waiting for receiving a connection status check signal, a restoration command message, or a pairing command message. The control device 311 may determine at step 2002 whether a connection status check signal is received by means of the gateway connection unit 301. If it is determined at step 2002 that the connection status check signal is received, the control unit 311 may transmit a connection status response message immediately by means of the connection unit 301 at step 2004. The connection status check signal may be received in two cases. First, when the wireless communication device in a disconnected state connects to the gateway, the gateway transmits the connection status check. Second, the gateway may transmit the status check signal periodically or in response to a request from the management server when the wireless communication device is in the non-response status. If the connection status check signal is received, the control unit 311 may generate and transmit the connection status response signal immediately. Afterward, the control unit 311 may return the procedure to step 2000.

If it is determined at step 2002 that no connection status check signal is received, the control unit 311 may determine at step 2010 whether a wireless communication device information request is received from the gateway. If it is determined at step 2010 that the wireless communication device information request is received, the control unit 311 reads out the wireless communication device information from the memory 305 and transmits the wireless communication device information to the gateway at step 2012. The wireless communication device information request may be requested when the operations state of the wireless communication device transitions from the disconnected state to the connected stated or from the non-response status to the response status or at a predetermined interval. The control unit 311 may provide the gateway with the wireless communication device information stored in the memory 305 of the wireless communication device 300. The wireless communication device information may include device type, vendor, protocol, MAC address, firmware, and version.

If it is determined at step 2010 that no wireless communication device information request is received, the control unit 311 may determine at step 2020 whether a restoration command message is received. If it is determined at step 2020 that the restoration command message is received, the control unit 311 may receive backup data from the gateway for data restoration with the backup data at step 2022.

The data restoration may be performed in two ways. For example, the data restoration may be performed to restore the pairing information generated during the pairing processes between the old wireless communication device and the electronic devices. If possible, the wireless communication device may restore both the wireless communication device information and the pairing information. If even the MAC address of the wireless communication device is updated, the electronic devices located within the communication range of the wireless communication device cannot recognize the replacement of the wireless communication device.

In the case of restoring only the pairing information, the gateway and management server may update only the identify information of the wireless communication device while maintaining the pairing information. The wireless communication device may restore the pairing information with the backup data to perform wireless communication with other electronic devices using the restored pairing information. In the case of performing wireless communication using the restored information, it may be possible to skip the pairing process even when the wireless communication device is replaced, resulting in reduction of channel resource waste and extension of battery usage time. Since the data of the replaced wireless communication device is automatically updated with the backup data, there is no need for the operator to perform extra operation for restoration, resulting in reduction of maintenance and repair workload.

Figure 22:
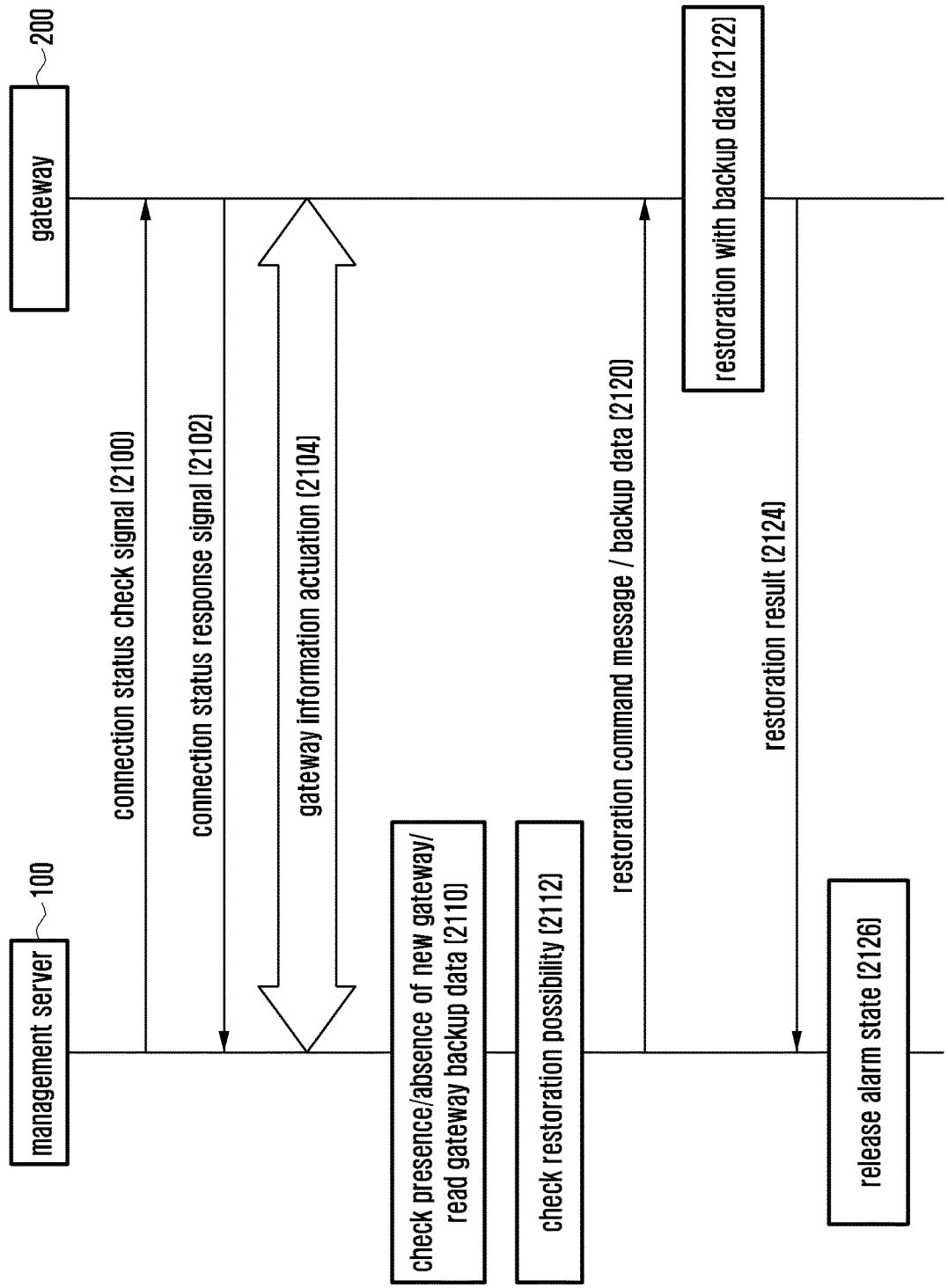
FIG. 22 is a signal flow diagram illustrating an example data restoration procedure for the case where a gateway or a network control device is replaced according to an example embodiment of the present disclosure.

FIG. 22 is a signal flow diagram illustrating an example data restoration procedure for the case where a gateway or a network control device is replaced according to an example embodiment of the present disclosure.

As described above, a gateway or a network control device may be in the non-response status. In the case that the gateway or the network control device is in the non-response status, the operator may repair or replace the gateway or the network control device with another one. When the gateway or the network control device is replaced, the management server 100 may be aware of the replacement or the repair based on the information entered by the operator. If the management server is aware of the replacement of the gateway or the network control device, it may transmit a connection status check signal to the gateway or the network control device at step 2100.

If the management server 100 is not aware of the replacement or the repair of the gateway or the network control device, it may transmit the connection status check signal to the gateway or network control device periodically at step 2100. In the following, the description is made in association with the gateway as a type of the network control device.

If the connection status check signal is received from the management server 100, the gateway 200 may immediately transmit a connection status response signal to the management server 100 at step 2102. This means that the operation state of the gateway 200 transitions from the non-response status to the response status and thus the management server 100 becomes aware that the gateway has been replaced or repaired. Accordingly, the management server 100 may request to the gateway 200 for the gateway information at step 2104. Similar to the wireless communication device information, the gateway information may include gateway type, product number, vendor, manufacturer, protocol, MAC address, firmware, and version.

If the gateway information is acquired, the management server 100 may determine at step 2110 whether the gateway is a new one. This determination may be made based on whether the MAC address of the gateway is present in the server database 105. If it is determined that the gateway is not identical with the old one, the management server 100 may read out the backup data of the old gateway from the server database 105 or the backup server. Next, the management server 100 may determine whether data restoration is possible for the gateway using the backup data at step 2112. The data restoration possibility determination may be made depending on whether to command to use the previously stored backup data. The management server may make the restoration possibility determination based on whether the wireless communication device stores the device information of the electronic devices located within its communication range in the same format while maintaining the connection mode or communication scheme with the wireless communication device.

In the case of repairing the gateway, it may not necessary to perform data restoration for the gateway. In an embodiment, even in the case where the gateway is repaired, if the gateway memory is initialized, it may be necessary to restore the data of the gateway. The signal flows for determining whether the gateway memory is initialized are not illustrated in FIG. 22. FIG. 22 is depicted without consideration of the case where the data is retained in the memory after the repair of the gateway.

If it is possible to restore the data of the gateway with the backup data, the management server 100 may transmit to the gateway a restoration command message along with the gateway backup data at step 2120.

If the backup data is received along with or in subsequent to the restoration command message, the gateway 200 may perform data restoration operation with the received backup data at step 2122. Next, the gateway 200 may transmit a restoration result message to the management server 100 at step 2124. The restoration result message may be transmitted or not depending on the network configuration. In a certain network, it may not be necessary or important to transmit the restoration result message. In a certain network, however, the restoration result message should be transmitted. Although the embodiment of FIG. 22 exemplifies the case where the gateway 200 transmits the restoration result message to the management server 100, the operation of step 2124 may be omitted.

If the restoration result message is received, the management server 100 determines whether the restoration result message indicates the success of the restoration and, if so, releases the alarm status at step 2126. If the network is configured so as not to transmit the restoration result message, the management server 100 may release the alarm status at step 2126 after transmitting the restoration command message and the backup data.

Figure 23:
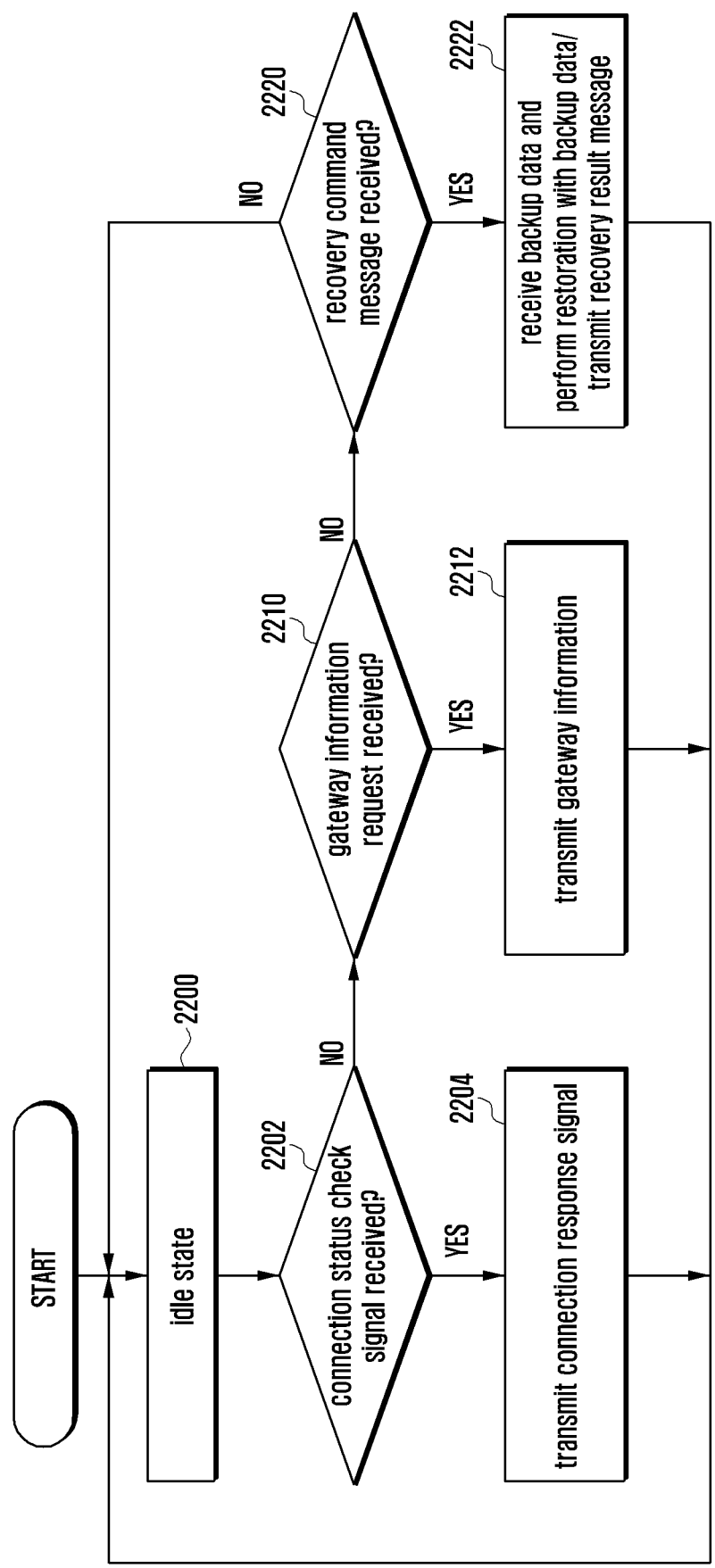
FIG. 23 is a flowchart illustrating an example data restoration procedure of a gateway using backup data for the case where the gateway is replaced according to an example embodiment of the present disclosure.

FIG. 23 is a flowchart illustrating an example data restoration procedure of a gateway using backup data for the case where the gateway is replaced according to an example embodiment of the present disclosure.

The example embodiment of FIG. 23 is described under the assumption that the gateway is configured as illustrated in FIG. 3B. It should be noted that the gateway operations of FIG. 23 may be applicable to the case where the gateway and the wireless communication device are integrated into a signal device, e.g., network control device. In the case that the gateway and the wireless communication device are integrated into the network control device, the description of the network control device is made only when required in association with the backup data restoration.

The control unit 211 of the gateway 200 is operating in an idle state at step 2200. In the idle state, the control unit 211 may wait for receiving a command input by the user or the operator or a predetermined signal from the management server 100. The control unit 211 may determine at step 2202 whether a connection status check signal is received from the management server through the communication unit 221. If it is determined that the connection status check signal is received, the gateway control unit 211 may transmit a connection status response signal immediately by means of the communication unit 221 at step 2204.

The management server 100 transmits the connection status check signal upon detection of state transition of the gateway 200 from the disconnected state to the connected state, periodically, or in response to the operator's control, and the control unit 211 of the gateway 200 may be configured to transmit the connection status response signal immediately upon receipt of the connection status check signal.

If it is determined at step 2202 that no connection status check signal is received, the control unit 211 may determine at step 2210 whether a gateway information request is received. If it is determined that the gateway information request is received, the control unit 211 may read out the gateway information from the gateway memory 213 and transmit the gateway information to the management server 100 at step 2212. The gateway information may include gateway type, product number, vendor, manufacturer, protocol, MAC address, firmware, and version.

If it is determined at step 2210 that no gateway information request signal is received, the gateway control unit 211 may determine at step 2220 whether a restoration command message is received. If it is determined at step 2220 that the restoration command message is received, the control unit 211 may receive the backup data from the management server 100 and restore the data of the gateway with the received backup data at step 2222. If the data restoration is completed, the gateway control unit 211 may transmit a restoration result message to the management server 100.

The restoration operation has been described multiple times above and thus detailed description thereof is omitted herein. In the case that the gateway and the wireless communication device are integrated into a network control device, the restoration operation may be performed twice. In the case that the network control device is replaced with another one, it may be possible to restore the data stored in the memories associated with the gateway function block and the wireless communication device function block respectively. However, it is typical that the data on the two function blocks are stored all together in the gateway memory 213 and thus it is preferred to configure the data restoration to be accomplished in a single operation.

Figure 24:
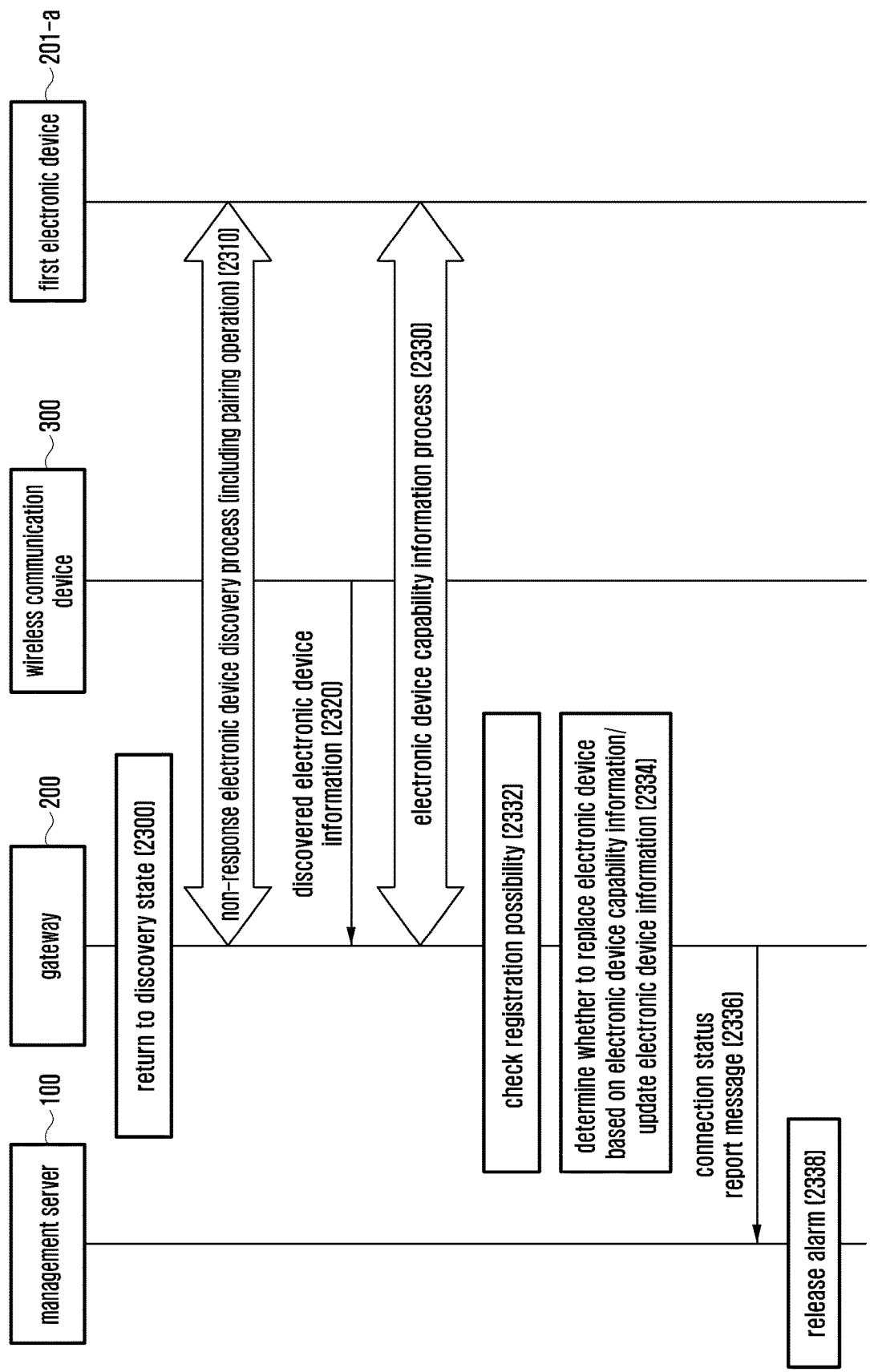
FIG. 24 is a signal flow diagram illustrating an example ZigBee protocol-based alarm deactivation and data backup procedure for the case where an electronic device is reset or replaced with another one according to an example embodiment of the present disclosure.

FIG. 24 is a signal flow diagram illustrating an example ZigBee protocol-based alarm deactivation and data backup procedure for the case where an electronic device is reset or replaced with another one according to an example embodiment of the present disclosure.

In the case of using a wireless communication protocol other than the ZigBee protocol, the execution order of the steps in the procedure of FIG. 24 may be changed. Even in the case of using a wireless communication protocol other than the ZigBee protocol, the subject matter of the present disclosure is applicable in the same manner with slight change in communication scheme and message. In the case that the electronic device is reset or replaced with another one, the alarm deactivation and data backup operations may be performed in adaptation to the wireless communication protocol. For example, in the case of using a wireless communication protocol which allows for acquiring device capability information during the pairing process, it may be possible to acquire device capability information during the pairing process.

If a certain electronic device is in an alarm status, the management server 100 or the gateway 200 may command to perform discovery operation for the corresponding electronic device at a predetermined interval to check the connection status. For example, the management server 100 may command to perform discovery for the device in the non-response status, the gateway 200 may perform the discovery at a predetermined interval to check the electronic device in the non-response status. In the example embodiment of FIG. 24, the gateway 200 enters the discovery state autonomously at step 2300. That is, no discovery command message is received from the management server. However, it may also be possible for the gateway 200 to enter the discovery state at step 2300 upon receipt of the discovery command message from the management server. If it enters the discovery state, the gateway 200 may transmit a discovery command message to the wireless communication device 300 (not shown).

Next, the gateway 200 may control the wireless communication device 300 to perform the discovery process for the electronic devices in the alarm status or new electronic devices at step 2310. The process for discovering the electronic devices in the alarm status or new electronic devices may be performed as follows.

First, the gateway 200 may instruct the wireless communication device 300 to perform a discovery operation, and the wireless communication device 300 broadcasts a discovery signal (beacon) within its radio communication range. If the discovery signal is received, the electronic device which is not paired yet with the wireless communication device 300 transmits a response message (Association Request). The response message may be a subscription request message. If the first electronic device 201-*a* is reset, the information stored during the previous pairing process with the wireless communication device 300 may be erased. In this case, the first electronic device 201-*a* has no subscription information with any network. In this case, the first electronic device 201-*a* cannot retrieve pairing information and thus may transmit a subscription request message (Association Request). If the subscription request message is received from the first electronic device 201-*a*, the wireless communication device 300 may transmit a subscription response message (Association Response) to the first electronic device 201-*a*. The subscription response message may include a pairing ID. In this way, the wireless communication device 300 may achieve pairing with the first electronic device 201-*a*.

According to an example embodiment, if the wireless communication device 300 broadcasts the discovery signal, an electronic device which is not paired yet with the wireless communication device 300 transmits a response message (Association Request). In the case that the first electronic device 201-*a* is an initially deployed electronic device, it has no pairing information with the wireless communication device 300. Accordingly, the first electronic device 201-*a* cannot retrieve the pairing information with the wireless communication device 300 and may transmit the subscription request message (Association Request) to the wireless communication device 300. In this way, the wireless communication device 300 can achieve pairing with the first electronic device 201-*a*.

If the pairing process is completed, the wireless communication device 300 transmits to the gateway 200 the device information of the discovered electronic device at step 2320. Then the gateway 200 acquires the capability information of the wireless communication device 300 and the first electronic device 201-*a* at step 2330. The capability information of the electronic device may be part or whole of the device information of the electronic device. The messages for use in acquiring the device information and capability information of the electronic device are described later with reference to accompanying drawings.

If the capability information of the electronic device is acquired at step 2330, the gateway 200 may determine whether the electronic device can be registered. The registration availability determination may be made as follows.

The gateway 200 may determine at step 2332 whether the electronic device can be registered based on the acquired capability information of the electronic device. The description is made under the assumption that an electronic device cannot be registered with the system deployed in a hotel. For example, a hotel guest may carry radio communication-capable device (such as a mobile phone, a smartphone, and a tablet computer) which cannot be registered with the system. The gateway 200 may have the information for use of determining whether an electronic device can be registered therewith. The gateway 200 may identify the electronic devices that can be registered or not based on such information. This information may include device type and manufacturer. If there is a mismatch in device type or manufacturer, the gateway 200 may determine that the electronic device cannot be registered.

In an opposite case where the device can be registered, if the MAC address of the electronic device mismatches the previously stored MAC address although the capability information of the electronic device (e.g., type and manufacturer) is checked positively, the electronic device may be determined as a replaced electronic device. That is, the capability information of the paired electronic device is partially or wholly identical with the device information stored with the alarm status in the device list, the corresponding electronic device may be registered.

In the case that the management server 100 provides the gateway 200 with the device information of the newly entered electronic device based on a room template, the gateway may store the basic information, e.g., type and manufacturer, of the corresponding electronic device. In the case that the device information of the newly entered electronic device is provided, the gateway 200 compares the device information with the previously stored information to identify that the newly entered electronic device.

If it is determined at step 2322 that the electronic device can be registered, the gateway 200 may determine whether the electronic device is a replaced device based on the capability information and, if it is, update the previously stored information at step 2334. That is, if the electronic device is a replaced or reset electronic device, the previously stored information may be updated with the device information of the replaced or reset electronic device. Otherwise if the electronic device is a new electronic device, it is registered as a new electronic device.

Afterward, the gateway 200 may transmit to the management server 100 a connection status report message indicating that the first electronic device 201-*a* is connected at step 2336. If the connection status report message is received, the management server may deactivate the alarm and update the changed alarm status at step 2338.

Figure 25:
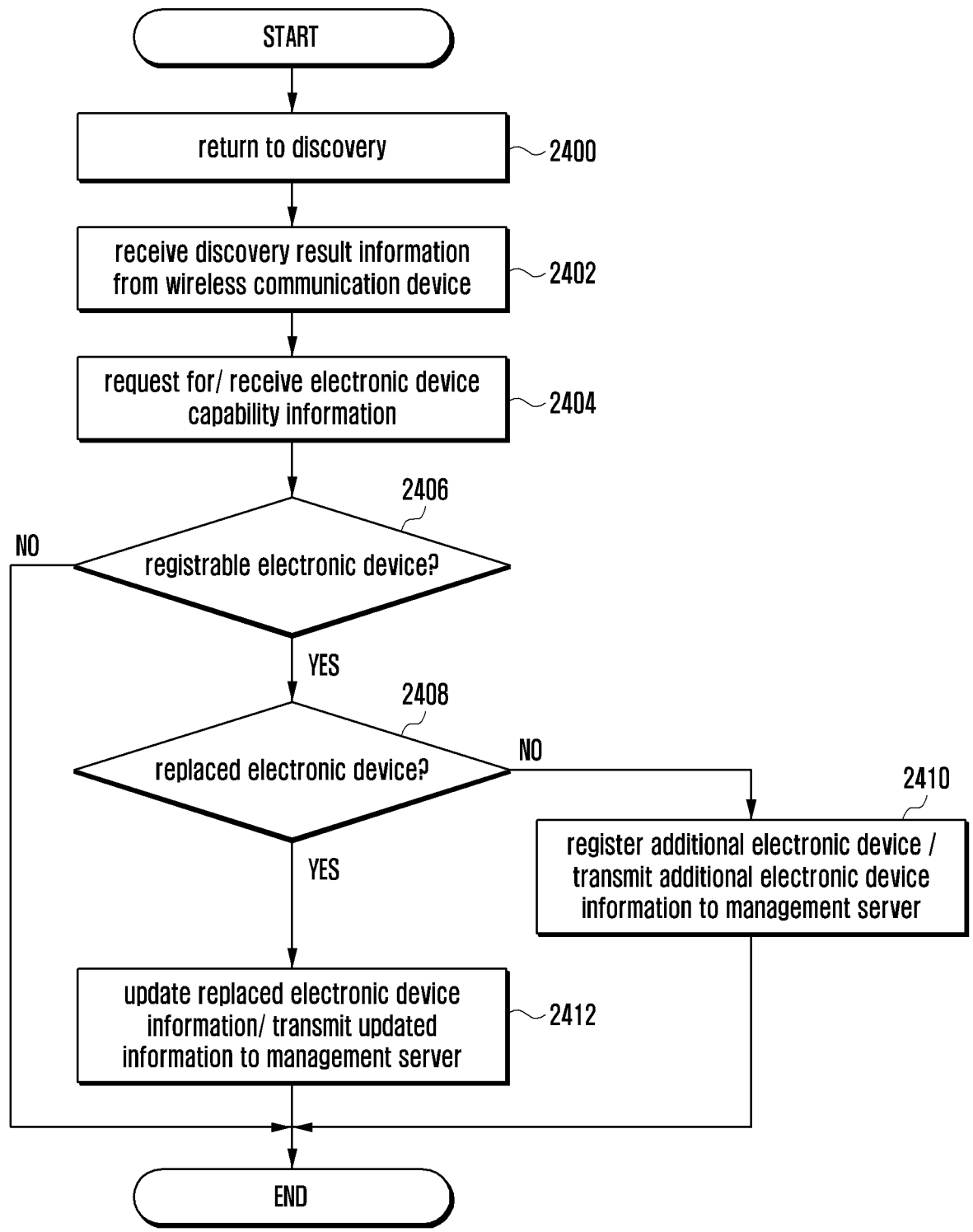
FIG. 25 is a flowchart illustrating an example device information management procedure of a gateway for the case where an electronic device in the non-response status is replaced or reset according to an example embodiment of the present disclosure.

FIG. 25 is a flowchart illustrating an example device information management procedure of a gateway for the case where an electronic device in the non-response status is replaced or reset according to an example embodiment of the present disclosure.

The embodiment of FIG. 25 is described under the assumption that the gateway is configured as illustrated in FIG. 3B.

At step 2400, the gateway control unit 211 may enter a discovery state periodically or upon receipt of the discovery command message transmitted by the management server 100. At this time, the gateway control unit 211 may transmit to the wireless communication device 300 a discovery command message or a pairing mode entry message by means of the external device connection unit 225. Next, the gateway control unit 211 may receive a discovery result information from the wireless communication device 300 by means of the external device connection unit 225 at step 2402. Next, the gateway control unit 211 may request to the wireless communication device 300 for electronic device capability information and acquire the electronic device capability information provided by the wireless communication device 300 at step 2404.

If the electronic device capability information is acquired, the gateway control unit 211 may determine at step 2406 whether the electronic device can be registered. This determination may be made by comparing the device information (e.g., device type and manufacturer) of the corresponding electronic device with the device information of the registrable electronic devices that have been previously stored the gateway memory 213.

If it is determined at step 2406 that the corresponding device can be registered, the procedure goes to step 2408; otherwise it is determined that the corresponding device cannot be registered, the procedure ends.

If it is determined at step 2406 that the corresponding electronic device can be registered, the gateway control unit 211 determines at step 2408 whether the electronic device is a replaced electronic device. This determination may be made based on the previously stored information. If the electronic device is replaced or reset, its device ID may be identical with one of the previously stored device IDs. Whether the electronic device is replaced or reset may be determined based on the device ID. If it is determined at step 2408 that the electronic device is replaced, the procedure goes to step 2412; otherwise if it is determined that the electronic device is not a replaced one, the procedure goes to step 2410.

If it is determined that the electronic device is replaced, the gateway control unit 211 updates the device information and transmits the updated information to the management server 100 at step 2412. Then the management server becomes aware of the replaced electronic device and releases the alarm status. In the case that the replaced electronic device is connected, it may be possible to check the status of the electronic device periodically or aperiodically (in response to a request from the operator) based on the previously stored information. The electronic device status check operation has been described above and thus detailed description thereof is omitted herein.

If it is determined that the electronic device is not replaced, the gateway control unit 211 stores the information on the electronic device in the gateway memory 213 and transmits the newly added electronic device information to the management server 100 at step 2410. If the electronic device information is received, the management server 100 may provide the operator with the alarm service and the status information afterward.

Although not illustrated in FIG. 25, the gateway control unit 211 may transmit backup data to the management server 100 after transmitting the connection status information. The backup data may include the device information of the replaced electronic device, pairing information, wireless communication device information, information stored in the wireless communication device, gateway information, and information stored in the gateway. The backup data may be segmented to be transmitted over several times depending on the backup data size and data rate on the channel established between the management server 100 and the gateway 200. The number of transmission times of backup data and data rate of the channel are not limited in the present disclosure.

Figure 26:
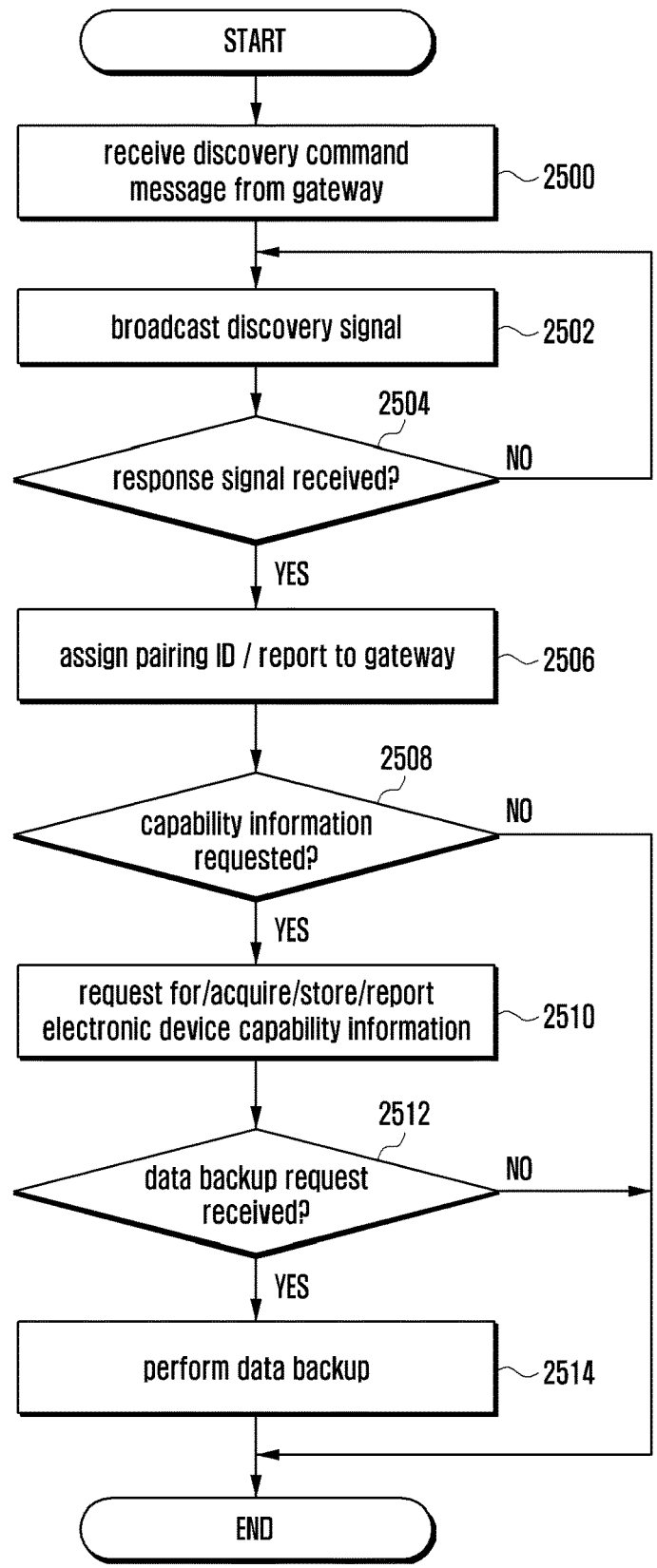
FIG. 26 is a flowchart illustrating an example control procedure of a wireless communication device for the case where an electronic device is replaced or reset according to an example embodiment of the present disclosure.

FIG. 26 is a flowchart illustrating an example control procedure of a wireless communication device for the case where an electronic device is replaced or reset according to an example embodiment of the present disclosure.

The example embodiment of FIG. 26 is described under the assumption that the wireless communication device 300 is configured as illustrated in FIG. 4.

If a discovery command message is received from the gateway 200 at step 2500, the control unit 311 of the wireless communication device 300 generates a discovery signal and controls the wireless communication unit 307 to broadcast the discovery signal at step 2502. The discovery signal is transmitted to discover the electronic devices that are not paired yet with the wireless communication device 300. Accordingly, if the discovery signal is received, the electronic device which is operating normally and not paired yet with the wireless communication device 300 transmits a response signal. If an electronic device is reset and thus loses the pairing information or replaced with a new electronic device within the radio communication range of the wireless communication device 300, the electronic device which has been reset or the replaced device may receive the discovery signal and transmit a response signal to the wireless communication device 300 in reply.

Accordingly, the control unit 311 of the wireless communication device may determine whether a response signal is received from a certain electronic device through the wireless communication unit 307. If no reply is received in response to the initially broadcast discovery signal, the control unit 311 may broadcast the discovery signal at a predetermined interval as many as the predetermined number of times by means of the wireless communication unit 307. If no response signal is received in response to the last broadcast, the control unit 311 may end the discovery process (not illustrated in FIG. 25). The discovery process may be terminated according to the command from the gateway 200 (not shown).

If it is determined at step 2504 that a response signal is received, the control unit 311 may assign a pairing identifier to the corresponding electronic device and report the device discovery result to the gateway 200 at step 2506. Then the control unit 311 determines at step 2508 whether a capability information request is received from the gateway 200. If the capability information request is received from the gateway 200, the control unit 311 may acquire the capability information of the corresponding electronic device by means of the wireless communication unit 307 at step 2510. At this time, the capability information may be acquired from one or more message transmitted subsequently. The capability information may be transmitted using a different message depending on the wireless communication protocol. The messages for use in transmitting the device capability information are described later with reference to accompanying drawings.

If the capability information of the electronic device is acquired, the control unit 311 of the wireless communication device 300 may store the capability information in the memory 305 and report the acquired capability information to the gateway server 200.

The control unit 311 may determine at step 2512 whether a data backup request is received from the gateway 200. If the data backup request is received from the gateway 200, the control unit 311 may transmit to the gateway 200 the electronic device information and the information stored during the pairing processes with the respective electronic devices for backup at step 2514.

<Display Operation at Management Server>

A description is made of the control operation of the management server 100 hereinafter with reference to the accompanying drawings.

Figure 27A:
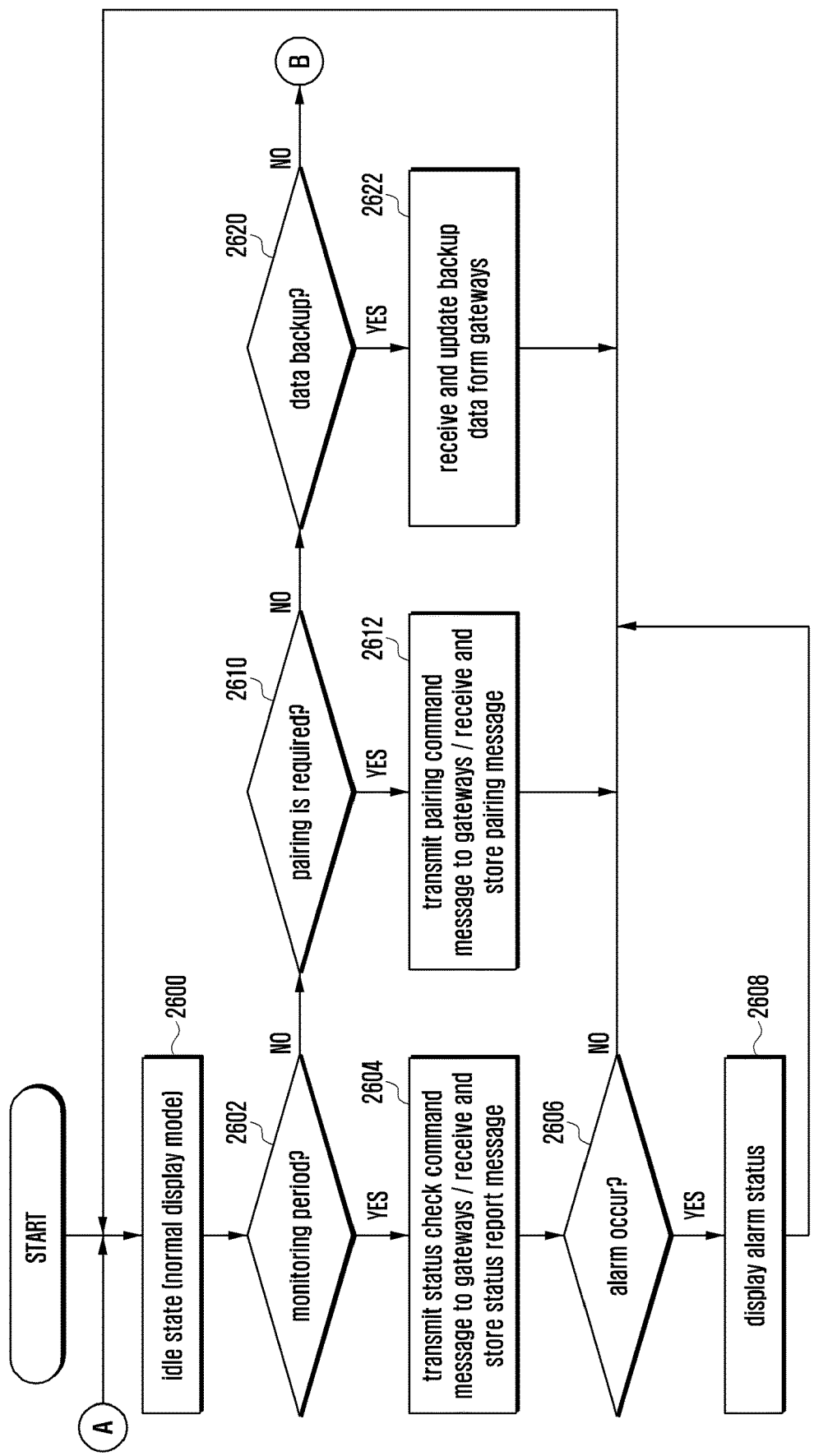
FIGS. 27A and 27B is a flowchart illustrating an example control procedure of the management server according to an example embodiment of the present disclosure.
Figure 27B:
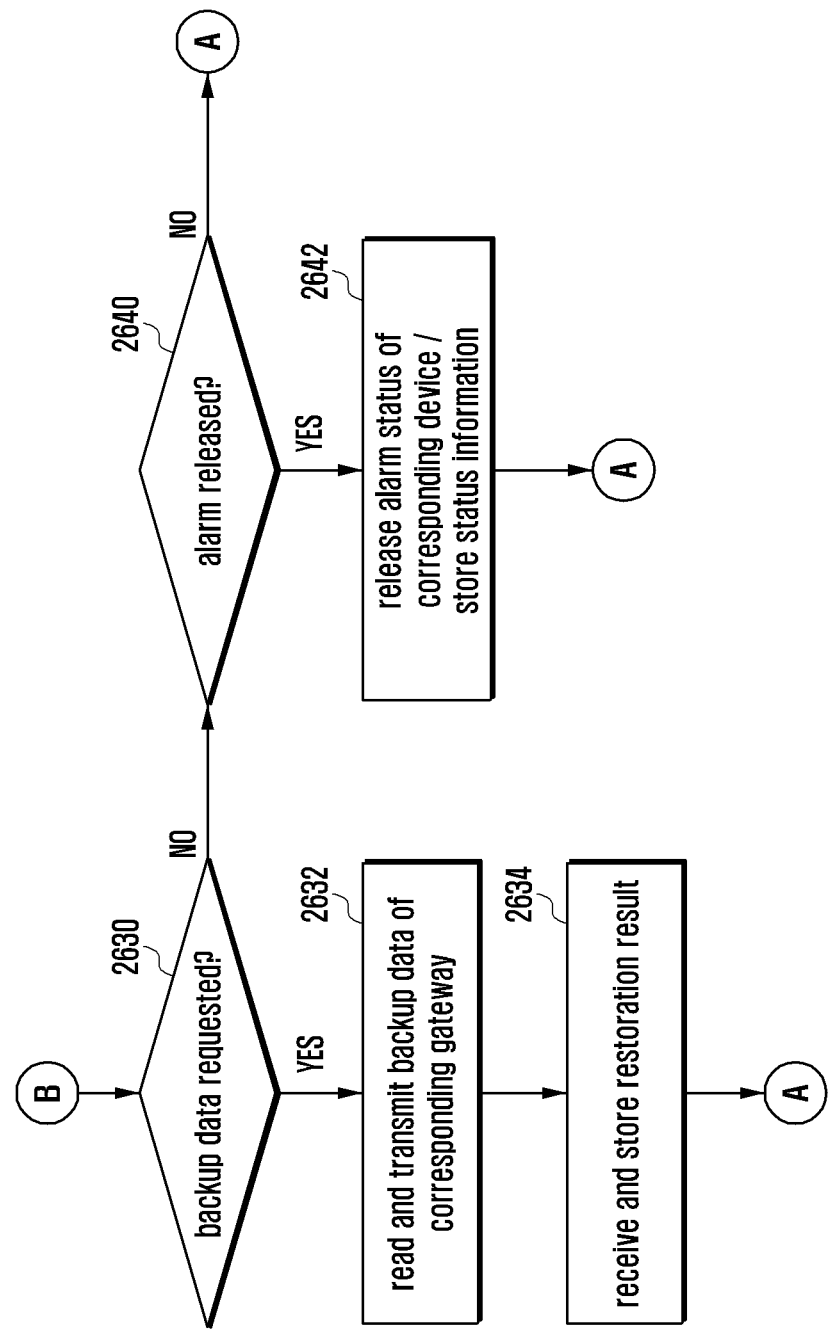

FIGS. 27A and 27B is a flowchart illustrating an example control procedure of the management server according to an example embodiment of the present disclosure.

The server control unit 111 is operating in an idle state at step 2600. In the idle state, the server control unit 111 may wait for arriving a predetermined operation execution time and receiving predetermined signals or message from the gateways connected thereto and predetermined command input made by the operator on the graphical interface.

The server control unit 111 may determine at step 2602 whether a monitoring period has arrived. The monitoring period may include the time period for requesting for the status information of a certain gateway, or a wireless communication device, or electronic devices connected to the wireless communication device and stored the acquired status information. For example, the management server 100 may request for the status information of the gateway and the wireless communication device connected to the gateway and the electronic devices connected to the wireless communication device in a polling scheme. That is, the server control unit 111 may determine whether a timing for requesting to the gateway for status information of the gateway and entities connected thereto has arrived. For determining the monitoring cycle, a predetermined timer may be used. The timer may be configured per gateway or all of the gateways to request for the status information to all of the gateways at a time. The timer-based operation methods are well-known and thus detailed descriptions thereof are not made herein.

If the monitoring period has arrived, the server control unit 111 transmits a status check command message to the gateways to request for monitoring at step 2604. Each gateway may transmit the current status information immediately or check the status of the wireless communication device and the electronic devices connected thereto and transmit the status report message generated based on the check result. If the status report messages are received from the gateways, the server control unit 111 updates the server database 105 with the information acquired from the status report messages. At this time, the status information may be stored along with the update time information.

After storing the status information, the server control unit 111 may check the presence of the electronic device in the non-response status to determine at step 2606 whether there is any electronic device in the alarm status. If there is any electronic device in the non-response status, it is determined that the electronic device is in the alarm status. If the server control unit 111 receives the status report message from all of the gateways and there is no electronic device in the alarm status, the procedure returns to step 2600. If it is determined that there is any electronic device in the alarm status, the server control unit 111 may display the alarm status at step 2608. Although not illustrated in FIG. 27A, additional operations may be performed depending on the place whether the network has been deployed. Although exemplified in association with the case where the network is deployed in the hospital, the additional operations are not limited to such a case. For example, it may be configured, if an electronic device or a gateway with a high urgency level enters the non-response status while the operator of the management server 100 is absent, the management server 100 transmits a predetermined text message to a mobile communication terminal designated by the operator and, especially in the automated factory dealing with dangerous substance, broadcasts predetermined messages in a certain area.

If the monitoring period has not arrived, the server control unit 111 may determine at step 2610 whether there is any electronic device to be paired. Pairing may be required in various cases. For example, when a network according to the present disclosure is initially deployed, the management server may instruct the gateways to perform pairing processes with electronic devices. Also, in the case where a gateway, a wireless communication device, or an electronic device is added, the server control unit 111 may instruct the corresponding gateway to perform the pairing process. Also, if a certain electronic device is connected to one or more previously deployed gateways, the management server 100 may instruct to perform pairing to secure significance or real time characteristics. If pairing is required for the above or any other reasons, the server control unit 111 may perform the operation of step 2612.

At step 2612, the server control unit 111 may transmit a pairing command message to at least one gateway. Then the gateway transmits the pairing command message to the wireless communication device. If the pairing command message is received, the wireless communication device may perform pairing processes with the electronic devices discovered within its radio communication range and transmit a pairing result message to the gateway. The pairing result message may include the electronic device information and pairing information. The pairing result message may be transmitted to the management server via the gateway. The server control unit 111 may receive the pairing result message by means of the wired/wireless communication unit 107 and store the information acquired from the message in the server database 105.

If pairing is not required, at step 2620, the server control unit 111 may determine whether a data backup timing has arrived at step 2620. The data backup may be performed initially when the initial pairing process has been completed. Afterward, the data backup may be performed when a certain device is reset or replaced. The server control unit 111 may also instruct the gateways to perform backup periodically to secure data stability and integrity. The operation of step 2620 of FIG. 27A may be performed for updating the backup data to secure the data stability and integrity by transmitting the backup request message periodically. In this case, the server control unit 111 requests to the gateways for data required for backup and updates the backup data with the received data. The backup timing may be configured by the operator or determined according to a predetermined rule or the data life time in the database of the management server or the backup server.

The control operation of the management server 100 is further described with reference to FIG. 27B. The server control unit 111 may determine at step 2630 whether a backup data request is received from a gateway. The data backup may be initiated by the gateway with the exception of the case where the gateway is replaced. If a wireless communication device connected to the gateway is replaced, the gateway may request to the management server 100 for backup data. The operation of step 2630 may be performed in a way of determining whether a backup data request is received from the gateway. If the backup data request is received from the gateway, the server control unit 111 reads out the backup data of the corresponding gateway from the server database 105 and transmits the backup data to the gateway at step 2632. If possible, the gateway may control the restore the data with the backup data and transmit the restoration result to the management server 100. The server control unit 111 may receive the restoration result from the corresponding gateway and store the restoration result in the server database 105.

The server control unit 111 may determine at step 2640 whether an alarm release signal is received. If a certain electronic device or wireless communication device in the non-response status transitions to the response status, the gateway transmits the alarm release signal to the management server 100. If the gateway is in the non-response status, the management server 100 may check periodically whether the gateway returns to the response status. If it is determined at step 2640 that the alarm release signal is received, the server control unit 111 may release the alarm status of the corresponding device and store the status information at step 2642. At this time, if the graphical interface 101 is displaying the alarm status indicator of the corresponding device, the server control unit 111 may control such that the alarm status indicator disappears.

It will be apparent to those skilled in the art that the monitoring, data backup, backup data provision, pairing, and alarm status release operations described above with reference to the flowcharts may be performed by the operator and, in this case, the operations may be triggered by operator's command rather than the arrival of monitoring timing.

Figure 28:
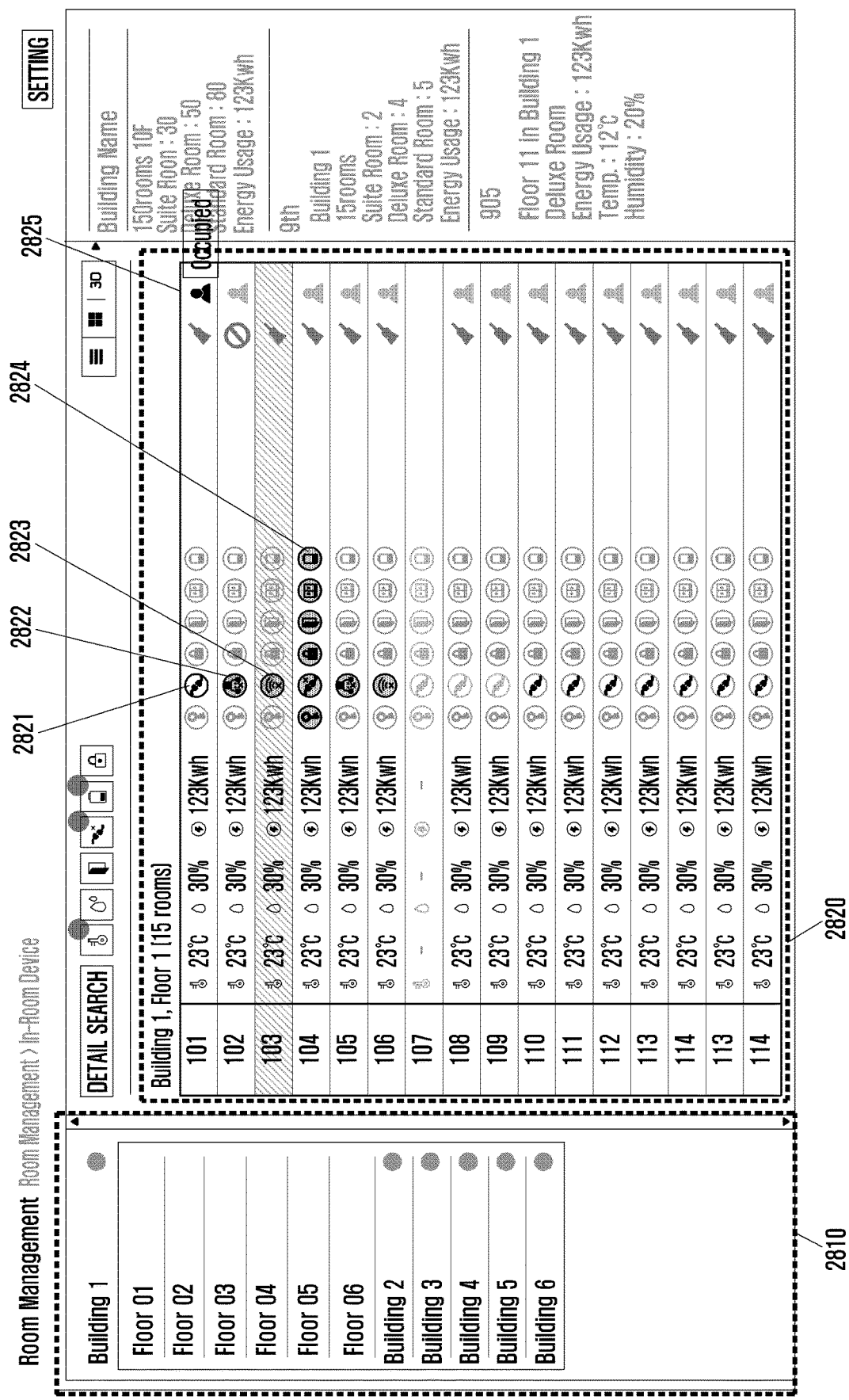
FIG. 28 is a diagram illustrating an example screen display presenting status information of electronic devices located within communication ranges of the wireless communication devices of gateways to the operator at a management server according to an example embodiment of the present disclosure.

FIG. 28 is a diagram illustrating an example screen display presenting status information of electronic devices located within communication ranges of the wireless communication devices of gateways to the operator at a management server according to an example embodiment of the present disclosure.

In reference to FIG. 28, the management server 100 may acquire status information of the devices connected to the gateways deployed in a building based on the information collected from the gateways. The embodiment of FIG. 28 exemplifies the case where the network is deployed in a hotel.

The left pane 2810 of the display screen displays sub-categories of a main category. For example, if the hotel includes 6 buildings, 6 main categories are designated as Building 1, Building 2, Building 3, Building 4, Building 5, and Building 6. Each main category has sub-categories of floors. If a specific building is selected, the sub-categories of the building category are displayed. In the left pane 2810, the sub-categories of "Floor 01", "Floor 02", . . . , "Floor 06" listed below the main category of "Building 1".

The center pane 2820 at the right side of the left pane 2810 displays the detailed information on the sub-category selected in the left pane 2810. In the center pane 2820, the information items of the rooms belonging to the Floor 01 of Building 1 are listed, each room information item includes information for use in management such as room temperature/humidity/electric power usage and status information of electronic devices in the form of icons. The icons may be designed with various colors and blinking function to provide the user with intuitive information. In the center pane 2820, the icon 2821 indicates that the network status of the corresponding room is normal. In order to provide the user with the normal status information intuitively, it may be possible to apply a visual effect to the icon with a certain color, e.g., green and blue.

The icon 2822 is designed to indicate that the gateway is in the non-response status. In order to notify the operator of the non-response status of the gateway, the icon 2822 may be a drawing with a red color and a blinking effect. The icon 2823 is designed to indicate the non-response status of the wireless communication device. In order to notify the operator of the non-response status of the wireless communication device, the icon 2823 may be a drawing with a red color and a blinking effect too. The icon 2824 is designed to indicate the flat battery state of the electronic device. In the case that the battery-powered electronic device is configured to measure its battery capacity level and report the residual battery capacity or urgency information, the management server 100 may display the icon 2824 to the operator. All other icons displayed in the center pane 2820 may be designed to inform the operator of various status of the electronic devices.

In FIG. 28, the icon 2825 is designed to indicate that the guest is present in the room. In the present disclosure, it may be possible to check the presence/absence of the guest in the room by means of a censor and, in the case of controlling the electricity using the room keys, based on whether the room key is in the power-on state. As described above, the graphical interface of the management server 100 may provide the device status alarm function. That is, in order to make it possible to determine abnormality/replacement of electronic devices installed in the room, various types of alarms can be provided.

As described above, if no signal is received from an electronic device during a predetermined time period, this may be determined as a disconnected state; the gateway may detect a physical disconnection of a wireless communication device; if no response is received even though transmitting a status check command message to the wireless communication device periodically, the gateway may determine that the wireless communication device is in the physical disconnection state or non-response status. The non-response status and the physical disconnection state may be distinguished from each other. In the case that the electronic devices are in the non-response status or low battery power state, the management server may display the status of the electronic devices as illustrated in FIG. 28 based on the information collected from the wireless communication devices/gateways.

In the case that an electronic device breaks down frequently and thus loses the connection temporarily, it may be necessary to do not determine such a situation as breakdown. For example, it may be possible to determine whether the electronic device, wireless communication device, or gateway is in the disconnection status or breakdown status based on the number of non-response status reports receive consecutively.

Although the embodiment of FIG. 28 is directed to the case where the network is deployed in a hotel, the method of the present disclosure is applicable to various cases requiring management of a network deployed in a large space (such as a hospital, a library, and automated factory) with a limited amount of manpower in the same or similar manner.

The management server 100 may have the information on the positions where the electronic devices are located in the hotel rooms. It may also be possible to use a room template. A description is made of the method for checking positions of the electronic devices using the room template hereinafter with reference to FIG. 29.

Figure 29:
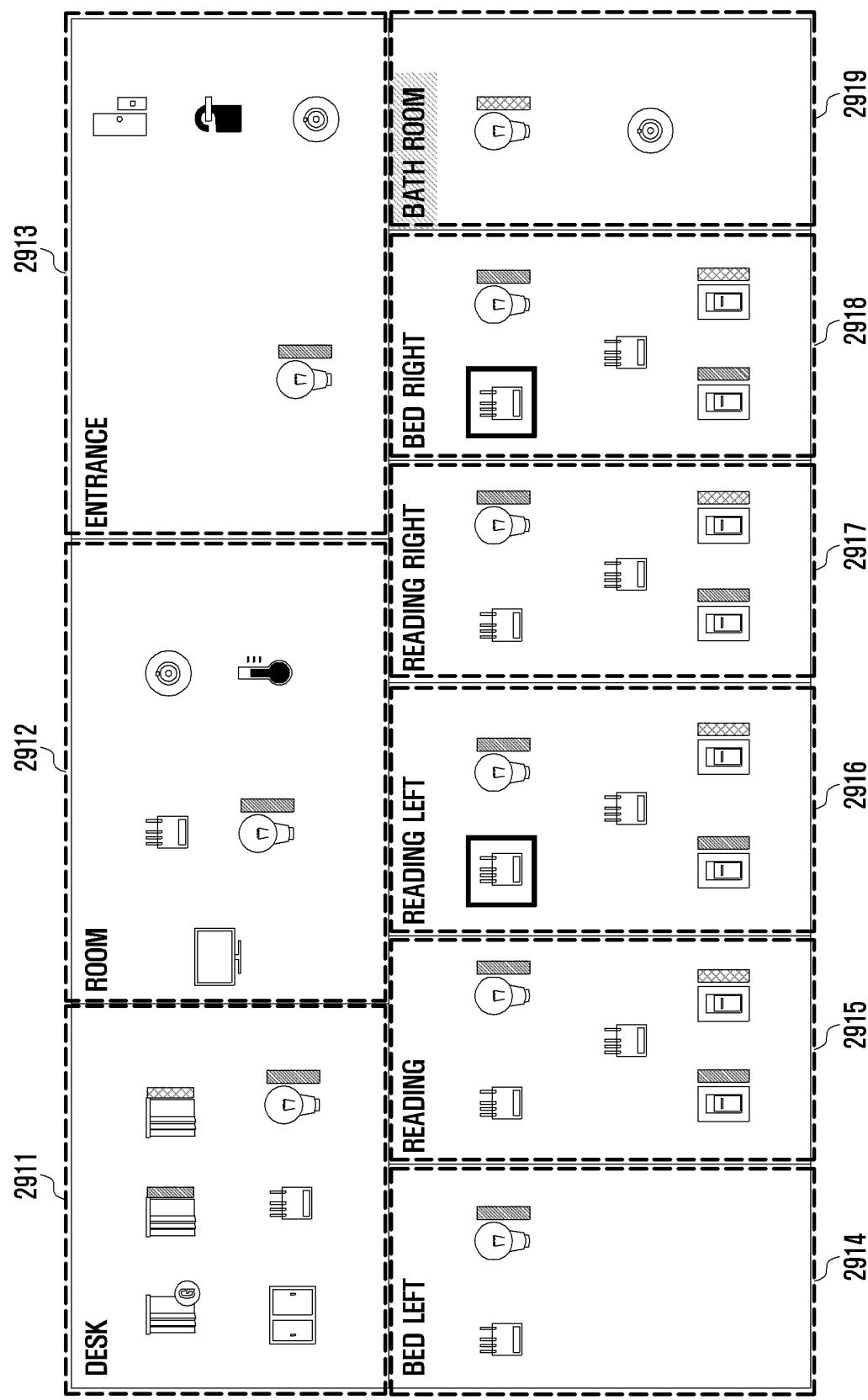
FIG. 29 is a diagram illustrating an example room template provided by a management server to show the deployment and status of electronic devices according to an example embodiment of the present disclosure.

FIG. 29 is a diagram illustrating an example room template provided by a management server to show the deployment and status of electronic devices according to an example embodiment of the present disclosure.

If a guest room is selected, a room template of the guest room may be provided as illustrated in FIG. 29, the room template showing electronic devices deployed in the room. The room template may be stored in the management server. The electronic devices may provide the wireless communication device with information associated with their locations in a predetermined scheme. How the electronic devices provide the information associated with their locations is described hereinafter in detail with reference to accompanying drawings.

In reference to FIG. 29, the indoor configuration of the guest room shows DESK 2911, ROOM 2912, ENTRANCE 2913, BED LEFT 2914, READING 2915, READING LEFT 2916, READING RIGHT 2917, BED RIGHT 2918, and BATH ROOM 2919. The electronic devices are deployed in the respective zones. In the embodiment of FIG. 29, the television of ROOM 2912 may be operating as a gateway. Accordingly, the television may communicate with a wireless communication device by means of its wireless communication unit, check the status of the paired electronic devices, and transmit the status report message to the management server. How to identify the electronic devices located at specific positions is described later with reference to accompanying drawings.

If the status report messages carrying the status information of the electronic devices is received from the televisions operating as gateways, it is possible to check any device in the non-response and make a replacement decision easily. In the case of using the room template information, it is easy to locate the electronic device in the non-response status in the corresponding room.

By processing the room template information in consideration of the characteristics of the hotel, it is possible to reduce the size of the data to be stored. For example, it may be possible to configure the information on the room type in advance. It may be possible to configure and store the room templates for a standard room, a deluxe room, and a suite room in advance and, when a room is selected, read out the room template corresponding to the type of the selected room.

<Electronic Device Configuration and Operation and Messages being Exchanged>

Figure 30:
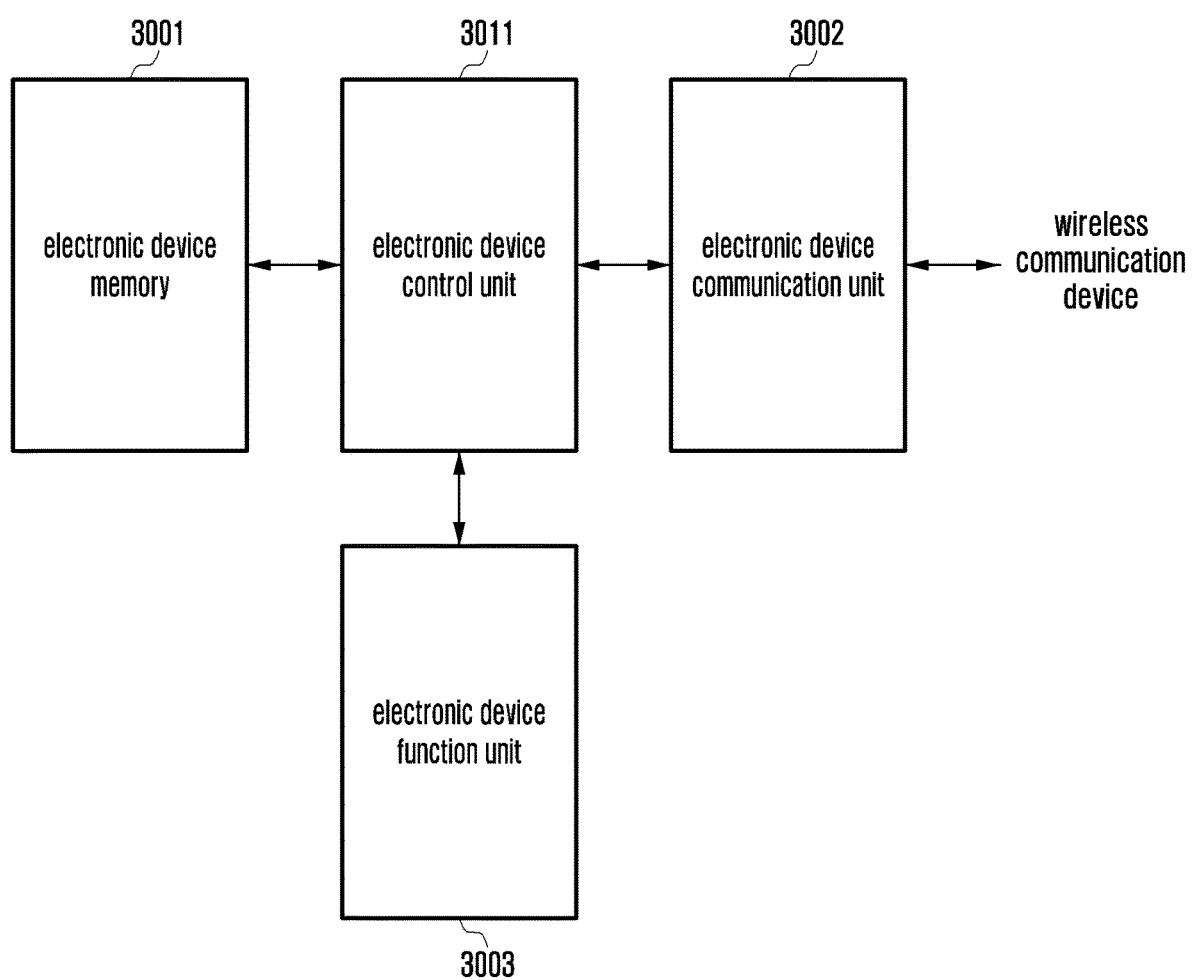
FIG. 30 is a block diagram illustrating an example configuration of an electronic device for pairing with a wireless communication device and reporting status information to the wireless communication device according to an example embodiment of the present disclosure.

FIG. 30 is a block diagram illustrating an example configuration of an electronic device for pairing with a wireless communication device and reporting status information to the wireless communication device according to an example embodiment of the present disclosure.

In the present disclosure, an electronic device may include a memory 3001, a communication unit (e.g., including communication circuitry) 3002, a function unit 3003, and a control unit (e.g., including processing circuitry) 3011. The memory 3001 may include a region for storing a control program for operating the electronic device, a region for storing pairing information, a region for storing status information of the electronic device, and a region for storing firmware and communication protocols of the electronic device. The communication unit 3002 may include various communication circuitry that makes it possible for the electronic device to communicate with a wireless communication device. The function unit 3003 takes charge of the aforementioned functions. Associating with FIG. 29, the function unit 3003 may act as a master switch, an electric light, a relay switch, a window open/close sensor, or a temperature controller. If the network is deployed in a library, a hospital, or an automated factory, instead of a hotel as exemplified in FIG. 29, the function unit 3003 may be configured to take charge of the functions corresponding to the network environment.

Figure 31A:
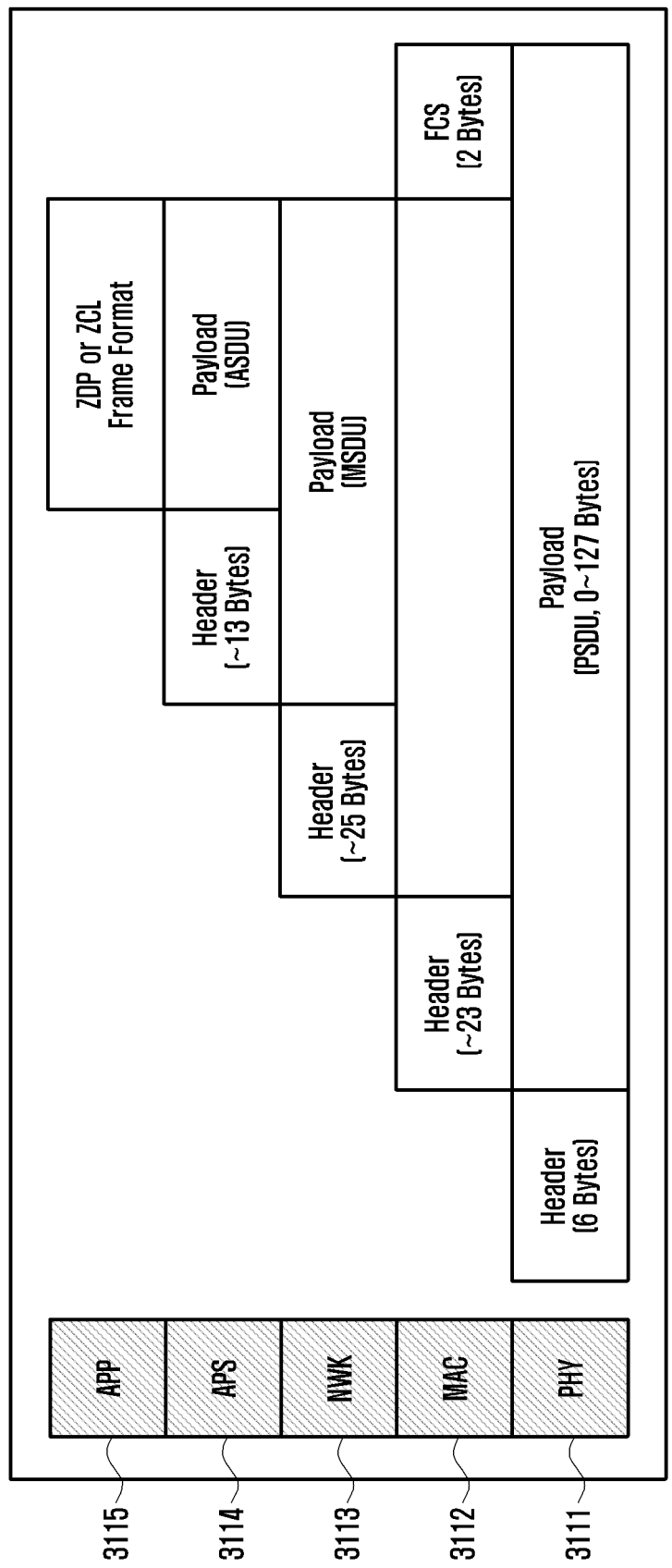
FIG. 31A is a diagram illustrating an example message format for use between a wireless communication device and an electronic device according to an example embodiment of the present disclosure.

FIG. 31A is a diagram illustrating an example message format for use between a wireless communication device and an electronic device according to an example embodiment of the present disclosure.

FIG. 3A illustrates a message format of the ZigBee communication protocol. As illustrated in FIG. 31A, the ZigBee protocol stack includes 5 layers: Physical (PHY) layer 3111, Media Access Control (MAC) layer 3112, Network (NWK) layer 3113, Application Support (APS) layer 3114, and Application (APP) layer 3115. The APP layer 3115 may generate a message for acquiring electronic device information or device capability information during a pairing process between the wireless communication device or network control device and an electronic device. Such a message may be generated using a command set defined in the ZigBee Cluster Library (ZCL) or the ZigBee Device Profile (ZDP) as illustrated in FIG. 31A. To the information generated by the application layer, different protocols headers are added by the layers 3111 to 3114 as it passes through them. The ZCL and ZDP have different message formats and provide commands defined therefor respectively.

In the case of using the ZDP message, it may be possible to use an IEEE address request (IEEE_addr_req) command to acquire the MAC address of the electronic device, a node description request (Node_Desc_req) command to acquire the manufacturer code of the electronic device, a simple description request (Simple_Desc_req) command to acquire the profile identifier (Profile ID: profile implemented in the electronic device (HAP)) and Cluster information (Device Type), and an active EP request (Active_EP_req) command to acquire the controllable unit (EndPoint) information implemented in the electronic device. If one of such commands is received, the control unit 3011 has to generate a corresponding message and transmit the generated message by means of the communication unit 3002. In more detail, if one of such commands is received, the control unit 3011 generates a response message with the electronic device information (capability information) including a MAC address, manufacturer, profile ID, and device type and transmits the generated message by means of the communication unit 3002.

Although the description has been directed to the case of using the ZDP message command, it may be possible to use the ZCL message command in a similar manner.

Figure 31B:
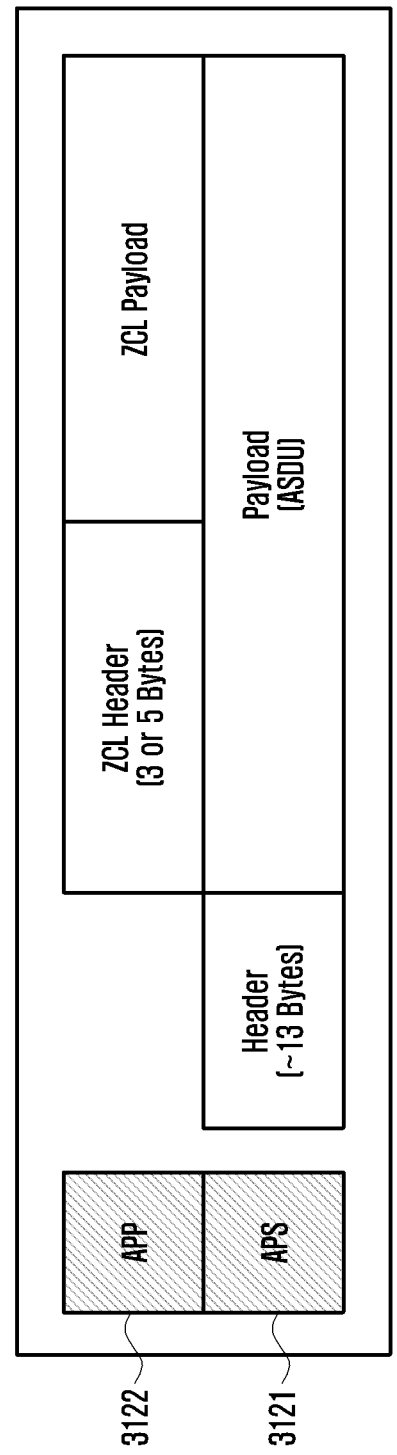
FIG. 31B is a diagram illustrating an example message format of a ZCL message.

FIG. 31B is a diagram illustrating a message format of a ZCL message. In reference to FIG. 31B, the ZCL message includes two layers: Application (APP) layer 3122 and Application Support (APS) layer 3121. In the case of using the ZCL message formatted as illustrated in FIG. 31B, it may be possible to define a ZCL Read Attributes command to acquire the electronic device capability information. Also, other commands may be used in a similar manner to the case of using the ZDP messages.

A description is made of the case of transmitting the location information of an electronic device to the management server via the wireless communication device/gateway using the above-described messages. In this case, the management server 100 may locate electronic devices in the non-response status on the room template.

The location information of the electronic device may be specified in the device attribute of the Manufacturer Specific Profile (MSP) so as to be inserted in the firmware of the electronic device. It may be assumed that electric lights are installed in several zones of a room. This may be exemplified as illustrated in FIG. 29. In reference to FIG. 29, the electric lights are installed at the desk 2911, the room 2912, the entrance door 2913, the bed's left side 2914, the reading zone 2915, the reading zone's left side 2916, the reading zone's right side 2917, the bed's right side 2918, and the bath room 2919. If the location information of the electronic devices is not provided, the management server may recognize the lights in the non-response status but cannot locate the position of the lights in the non-response status. Supposed that the lights installed at the desk 2911, the reading zone's left side 2916, and the bed's right side 2918 are out of order. In this case, if the locations of the lights are not provided, the operator may have to check all of the installed lights to find the out-of-order lights. This means that the management server 100 cannot locate the out-of-order lights. Also, even when a light installed at a certain position is replaced, the management server cannot locate the position wherein the light has been replaced.

In the present disclosure, it is allowed to set the device attribute of the MSP stored in the device memory 3001 to a value mapped to the location where the corresponding device is installed. In the case of using the ZigBee protocol, it may be possible to set the Device Attribute to a code value mapped to the location information. By mapping the code value of the Device Attribute to the location information, the management server 100 can locate the position of the electronic device using the location information mapped to the code value. Table 4 exemplifies such mappings.

TABLE 4

| Attribute | Value Type | Value Code |
|---|---|---|
| Room Type (0xa1) | Standard | 0x01 |
| | Deluxe | 0x02 |
| | Suite | 0x03 |
| Zone Type (0xa2) | Entrance | 0x41 |
| | Room | 0x42 |
| | Bathroom | 0x43 |
| | Desk | 0x44 |
| | BedLeft | 0x45 |
| | BedRight | 0x46 |
| | ReadingLeft | 0x47 |
| | ReadingRight | 0x48 |
| Device Type (0xa3) | LegacyLighting | 0xD1 |
| | DimmableLighting | 0xD2 |

As shown in table 4, it may be possible to assign a code value to each electronic device in the form of firmware and map the assigned code value to a specific position. Accordingly, each electronic device may transmit to the management server 100 its device information including the Device Attribute of the MSP via the wireless communication device/gateway.

In the case that the electronic device provides the Device Attribute of the MSP separately, the wireless communication device may acquire the attribute value of MSP using the "Read Attributes" command of the ZCL message. This information may be mapped to a specific location as described above and provided to the management server via the wireless communication device/gateway.

The above description has been directed to the case where the management server 100 determines the locations of the electronic devices. However, the gateway or the network control device may be configured to determine the locations of the electronic devices based on the information provided by the electronic devices in the same manner as the management server 100. In this case, the network control device may locate the electronic devices in the non-response status or the alarm status and provide the corresponding information to the management server 100. In the case that an electronic device in the alarm status is replaced, the gateway or the network control device may locate the corresponding electronic device and provide the management server 100 of the replaced electronic device information.

<Display Operation of Management Server in Network Entity Backup/Restoration Process>

Figure 32:
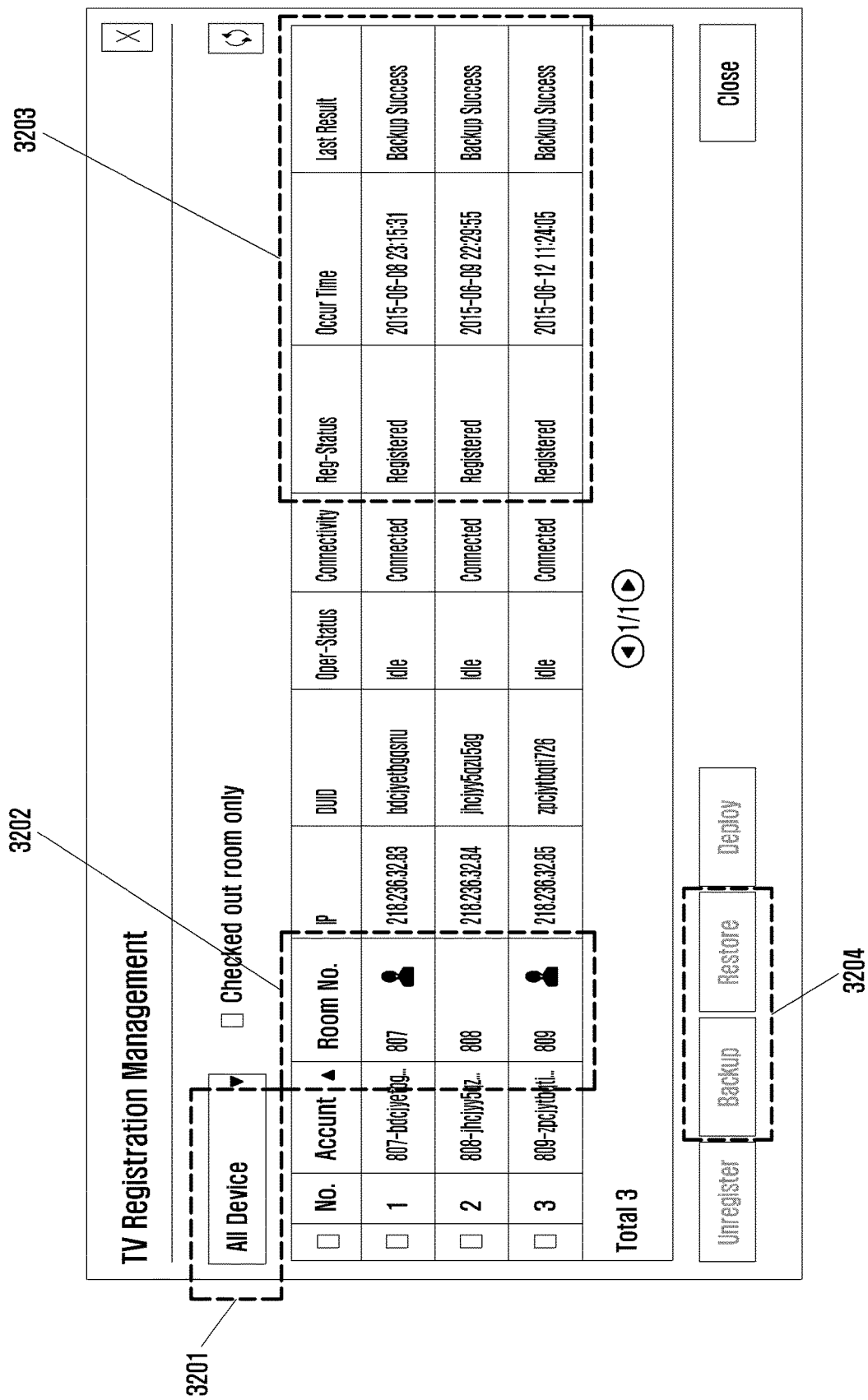
FIG. 32 is a diagram illustrating an example user interface of a management server for displaying a backup/restoration situation according to an example embodiment of the present disclosure.

FIG. 32 is a diagram illustrating an example user interface of a management server for displaying backup/restoration situation according to an example embodiment of the present disclosure.

In reference to FIG. 32, the user interface may provide a status inquiry and management screen for inquiry and management of gateway or network control device connected to the management server. The operator may select an electronic device, a gateway, a wireless communication device, or a network control device in a device selection box 3201. The room information of a specific room may be acquired as described with reference to FIG. 28, and the device-specific information may be displayed by selecting the corresponding device in the device selection box 3201. If a device is selected in the device selection box 3201, the information on the selected device is displayed as denoted by reference number 3203. The column 3202 may show the room identifier, e.g., room number and indicate presence/absence of the guest.

The operator may enter a command for backup/restoration of the devices located in a certain room using backup/restore command button 3204. If the operator enters the backup/restoration command for certain network entities, the management server may transmit a backup command or a restoration command to the corresponding entity. If a request for the information on a certain entity is entered, the user interface may display the information on the entities located in the corresponding room as follows.

(1) Room Number
(2) Internet Protocol (IP) Address: IP address assigned to corresponding entity located in the room
(3) Device Unique Identifier (DUID): Unique device ID assigned to corresponding entity located in the room, e.g., 12 bytes
(4) Operation status: Operation status of corresponding entity (Idle/Backing up/Restoring)
(5) Connection status: Connection status of corresponding entity (Connected/Disconnected)
(6) Registration status: Registration status of corresponding entity (Registered/ReadyToRestore)
(7) Time information: Event/operation execution time
(8) Result information: Event/operation execution result (Backup Success/Backup Fail/Restoration Success/Restoration Fail)

If the operator selects the backup graphical interface during the back/restoration operation of a certain entity, the following operation is performed. In the case of backup, if the backup button is pushed after a room is selected, a backup command is transmitted to the corresponding entity. In this case, the corresponding entity may access its memory region to read out the data for backup and upload the data to the management server. Here, the data may include firmware (version information and firmware image), device information (ID, name, type, model, ZB/ZW Network ID, and Node ID).

The restoration operation may be performed in the same process. If the operator selects a restoration graphical interface during the restoration/backup operation of a certain entity, the following operation is performed. If the Restore button is pushed after a room is selected, the server transmits to the corresponding entity the data stored in the server database along with or after the Restore command. Then the corresponding entity may access its memory region to restore the stored data with the downloaded data.

If the network is deployed in a hotel and the televisions are acting as gateways, the restoration time may be determined as follows.

(1) Real time restoration: Download television restoration data from a server and execute restoration immediately.
(2) Room status-based restoration: Restoration is not executed immediately, but change the television status to ReadyToRestore status according to the room status information (check-in/presence/absence), determine check-out and absence time, reboot the television to restore the television, and update the television status to Registered status after restoration.

The management server may collect the network information of the electronic devices in the respective gateway domains periodically and visualize the collected network information, which may include the information as follows.

(1) Routing Path: Information on the routing path per Zwave/ZigBee device.

(2) Link Quality (QoS): Link quality information per routing path which is configured through two or more steps, e.g., 4 steps (Disconnected/Weak/Normal/Strong). It is apparent that the link quality can be configured in various types as described above.

(3) Control response time: Request/Response Mean Time (4) Signal strength: RSSI

As described in the initial network deployment procedure, the wireless communication devices may interfere to each other. In order to detect the interference between the wireless communication devices and an action to mitigate the interference, the management server may provide the network information configuration function per wireless communication device.

(1) ZigBee Channel No.: ZigBee network channel (Ch11~26)

(2) ZigBee PAN ID: ZigBee network ID (2 byte, 0x0000~0xFFFF)

(3) Zwave Home ID: Zwave network ID (4 byte, 0xC0000000~0xFFFFFFFE) As described above, the device management method and apparatus of the present disclosure is advantageous in terms of facilitating maintenance and repair of devices and allowing to manage a large number of devices effectively with a limited amount of manpower especially by detecting errors in the devices automatically. Also, the device management method and apparatus of the present disclosure is advantageous in terms of restoring, when an electronic device in which an error occurs is changed for a new one, the system promptly and minimizing resource waste caused by changing electronic devices in which an error occurs for new ones.

Although various example embodiments of the present disclosure have been described using specific terms, the specification and drawings are to be regarded in an illustrative rather than limiting in order to aid in understanding the present disclosure. Thus the scope of the disclosure should be determined by the appended claims and their legal equivalents rather than the detailed description, and various alterations and modifications within the definition and scope of the claims are included in the claims.

What is claimed is:

1. A device management method of a first device having a list of second devices capable of wireless communication, the method comprising:
   transmitting, to one of the second devices, a first message requesting respective second device information in to check connection status between the first device and the second device, when a physical connection is made with the one of the second device or at a predetermined interval;
   in response to the first message, receiving a second message from the second device, the second message including second device information;
   comparing previously stored second device information with second device information contained in the second message;
   determining that the connection status is an abnormal status;
   determining that the second device is possible to restore with the previously stored second device information; and
   transmitting a recovery command message including the previously stored second device information to the second device;
   transmitting a pairing command message for requesting pairing information stored in the second device to the second device;
   receiving a second pairing information from the second device;
   generating a second pairing result report message including the first device information, when the second pairing result report message information is received; and
   transmitting the second pairing result report message to a management server.

2. The method of claim 1, wherein the first device communicates with the second devices contained in the list using at least one wireless communication protocol, and
   wherein the second device information includes a device identifier, a device type, and pairing information associated with at least one electronic device.

3. The method of claim 2, further comprising reporting a restoration result to the second device in response to receipt of a restoration result from the second device.

4. The method of claim 1, further comprising:
   transmitting a status check command message to the second device, when a status check is required for at least one of the other devices contained in the list;
   storing status of a corresponding electronic device, when a status check message is received; and
   transmitting a status report message generated for the corresponding electronic device to a management server.

5. The method of claim 4, further comprising:
   storing status information of the corresponding electronic device, when a non-response report message is received from the second device;
   generating a non-response report message for the corresponding electronic device;
   transmitting the non-response report message to the management server; and
   transmitting a status check command message for the corresponding electronic device in a non-response status to the second device at a predetermined interval.

6. The method of claim 1, further comprising:
   comparing previously stored second device information with second device information included in the second message, when the second message including the second device information is received; and
   requesting the previously stored second device information from a management server.

7. A first management device for managing second-devices capable of wireless communication, the first management device comprising:
   a communication unit comprising communication circuitry configured to perform wireless communication with the second devices, and to communicate with a management server;
   a memory configured to store a list of the second devices, gateway information, and information of the second devices; and
   a control unit comprising processing circuitry configured to:
   transmit, in order to check connection status between the first management device and the second devices in the list, a first message requesting for second device information, when a physical connection is made with the one of the second device or at a predetermined interval,
   in response to the first message, receive a second message from the second device, the second message including second device information, compare previously stored second device information and the second device information contained in the second message, determining that the connection status is an abnormal status;

determine that the second device is possible to restore with the previously stored second device information; and transmit a recovery command message including the previously stored second device information to the second device based on the second device information in the second message differing from the previously stored second device information, transmit, when the restoration is impossible, a pairing command message for requesting pairing information stored in the second device to the second device, receive a second pairing information from the second device, generate, when the second pairing information is received, a second pairing result report message including the management device information; and transmit the second pairing result report message to a management server.

8. The management device of claim 7, wherein the processing circuitry of the control unit is configured to:

transmit, when a status check is required for at least one of other devices contained in the list, a status check command message to the second device, store, when a status check message is received, status of the corresponding electronic device, transmit a status report message generated for the corresponding electronic device to a management server, store, when a non-response report message is received from the second device, status information of the corresponding electronic device, generate a non-response report message for the corresponding electronic device, and transmit the non-response report message to the corresponding electronic device.

\* \* \* \* \*